(12) United States Patent
Kato et al.

(10) Patent No.: US 6,356,258 B1
(45) Date of Patent: Mar. 12, 2002

(54) KEYPAD

(75) Inventors: Yoshiya Kato, Tokyo; Syunji Kato, 34-6, Mejirodai 3-chome, Hachiohji-shi, Tokyo, both of (JP)

(73) Assignees: Misawa Homes Co., Ltd.; Syunji Kato, both of Tokyo (JP)

( * ) Notice: Subject to any disclaimer, the term of this patent is extended or adjusted under 35 U.S.C. 154(b) by 0 days.

(21) Appl. No.: 09/117,288

(22) PCT Filed: Jan. 23, 1998

(86) PCT No.: PCT/JP98/00291

§ 371 Date: Oct. 19, 1998

§ 102(e) Date: Oct. 19, 1998

(87) PCT Pub. No.: WO98/33110

PCT Pub. Date: Jul. 30, 1998

(30) Foreign Application Priority Data

Jan. 24, 1997 (JP) ................................. 9-11589
Jan. 28, 1997 (JP) ................................. 9-14310
Aug. 21, 1997 (JP) ................................. 9-224883
Aug. 26, 1997 (JP) ................................. 9-229366

(51) Int. Cl.$^7$ .................................................. H01J 7/04
(52) U.S. Cl. ........................ 345/168; 345/169; 345/171; 400/110; 400/486
(58) Field of Search ................................ 345/168, 171, 345/169; 400/486, 110

(56) References Cited

U.S. PATENT DOCUMENTS 3,698,523 A * 10/1972 Illig et al. .................... 400/486
3,929,216 A * 12/1975 Einbinder .................... 400/484
4,737,040 A * 4/1988 Moon .......................... 400/110
4,824,268 A * 4/1989 Diernisse .................... 400/486
4,872,196 A * 10/1989 Royer et al. ................. 455/564
4,927,279 A * 5/1990 Morgan ....................... 400/486
5,212,638 A * 5/1993 Bernath ....................... 707/535
5,307,267 A * 4/1994 Yang .......................... 707/535
5,818,437 A * 10/1998 Grover et al. ............... 345/326
5,936,556 A * 8/1999 Sakita ......................... 341/28
5,945,928 A * 8/1999 Kushler et al. .............. 341/285
6,054,941 A * 4/2000 Chen ............................ 341/28
6,098,086 A * 8/2000 Krueger et al. ............. 707/535

* cited by examiner

*Primary Examiner*—Bipin Shalwala
*Assistant Examiner*—Vincent E. Kovalick
(74) *Attorney, Agent, or Firm*—Oblon, Spivak, McClelland, Maier & Neustadt, P.C.

(57) ABSTRACT

A keyboard input apparatus, where a plurality of main keys are pressed for character inputting operation. Five keys are set individually as character keys for inputting characters "A", "I", "U", "E", and "O" of the Alphabet expressing vowels. Further provided are key input detectors to detect the number of key pressing operations of each of the main keys, and a key input processor for outputting the character keys corresponding to the number of key pressing operations. Setting of in the Japanese and English language frequently used vowels on independent keys enables inputting of vowels by only a single key pressing operation and when compared with a conventional art where a plurality of key pressing operations are required, the number of key pressing operations can be reduced at the time of inputting vowels, whereby manipulation of the apparatus and the inputting speed can be improved.

29 Claims, 59 Drawing Sheets

F I G.2
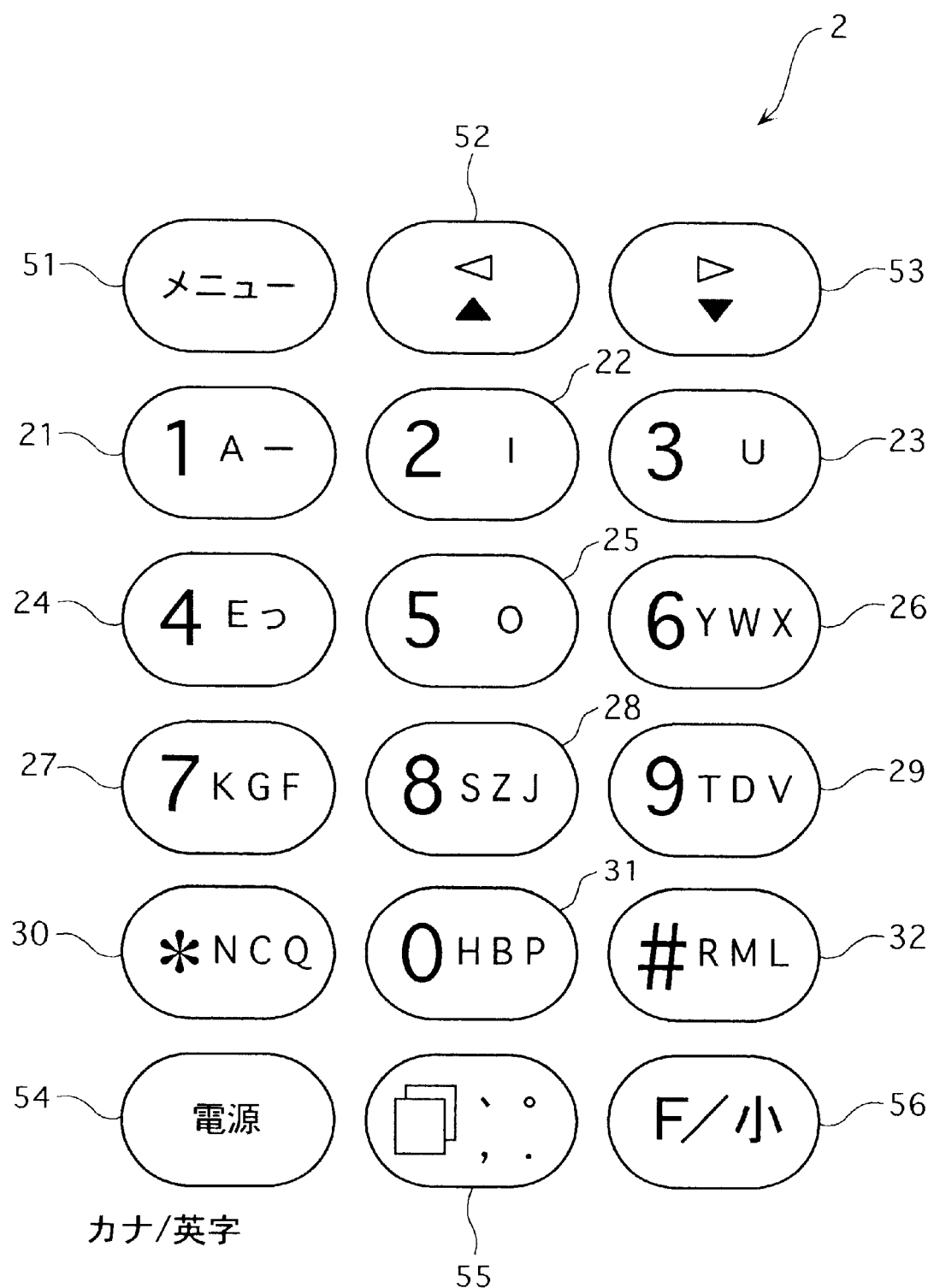

FIG.4

| CHARACTERS | KEY INPUT MANIPULATION |
|---|---|
| ア | (1 A-) |
| イ | (2 I) |
| ウ | (3 U) |
| エ | (4 E っ) |
| オ | (5 O) |
| カ | (7 KGF) + (1 A-) |
| キ | (7 KGF) + (2 I) |
| ⋮ | |
| ワ | (6 YWX) + (6 YWX) + (1 A-) |
| ガ | (7 KGF) + (7 KGF) + (1 A-) |
| ⋮ | |
| ザ | (8 SZJ) + (8 SZJ) + (1 A-) |
| ⋮ | |
| バ | (0 HBP) + (0 HBP) + (1 A-) |
| ⋮ | |
| パ | (0 HBP) + (0 HBP) + (0 HBP) + (1 A-) |
| ⋮ | |
| ー | (1 A-) + (1 A-) |
| っ | (4 E っ) + (4 E っ) |
| ン | (✻ NCQ) + (✻ NCQ) |

FIG.5

| CHARACTERS | ENGLISH INPUT MODE |
|---|---|
| A | (1 A -) |
| I | (2 I) |
| U | (3 U) |
| E | (4 E) |
| O | (5 O) |
| K ⋮ Y | (7 KGF) ⋮ (6 YWX) |
| G ⋮ W | (7 KGF) + (7 KGF) ⋮ (6 YWX) + (6 YWX) |
| F ⋮ P ⋮ X | (7 KGF) + (7 KGF) + (7 KGF) ⋮ (0 HBP) + (0 HBP) + (0 HBP) ⋮ (6 YWX) + (6 YWX) + (6 YWX) |

FIG.6

| CHARACTERS | ENGLISH INPUT MODE |
|---|---|
| a | (1 A -) + (F/小) |
| ... | |
| g | (7 K G F) + (7 K G F) + (F/小) |
| ... | |
| x | (6 Y W X) + (6 Y W X) + (6 Y W X) + (F/小) |

FIG.16

| CHARACTERS | KEY INPUT MANIPULATION |
|---|---|
| ア | 1 A |
| イ | 2 I |
| ウ | 3 U |
| エ | 4 E(ッ) |
| オ | 5 O |
| カ | 6 KG/F + 1 A |
| キ | 6 KG/F + 2 I |
| ... | |
| ワ | # YW(·)/X + # YW(·)/X + 1 A |
| ガ | 6 KG/F + 6 KG/F + 1 A |
| ... | |
| ザ | 7 SZ/V + 7 SZ/V + 1 A |
| ... | |
| バ | * HBP + * HBP + 1 A |
| ... | |
| パ | * HBP + * HBP + * HBP + 1 A |
| ... | |
| ン | 9 N(ん)/CQ + 9 N(ん)/CQ |
| ッ | 4 E(ッ) + 4 E(ッ) |

FIG. 17

| SYMBOLS | KEY INPUT MANIPULATION |
|---|---|
| 、 | 機能/F + 1 A |
| 、 | 機能/F + 1 A + 1 A |
| 。 | 機能/F + 2 I |
| ... | |
| ～ | 機能/F + # YW(·) X |

FIG. 18

| FUNCTION | KEY INPUT MANIPULATION |
|---|---|
| F01 | 機能/F + 機能/F + 0 RM(−) L + 1 A |
| F02 | 機能/F + 機能/F + 0 RM(−) L + 2 I |
| ... | |
| F10 | 機能/F + 機能/F + 1 A + 0 RM(−) L |
| ... | |
| F99 | 機能/F + 機能/F + 9 N(ん) CQ + 9 N(ん) CQ |

FIG.19

| CHARACTERS | ENGLISH INPUT MODE |
|---|---|
| A | [1 A] |
| I | [2 I] |
| U | [3 U] |
| E | [4 E(ɔ)] |
| O | [5 O] |
| K ⋮ Y | [6 KG F] ⋮ [# YW(·) X] |
| G ⋮ C B ⋮ W | [6 KG F] + [6 KG F] ⋮ [9 N(ん) CQ] + [9 N(ん) CQ] [* HBP] + [* HBP] ⋮ [# YW(·) X] + [# YW(·) X] |
| F ⋮ Q P ⋮ X | [6 KG F] + [6 KG F] + [6 KG F] ⋮ [9 N(ん) CQ] + [9 N(ん) CQ] + [9 N(ん) CQ] [* HBP] + [* HBP] + [* HBP] ⋮ [# YW(·) X] + [# YW(·) X] + [# YW(·) X] |

FIG.22

| CHARACTERS | KEY INPUT MANIPULATION |
|---|---|
| ア | (1 A) |
| イ | (2 I) |
| ウ | (3 U) |
| エ | (4 E) |
| オ | (5 O) |
| カ | (6 KG C) + (1 A) |
| キ | (6 KG C) + (2 I) |
| ... | |
| ワ | (# YW X) + (# YW X) + (1 A) |
| ガ | (6 KG C) + (6 KG C) + (1 A) |
| ... | |
| ザ | (7 SZ F) + (7 SZ F) + (1 A) |
| ... | |
| バ | (* HBP Q) + (* HBP Q) + (1 A) |
| ... | |
| パ | (* HBP Q) + (* HBP Q) + (* HBP Q) + (1 A) |
| ... | |
| ン | (9 N(ん) L) + (9 N(ん) L) |

FIG.23

| CHARACTERS | ENGLISH INPUT MODE |
|---|---|
| A | (1 A) |
| I | (2 I) |
| U | (3 U) |
| E | (4 E) |
| O | (5 O) |
| K ⋮ Y | (6 KG C) ⋮ (# YW X) |
| G ⋮ L B ⋮ W | (6 KG C) + (6 KG C) ⋮ (9 N(ん) L) + (9 N(ん) L) (\* HBP Q) + (\* HBP Q) ⋮ (# YW X) + (# YW X) |
| C ⋮ P ⋮ X | (6 KG C) + (6 KG C) + (6 KG C) ⋮ (\* HBP Q) + (\* HBP Q) + (\* HBP Q) ⋮ (# YW X) + (# YW X) + (# YW X) |
| Q | (\* HBP Q) + (\* HBP Q) + (\* HBP Q) + (\* HBP Q) |

F I G.24

| CHARACTERS | ENGLISH INPUT MODE |
|---|---|
| a | (1 A) + (F/小) |
| ⋮ | |
| g | (6 KG C) + (6 KG C) + (F/小) |
| ⋮ | |
| x | (# YW X) + (# YW X) + (# YW X) + (F/小) |
| q | (* HBP Q) + (* HBP Q) + (* HBP Q) + (* HBP Q) + (F/小) |

FIG.27

| CHARACTERS | KEY INPUT MANIPULATION |
|---|---|
| あ | (A—) |
| い | (I) |
| う | (U) |
| え | (Eっ) |
| お | (O) |
| か | (KGF) + (A—) |
| き | (KGF) + (I) |
| ⋮ | |
| わ | (YWX) + (YWX) + (A—) |
| が | (KGF) + (KGF) + (A—) |
| ⋮ | |
| ざ | (SZJ) + (SZJ) + (A—) |
| ⋮ | |
| ば | (HBP) + (HBP) + (A—) |
| ⋮ | |
| ぱ | (HBP) + (HBP) + (HBP) + (A—) |
| ⋮ | |
| ん | (NCQ) + (NCQ) |

FIG.28

| CHARACTERS | KEY INPUT MANIPULATION |
|---|---|
| あ | (A−) |
| ー | (A−) + (A−) |
| あー | (A−) + (A−) + (A−) |
| いあ | (I) + (A−) |
| いー | (I) + (A−) + (A−) |
| いあー | (I) + (A−) + (A−) + (A−) |
| ⋮ | |
| おあ | (O) + (A−) |
| おー | (O) + (A−) + (A−) |
| おあー | (O) + (A−) + (A−) + (A−) |
| わ | (YWX) + (YWX) + (A−) |
| わあ | (YWX) + (YWX) + (A−) + (A−) |
| わー | (YWX) + (YWX) + (A−) + (A−) + (A−) |
| ⋮ | |
| が | (KGF) + (KGF) + (A−) |
| があ | (KGF) + (KGF) + (A−) + (A−) |
| がー | (KGF) + (KGF) + (A−) + (A−) + (A−) |
| ⋮ | |

FIG.29

| CHARACTERS | KEY INPUT MANIPULATION |
|---|---|
| え | (Eっ) |
| っ | (Eっ) + (Eっ) |
| えっ | (Eっ) + (Eっ) + (Eっ) |
| ⋮ | |
| うえ | (U) + (Eっ) |
| うっ | (U) + (Eっ) + (Eっ) |
| うえっ | (U) + (Eっ) + (Eっ) + (Eっ) |
| おえ | (O) + (Eっ) |
| おっ | (O) + (Eっ) + (Eっ) |
| おえっ | (O) + (Eっ) + (Eっ) + (Eっ) |
| ⋮ | |
| ね | (NCQ) + (Eっ) |
| ねえ | (NCQ) + (Eっ) + (Eっ) |
| ねっ | (NCQ) + (Eっ) + (Eっ) + (Eっ) |
| ねえっ | (NCQ) + (Eっ) + (Eっ) + (Eっ) + (Eっ) |
| ⋮ | |
| ⋮ | |
| げ | (KGF) + (KGF) + (Eっ) |
| げえ | (KGF) + (KGF) + (Eっ) + (Eっ) |
| げっ | (KGF) + (KGF) + (Eっ) + (Eっ) + (Eっ) |
| ⋮ | |

FIG. 30

| SYMBOLS | KEY INPUT MANIPULATION |
|---|---|
| 0 | (機能) + (NCQ)$_0$ |
| ⋮ | ⋮ |
| 9 | (機能) + (U)$_9$ |
| , | (機能) + (HBP)$_,$ |
| . | (機能) + (RML)$_.$ |

FIG. 31

| FUNCTION | KEY INPUT MANIPULATION |
|---|---|
| F01 | (機能) + (機能) + (NCQ)$_0$ + (KGF)$_1$ |
| F02 | (機能) + (機能) + (NCQ)$_0$ + (SZJ)$_2$ |
| ⋮ | |
| F12 | (機能) + (機能) + (KGF)$_1$ + (SZJ)$_2$ |

FIG.32

| CHARACTERS | ENGLISH INPUT MODE |
|---|---|
| A | (A —) |
| I | (I) |
| U | (U) |
| E | (E ⊃) |
| O | (O) |
| K | (KGF) |
| ⋮ | |
| Y | (YWX) |
| G | (KGF) + (KGF) |
| ⋮ | |
| C | (NCQ) + (NCQ) |
| B | (HBP) + (HBP) |
| ⋮ | |
| W | (YWX) + (YWX) |
| F | (KGF) + (KGF) + (KGF) |
| ⋮ | |
| Q | (NCQ) + (NCQ) + (NCQ) |
| P | (HBP) + (HBP) + (HBP) |
| ⋮ | |
| X | (YWX) + (YWX) + (YWX) |

PROCESS OF THE FULL-SIZE MODE
AND THE HALF-SIZE MODE

FIG.36

INPUTTING OF FUNKTION KEYS CORRESPONDING
TO FUNCTIONS OF GENERAL KEYBORD

| MANIPULATION OF FUNCTION KEYS | FUNCTIONS OF CORRESPONDING GENERAL KEYBOARD |
|---|---|
| OTHER MODE → 英数 | 英数 (ENGLISH INPUT MODE) |
| ENGLISH INPUT MODE → 英数 | 英数 (NUMERIC INPUT MODE) |
| Shift + 英数 | Caps Lock |
| Alt + 英数 | Tab |
| OTHER MODE → かな | ひらがな |
| HIRAGANA MODE → かな | カタカナ |
| Shift + かな | 半角/全角 |
| Alt + かな | Alt + 半角/全角 (ON/OFF OF JANPANESE INPUT SYSTEM) |
| BS | Back Spase |
| Shift + BS | Del |
| Alt + BS | Esc |
| ← | ← |
| Alt + ← | Home |
| → | →、(CONFIRMATION OF KEY WHEN ENGLISH CONSONANTS IN THE SAME KEY HAVE TO BE INPUTTED IN SUCCESION) |
| Alt + → | End |
| ↑ | ↑、前候補 |
| Alt + ↑ | Page Up |
| ↓ | ↓、次候補 |
| Alt + ↓ | Page Down |
| ⏎ | Enter、⏎ |
| Alt | 無変換 |
| Alt + OTHER KEY | (SWITCHING OF THE FUNCTIONS ON THE LOWER SIDE, SYMBOL INPUT) |
| Shift | Spase、変換、次候補 |
| Shift + OTHER KEY | (SWITCHING OF THE FUNCTIONS ON THE UPPER SIDE, NUMERIC INPUT, CAPITAL/SMALL LETTER OF ENGLISH) |

FIG.37

RELATIONSHIP OF KANA INPUT MODE
AND GENERAL BOARD'S MANIPULATION

| MAIN KEY MANIPULATION | KANA MODE(HIRAGANA,KATAKANA) | | |
|---|---|---|---|
| | INDEPENDENTLY INPUTTED | WITH Shift HELD DOWN | WITH Alt HELD DOWN |
| A | 「A」 | 「7」 | 「(」 |
| A 2 STROKES | 「A A」、「ー」 | 「7 7」 | 「)」 |
| A 3 STROKES | 「A ー」 | 「7 7 7」 | NOT INPUTTED |
| I | 「I」 | 「8」 | 「「」 |
| I 2 STROKES | 「I I」 | 「8 8」 | 「」」 |
| U | 「U」 | 「9」 | 「*」 |
| U 2 STROKES | 「U U」 | 「9 9」 | 「#」 |
| E | 「E」 | 「4」 | 「:」 |
| E 2 STROKES | 「E E」、「っ」 | 「4 4」 | 「;」 |
| E 3 STROKES | 「E っ」 | 「4 4 4」 | NOT INPUTTED |
| O | 「O」 | 「5」 | 「!」 |
| O 2 STROKES | 「O O」 | 「5 5」 | 「?」 |
| Y | 「Y」 | 「6」 | 「¥」 |
| Y 2 STROKES | 「W」 | 「6 6」 | 「$」 |
| Y 3 STROKES | 「X」 CAN BE INPUTTED WHEN FOLLOWED BY A VOWEL OR DOUBLE SOUND "っ" | 「6 6 6」 | NOT INPUTTED |
| K | 「K」 | 「1」 | 「@」 |
| K 2 STROKES | 「G」 | 「1 1」 | 「&」 |
| K 3 STROKES | 「F」 | 「1 1 1」 | NOT INPUTTED |
| S | 「S」 | 「2」 | 「/」 |
| S 2 STROKES | 「Z」 | 「2 2」 | 「%」 |
| S 3 STROKES | 「J」 | 「2 2 2」 | NOT INPUTTED |

FIG.38

RELATIONSHIP OF KANA INPUT MODE
AND GENERAL BOARD'S MANIPULATION

| MAIN KEY MANIPULATION | KANA MODE(HIRAGANA,KATAKANA) | | |
|---|---|---|---|
| | INDEPENDENTLY INPUTTED | WITH Shift HELD DOWN | WITH Alt HELD DOWN |
| [T] | 「T」 | 「3」 | 「+」 |
| [T] 2 STROKES | 「D」 | 「3 3」 | 「−」 |
| [T] 3 STROKES | 「V」 | 「3 3 3」 | NOT INPUTTED |
| [N] | 「N」、「ん」 | 「0」 | 「・」 |
| [N] 2 STROKES | 「ん」 | 「0 0」 | 「'」 |
| [N] 3 STROKES | 「ん N」 | 「0 0 0」 | NOT INPUTTED |
| [H] | 「H」 | 「,」 | 「、」 |
| [H] 2 STROKES | 「B」 | 「, ,」 | 「〜」 |
| [H] 3 STROKES | 「P」 | 「, , ,」 | NOT INPUTTED |
| [R] | 「R」 | 「.」 | 「。」 |
| [R] 2 STROKES | 「M」 | 「. .」 | 「=」 |
| [R] 3 STROKES | 「L」 CAN BE INPUTTED WHEN FOLLOWED BY A VOWEL OR DOUBLE SOUND "っ" "や" "ゆ" "よ" | 「. . .」 | NOT INPUTTED |

FIG. 39

INPUTTING OF LONG SOUND SYMBOL AND DOUBLE CONSONANT BY THE KEYS [A] AND [E]

| INPUTTING KEY | RELATIONS WITH OTHER KEYS | CHARACTERS INPUTTED ||||
|---|---|---|---|---|---|
| | | 1 STROKE | 2 STROKES | 3 STROKES | MORE THAN 4 STROKES |
| [A] | WHEN THERE IS NO PRECEDENT CHARACTER | 「A」 | 「AA」 | 「A―」 | REPETITION |
| | WHEN PRESSED AFTER ANOTHER VOWEL | 「A」 | 「―」 | 「A―」 | 〃 |
| | WHEN PRESSED AFTER A CONSONANT | 「A」 | 「AA」 | 「A―」 | 〃 |
| [E] | WHEN THERE IS NO PRECEDENT CHARACTER | 「E」 | 「EE」 | 「Eっ」 | 〃 |
| | WHEN PRESSED AFTER ANOTHER VOWEL | 「E」 | 「っ」 | 「Eっ」 | 〃 |
| | WHEN PRESSED AFTER A CONSONANT | 「E」 | 「EE」 | 「Eっ」 | 〃 |

RELATIONSHIP OF ENGLISH/NUMERIC INPUT MODE
AND GENERAL KEYBOARD'S MANIPULATION

| MAIN KEY MANIPULATION | ENGLISH INPUT MODE | | | NUMERIC INPUT MODE | |
|---|---|---|---|---|---|
| | INDEPENDENTLY INPUTTED | WITH Shift HELD DOWN | WITH Alt HELD DOWN | INDEPENDENTLY INPUTTED | WITH Alt HELD DOWN |
| A | 「a」 | 「A」 | 「(」 | 「7」 | 「(」 |
| A 2 STROKES | 「aa」 | 「AA」 | 「)」 | 「77」 | 「)」 |
| I | 「i」 | 「I」 | 「"」* | 「8」 | 「"」* |
| I 2 STROKES | 「ii」 | 「II」 | 「'」* | 「88」 | 「'」* |
| U | 「u」 | 「U」 | 「*」 | 「9」 | 「*」 |
| U 2 STROKES | 「uu」 | 「UU」 | 「#」 | 「99」 | 「#」 |
| E | 「e」 | 「E」 | 「:」 | 「4」 | 「:」 |
| E 2 STROKES | 「ee」 | 「EE」 | 「;」 | 「44」 | 「;」 |
| O | 「o」 | 「O」 | 「!」 | 「5」 | 「!」 |
| O 2 STROKES | 「oo」 | 「OO」 | 「?」 | 「55」 | 「?」 |
| Y | 「y」 | 「Y」 | 「¥」 | 「6」 | 「¥」 |
| Y 2 STROKES | 「w」 | 「W」 | 「$」 | 「66」 | 「$」 |
| Y 3 STROKES | 「x」 | 「X」 | NOT INPUTTED | 「666」 | NOT INPUTTED |
| K 2 STROKES | 「k」 | 「K」 | 「@」 | 「1」 | 「@」 |
| K 3 STROKES | 「g」 | 「G」 | 「&」 | 「11」 | 「&」 |
| K 3 STROKES | 「f」 | 「F」 | NOT INPUTTED | 「111」 | NOT INPUTTED |

RELATIONSHIP OF ENGLISH/NUMERIC INPUT MODE AND GENERAL KEYBOARD'S MANIPULATION

| MAIN KEY MANIPULATION | ENGLISH INPUT MODE ||| NUMERIC INPUT MODE ||
|---|---|---|---|---|---|
| | INDEPENDENTLY INPUTTED | WITH Shift HELD DOWN | WITH Alt HELD DOWN | INDEPENDENTLY INPUTTED | WITH Alt HELD DOWN |
| S | 「s」 | 「S」 | 「/」 | 「2」 | 「/」 |
| S 2 STROKES | 「z」 | 「Z」 | 「%」 | 「22」 | 「%」 |
| S 3 STROKES | 「j」 | 「J」 | NOT INPUTTED | 「222」 | NOT INPUTTED |
| T | 「t」 | 「T」 | 「+」 | 「3」 | 「+」 |
| T 2 STROKES | 「d」 | 「D」 | 「-」 | 「33」 | 「-」 |
| T 3 STROKES | 「v」 | 「V」 | NOT INPUTTED | 「333」 | NOT INPUTTED |
| N | 「n」 | 「N」 | 「'」* | 「0」 | 「'」* |
| N 2 STROKES | 「c」 | 「C」 | 「'」 | 「00」 | 「'」 |
| N 3 STROKES | 「q」 | 「Q」 | NOT INPUTTED | 「,」 | NOT INPUTTED |
| H | 「h」 | 「H」 | 「,」* | 「,,」 | 「,」* |
| H 2 STROKES | 「b」 | 「B」 | 「~」 | 「,,,」 | 「~」 |
| H 3 STROKES | 「p」 | 「P」 | NOT INPUTTED | 「.」 | NOT INPUTTED |
| R | 「r」 | 「R」 | 「.」* | 「.」 | 「.」* |
| R 2 STROKES | 「m」 | 「M」 | 「=」 | 「..」 | 「=」 |
| R 3 STROKES | 「l」 | 「L」 | NOT INPUTTED | 「...」 | NOT INPUTTED |

F I G. 42

RELATIONSHIP OF MAIN KEYS TO OTHER INPUTTING MODE

| OTHER MODES | Caps Lock | KEYS TO BE PRESSED | | |
|---|---|---|---|---|
| | | MAIN KEY ONLY | Shift +MAIN KEY | Alt +MAIN KEY |
| FULL-SIZE HIRAGANA | | FULL-SIZE HIRAGANA | FULL-SIZE NUMERAL | FULL-SIZE SYMBOL |
| FULL-SIZE KATAKANA | | FULL-SIZE KATAKANA | FULL-SIZE NUMERAL | FULL-SIZE SYMBOL |
| HALF-SIZE KATAKANA | | HALF-SIZE KATAKANA | HALF-SIZE NUMERAL | HALF-SIZE SYMBOL |
| FULL-SIZE ENGLISH CHARACTER | OFF | FULL-SIZE ENGLISH SMALL LETTER | FULL-SIZE ENGLISH CAPITAL LETTER | FULL-SIZE SYMBOL |
| FULL-SIZE ENGLISH CHARACTER | ON | FULL-SIZE ENGLISH CAPITAL LETTER | FULL-SIZE ENGLISH SMALL LETTER | FULL-SIZE SYMBOL |
| HALF-SIZE ENGLISH CHARACTER | OFF | HALF-SIZE ENGLISH SMALL LETTER | HALF-SIZE ENGLISH CAPITAL LETTER | HALF-SIZE SYMBOL |
| HALF-SIZE ENGLISH CHARACTER | ON | HALF-SIZE ENGLISH CAPITAL LETTER | HALF-SIZE ENGLISH SMALL LETTER | HALF-SIZE SYMBOL |
| FULL-SIZE NUMERAL | | FULL-SIZE NUMERAL | FULL-SIZE NUMERAL | FULL-SIZE SYMBOL |
| HALF-SIZE NUMERAL | | HALF-SIZE NUMERAL | HALF-SIZE NUMERAL | HALF-SIZE SYMBOL |

FIG.44
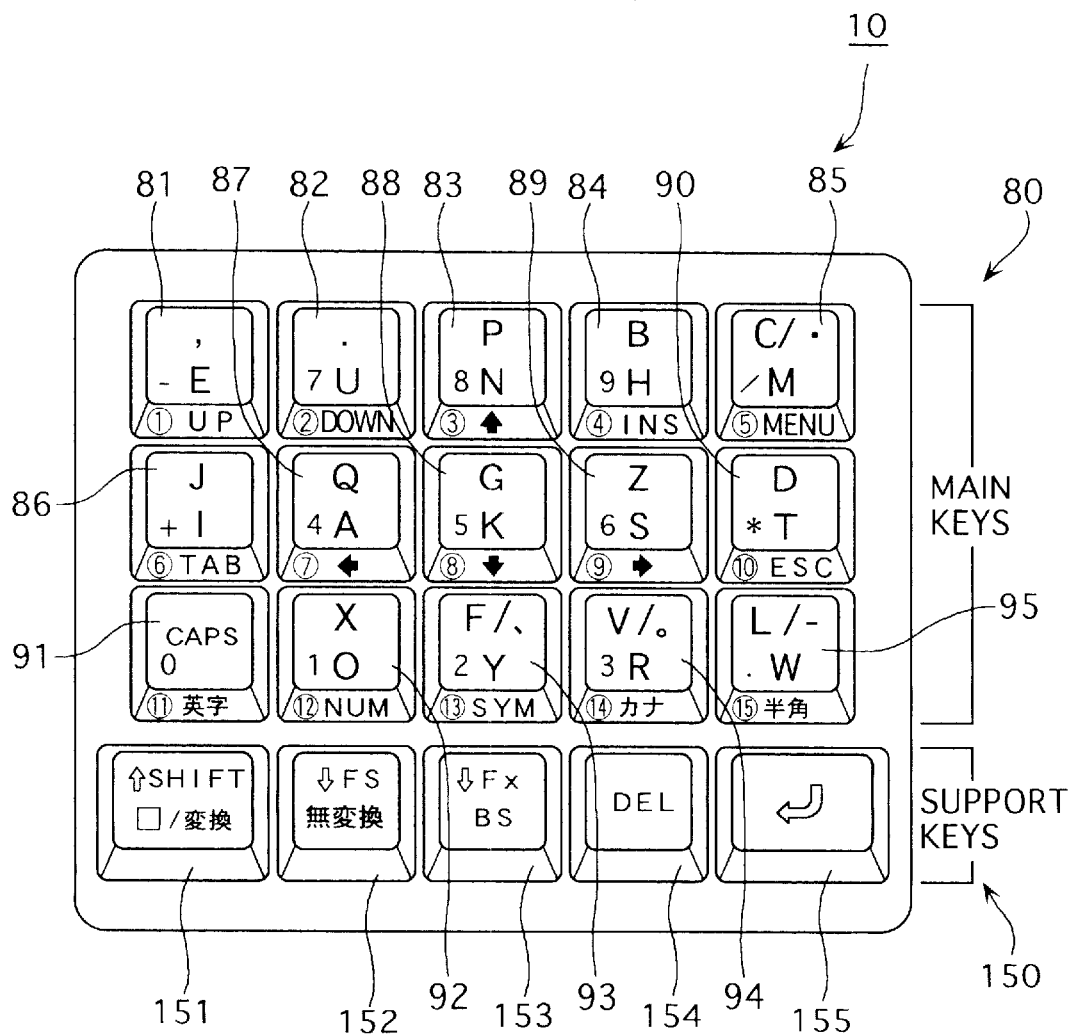
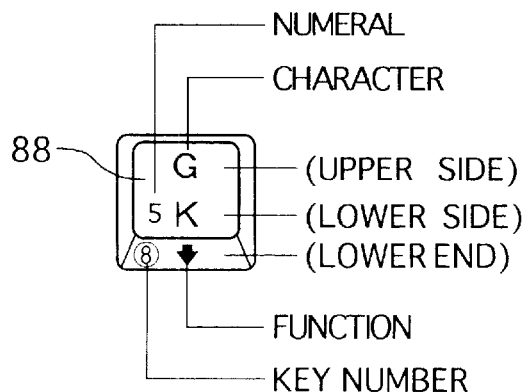

FIG.45
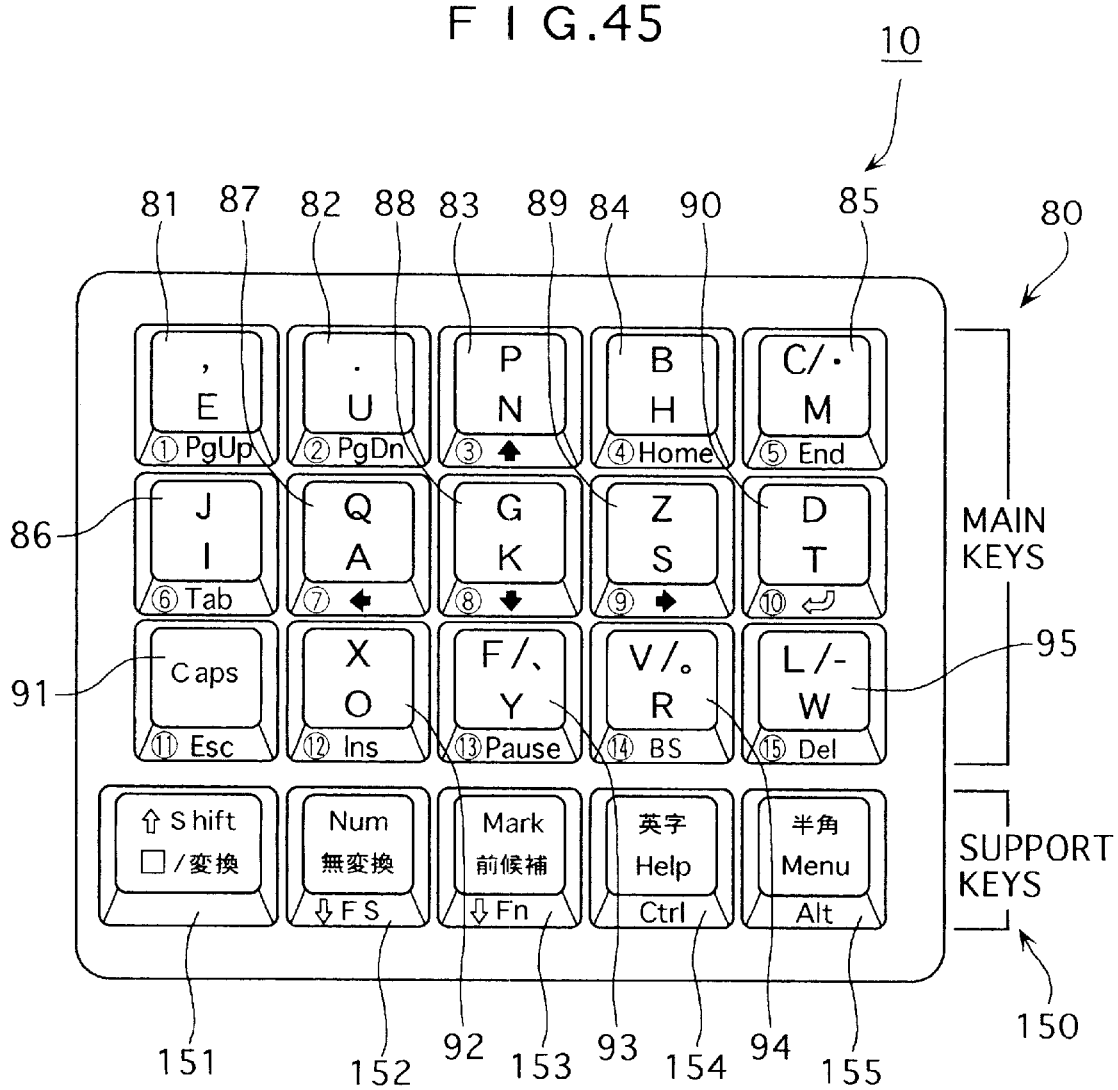
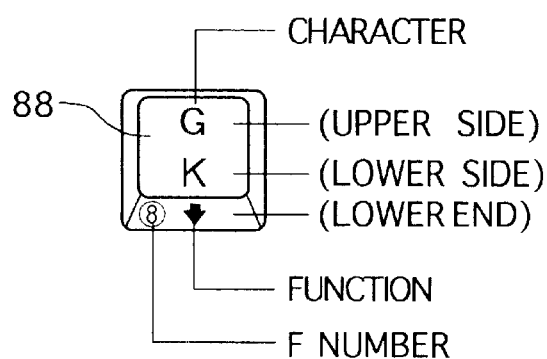

F I G.48
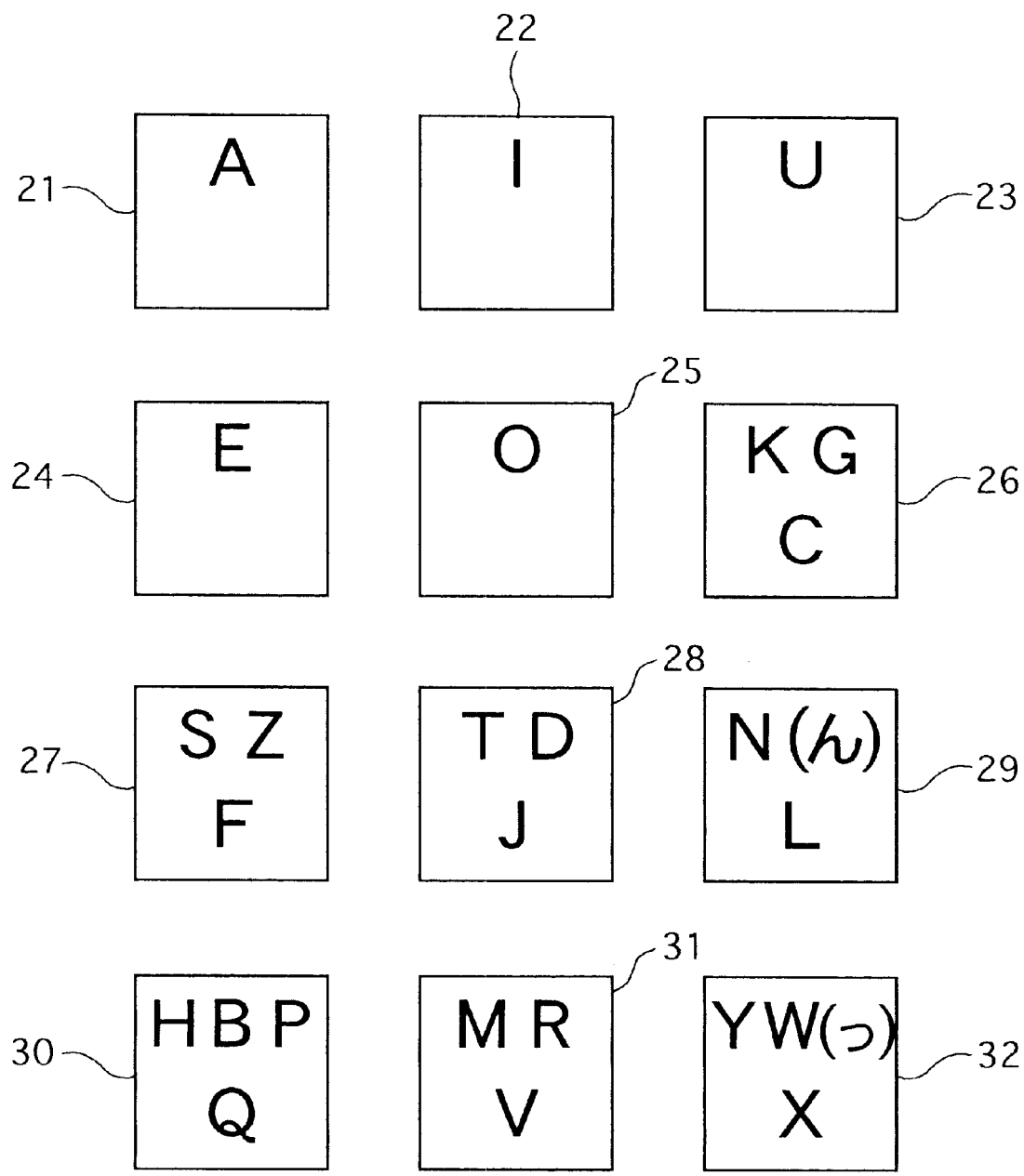

F I G.57
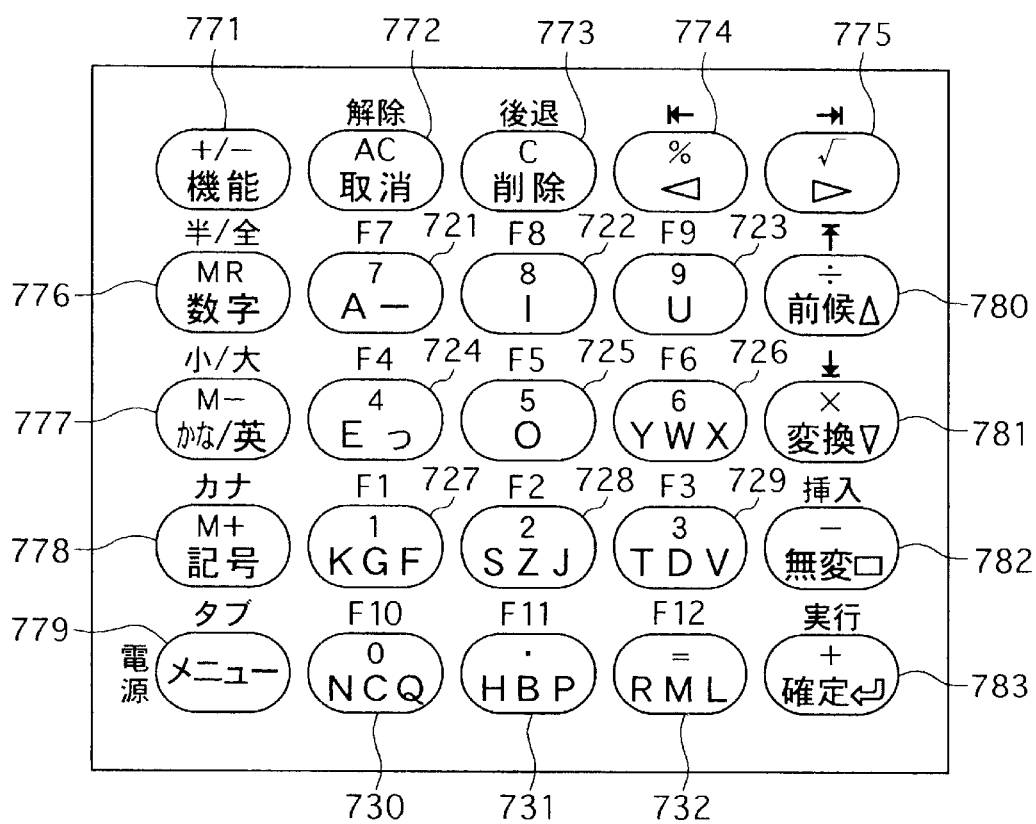

F I G.58
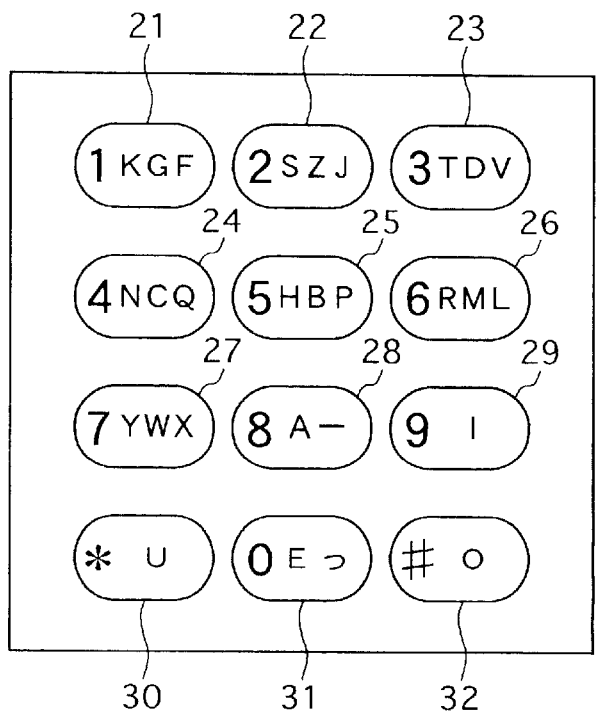
F I G.59
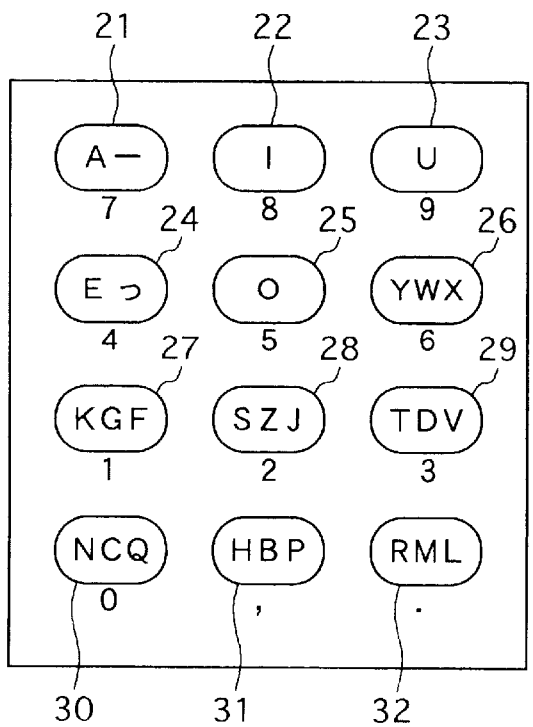

FIG. 64

⟨EXAMPLE OF INPUTTING A JAPANESE TEXT⟩

国境の長いトンネルを抜けると雪国であった。

| CHARACTER ARRANGEMENT | コ | ッ | キ | ョ | ウ | ノ | ナ | ガ | イ | ト | ン | ネ | ル | ヲ | ヌ | ケ | ル | ト | ユ | キ | グ | ニ | デ | ア | ッ | タ | NUMBER OF STROKES | RATIO |
|---|---|---|---|---|---|---|---|---|---|---|---|---|---|---|---|---|---|---|---|---|---|---|---|---|---|---|---|---|
| CONVENTIONAL TELEPHONE | 5 | 4 | 2 | 4 | 3 | 5 | ▲1 | 2 | 2 | 5 | 3 | 4 | 3 | 2 | 3 | 2 | 2 | 2 | 2 | 3 | 5 | ▲4 | 2 | 5 | 1 | 4 | 83 | 1.6 |
| CUT SYSTEM | 2 | 2 |  | 4 |  |  | 2 |  | 2 | 3 | 1 | 2 | 2 | 2 | 2 | 2 | 2 | 2 | 2 | 2 | 3 | ▲ | 2 | 3 | 1 | 2 | 52 | 1.0 |
| QWERTY SYSTEM | 2 |  | 5 |  |  | 2 |  |  | 2 | 2 | 1 | 2 | 2 | 2 | 2 | 2 | 2 | 2 | 2 | 2 | 2 | 1 | 2 | 2 | 1 | 3 | 46 | 0.9 |

NOTE ; ONLY CHARACTER INPUTS ARE COUNTED,
EXCLUDING PUNCTUATION AND CONVERSION OPERATION.

⟨EXAMPLE OF INPUTTING AN ENGLISH TEXT⟩

There is no smoke without fire.

| CHARACTER ARRANGEMENT | T | H | E | R | E | I | S | N | O | S | M | O | K | E | W | I | T | H | O | U | T | F | I | R | E | NUMBER OF STROKES | RATIO |
|---|---|---|---|---|---|---|---|---|---|---|---|---|---|---|---|---|---|---|---|---|---|---|---|---|---|---|---|
| CONVENTIONAL TELEPHONE | 1 | 2 | 2 | 2 | 3 | 3 | 3 | 2 | ▲3 | 3 | 1 | ▲3 | 2 | 2 | 1 | 3 | 1 | 2 | 3 | 2 | 1 | 3 | 3 | 2 | 2 | 57 | 2.0 |
| CUT SYSTEM | 1 | 1 | 1 | 1 | 1 | 1 | 1 | 1 | 1 | 1 | 1 | 2 | 1 | 1 | 2 | 1 | 1 | 1 | 1 | 1 | 1 | ▲1 | 1 | 1 | 1 | 29 | 1.0 |
| QWERTY SYSTEM | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 25 | 0.9 |

NOTE ; ONLY CHARACTER INPUTS ARE COUNTED,
EXCLUDING SWITCHING PROCESS OF CAPITAL/SMALL LETTERS,
INPUTTING OF SPACE AND PUNCTUATIONS.

KEYPAD

BACKGROUND OF THE INVENTION

1. Field of the Invention

The present invention relates to an apparatus for inputting Japanese or English and more particularly to a keyboard apparatus for performing input operation for a portable telephone such as PHS (Personal Handy-phone System), electronic notebook, wrist watch, small-sized word processor and personal computer.

2. Discussion of the Background

Information apparatus such as a personal computer is nowadays extensively used in offices and at home. Such information apparatus include desktop and laptop personal computers and PDAs.

Now the typical way of inputting characters with the PDAs is by means of a keyboard.

The most widely used keyboard inputting method is an input method utilizing the Alphabet. The Alphabet is widely utilized not only for inputting English but also Japanese by means of the Romanized Japanese Character input method since there are only 26 characters to memorize, enabling an operator to use the blind touch method.

Now a conventional keyboard consists of more than 80 keys arranged in a complicated manner, making it difficult to be miniaturized. Moreover, a plurality of keys have to be manipulated by both hands, making it difficult to acquire the input operation.

On the other hand, functions for inputting and storing data like addresses in telephones and wrist watches have been greatly improved and although much endeavors have been made with various kinds of apparatus requiring such miniaturization to reduce the number of keys in order to input Japanese and English characters, manipulation has not been very satisfactory.

For instance, keys or buttons of a portable telephone with a built-in address book function is usually provided with a function for inputting characters as well. More precisely, in order to input Japanese in "Katakana", a square type of the Japanese Syllabary, with a conventional portable telephone, numerals from "1" through "0" are used to input characters in the "ア行"/A Group/, "カ行"/KA Group/, "サ行"/SA Group/ and so on, up to the ラ行/Group, including the characters ワヲン (WA,WO and N) in the Japanese Syllabary arrangement of 50 sound syllables' order.

It is also configured in such a way that, when a key set to the "A Group" is pressed once, the character "A" is outputted, when pressed twice the character "I" is outputted, when pressed three times the character "U" is outputted, when pressed four times the character "E" is outputted, and when pressed five times the character "O" is outputted.

Furthermore, in order to input in English, seven keys are provided for the characters "ABC", "DEF", "GHI", "JKL", "MNO", "PQRS", "TUV" and "WXYZ" respectively, and the characters are selected and inputted corresponding to the number of pressing operations of a key.

This kind of conventional character arrangement however poses a problem in that Japanese "Kana" characters require maximum 5 times and English characters maximum 5 times of key pressing operations, making the input operation complicated and high-speed input impossible.

In particular, since the number of key pressing operations necessary for an input is determined without taking into consideration the frequency of usage of characters which necessitates on the average three to four times of key pressing operations when inputting a plurality of characters with the "Kana" or Alphabet, making the input operation cumbersome.

Moreover, it poses a problem that, although a long sound vowel key "つ"/t/, or a long vowel symbol ー are relatively frequently used in the Japanese language, it is necessary, in order to input the long sound vowel key "つ"/t/, to press a key in the "タ行"/TA Group/ three times to obtain a large character "つ"/T/ and then press a small character key to obtain a small character "つ"/t/, making the input operation more complicated, leading to reduction of efficiency of character input operation.

This kind of problem is not only limited to portable telephones but also to wrist watches with address- and schedule-keeping functions, and various types of electronic notebooks, and small-sized personal computers, where the number of keys are reduced to 12 to 15 in order to reduce the size of the apparatus.

SUMMARY OF THE INVENTION

An object of the present invention is to provide a keyboard input apparatus with the least number of keys, which is easy to learn, simple to operate and where number of key pressing operations are reduced, so as to facilitate the input operation, and which can also be easily miniaturized.

Moreover, a second object of the present invention is to provide, in addition to the aforementioned first object, a keyboard input apparatus where the frequently used long sound vowel key "つ"/t/ and the long vowel symbol "ー" can be easily inputted, wherebthe efficiency of character inputting operation can even more be improved.

The keyboard input apparatus of the present invention is characterized by the provision of 5 vowel keys and a plurality of consonant keys, the vowel keys being set independently for the characters "A", "I", "U", "E" and "O", expressing the vowels of the Alphabet, each of the consonant keys having a plurality of characters expressing the consonants, a key input detecting means for detecting the number of consecutive key pressing operations of each of the keys and a key input processing means for outputting character keys corresponding to the number of pressing operations of a particular key.

In such a keyboard input apparatus, the most frequently used vowels both in Japanese and English, namely, "A", "I", "U", "E" and "O" are set to independent keys, making it possible to input those characters by a single key operation. For this reason, the number of key pressing operations for inputting vowels can be reduced, and working efficiency can be improved and input operation can be speeded up, in comparison with the conventional Japanese Syllabary arrangement or the English character arrangement where vowels other than the vowel "A" need to be pressed a plural number of times to be inputted.

Moreover, since a plurality of consonants are set to each consonant key, it is possible to reduce the number of keys and minimize the size of the keyboard input apparatus compared with a keyboard apparatus of the prior art where one character is set to each key. Furthermore, due to lesser number of keys, it is easier to remember the key positions and is simpler to operate.

In addition, since a plurality of characters set in each key can be selected by the corresponding number of pressing operations of the key, a special key, such as a Shift key, can be eliminated for selecting the characters, resulting in the reduction of the number of keys and miniaturization of the apparatus is made possible. Furthermore, as the preset character keys can be selected by altering the number of key pressing operations, manipulation of the apparatus becomes more intuitive and easily comprehensible, contributing to the improvement of working efficiency.

The manipulation for the selection of character keys can be configured such that, by arranging the first to the Nth number of character keys on each of the keys, the key input processing means selects and outputs the Nth character keys when each key is pressed N number of times. More particularly, when a first and a second character keys are set to each of the keys, the key input processing means may be configured such that the first character key will be selected and outputted when the key is pressed once, and the second character key is selected and outputted when the key is pressed twice.

Setting the keyboard input apparatus in this manner facilitates the learning, and manipulation of the keyboard apparatus becomes simpler, since the number of the character keys and the number of key pressing operations required coincide in number.

The key input detecting means is preferably set so that the number of the key pressing operations already executed will be ignored when the key is pressed more number of times than the number designated for the key and recounts from the first key pressing operation.

For example, when a key set with 3 characters, is pressed 4 times, the first three pressing operations (number designated for the key) will be ignored and the remaining number, namely 1, will be registered.

By this way, the right character key can be selected by repetitious key pressing operations even if a character key is pressed a wrong number of times, resulting in an improvement of manipulation.

Moreover, the key input detecting means is preferably so set that the number of pressing operations of a key is confirmed the moment a key, other than the key just being pressed, is operated.

Since each key has to be pressed more than once, when a character key is to be selected and inputted, it is not possible, at the time the key is pressed once, to determine whether the key is going to be pressed once again or whether it has been the final key operation. For this reason it is preferable that the number of pressing operations of the precedent key be confirmed the moment a key other than the key just being pressed is operated.

By this configuration, it is possible to input a plurality of keys in succession, thereby improving the manipulation.

It is at the same time also possible to configure such that a special cursor moving key be set so that the key input detecting means confirms the number of pressing operations of the key, just been pressed, the moment the cursor moving key is operated.

Even if two character keys on a single key are to be inputted in succession and a different key cannot be inputted inbetween, it is still possible to input and confirm the characters with certainty if the cursor moving key is provided.

Again, the keyboard input apparatus is preferably so set that both the number of pressing operations of the consonant keys and inputting of the vowel keys are confirmed the moment a vowel key is pressed following a consonant key.

When Japanese is to be inputted by the Romanized character input method, keys are pressed basically in the order of "a consonant plus a vowel". For this reason, if the inputted characters can be confirmed the moment vowel keys are pressed, the cursor moving key operation can be eliminated, improving thereby the efficiency of manipulation.

On the one hand the keyboard input apparatus may also be arranged so that the number of pressing operations of the consonant keys are confirmed the moment another consonant key, a vowel key or the designated cursor moving key is pressed following a consonant key.

When English words are to be inputted, for instance, where no such a rule of "a consonant plus a vowel" exists as in the Romanized character input method, it may happen that two characters set on one single key have to be inputted in succession. In this case, the cursor-moving key may be utilized to confirm the characters. On the other hand, characters set to different keys need quite frequently to be inputted in succession also in English whereby the number of pressing operations will be increased if the characters have to be confirmed every time by the cursor moving key. Operability can thus be improved if a character input can be confirmed not only by pressing the cursor-moving key but also by pressing another consonant or a vowel key.

Moreover, the keyboard input apparatus of the present invention is characterized by having 12 keys, consisting of a matrix array of 4 vertical columns and 3 horizontal rows, five keys of which are designated as vowel keys for inputting the characters "A", "I", "U", "E" and "O", which are the Alphabet expressing the vowels, and the remaining 7 keys other than the vowels keys "A", "I", "U", "E" and "O", are designated as consonants keys where a plurality of consonants are set.

In such a keyboard input apparatus, Japanese can be inputted by the Romanized Japanese Character input method by pressing in turn the keys set for the consonants and the keys set for the vowels. For this reason, only 2 key pressing operations on the average are required for inputting in Japanese, whereby the operability and rapid inputting of characters can also be improved in comparison with the conventional Japanese Syllabary arrangement where 4 to 5 pressing operations on the average are required.

In this case it is preferable that the character keys of the Alphabet, "A", "I" and "U", expressing the vowels, be set to the 3 keys in the upper row and the character keys "E" and "O" be set to 2 of the 3 keys in the second row from the top.

In such a keyboard input apparatus, the character keys for inputting the most frequently used vowels both in English and Japanese, namely "A", "I", "U", "E" and "O" are set together in the upper two rows, making it easy to remember the positions of the frequently used vowels, thereby improving the operability.

In this case, it is preferable that the character keys for inputting the vowels "A", "I" and "U" be set to the three keys in the uppermost row from left to right in the order, and the character keys for inputting the vowels "E" and "O" be set to the two left keys in the second row from the top from left to right in the order.

When the vowels are placed in such an order, it is easy to remember the key layout and operability can thus be improved.

Moreover, three keys each of the remaining 21 consonants of the 26 Alphabet characters, namely, (K G F S Z J T D V N C Q H B P R M L Y W X), with exception of those which express the vowels, "A", "I", "U", "E" and "O", may be set to the 7 consonant keys, respectively.

Inputting of the 26 characters of the Alphabet can be realized by an extremely small number of keys, utilizing only 12 keys, consisting of 5 vowel and 7 consonant keys, thereby enabling to provide a small-sized, easy-to-carry keyboard input apparatus. Furthermore, since 3 characters are set to each of the 7 keys set for the consonants, any character can be inputted by pressing a key maximum three times because inputting of characters is actuated by pressing a key a number of times, whereby the operability can be improved and, furthermore, uniformly positioned consonant keys improve the balance of key inputting operation, contributing to a higher working efficiency. In addition, miniaturization of the keyboard input apparatus is made feasible due to only a small increase in the number of the keys.

In addition, arrangement of all the 26 characters of the Alphabet in this manner enables both to input English as well as Japanese by the Romanized character input method. In this way the Alphabet used for inputting both Japanese and English can be arranged in the same manner, making it easy to remember the key layout and thereby improving the operability.

It is again preferable that first character keys to input the characters "K", "S", "T" and "H" be set to the 4 of the 7 consonant keys respectively, and that second character keys to input the characters "G", "Z", "D" and "B" be set to the keys "K", "S", "T" and "H".

In the Romanized character input method the "G" key, which is used to input the Voiced sounds of the "ガ"" 行"/GA Group/, is set to the "K" key, which is used to input the "カ行"/KA Group/; the "Z" key, which is used to input the "ザ行"/ZA Group/, is set to the "S" key, which is used to input the "サ行"/SA Group/; the "D" key, which is used to input "ダ"" 行"/DA Group/, is set to the "T" key, which is used to input the "タ行"/TA Group/; and the "B" key, which is used to input the "バ行"/BA Group/, is set to the "H" key, which is used to input the "ハ行"/HA Group/. This arrangement allows the use of the same key for inputting the related Voiced and Voiceless sounds by altering, for instance, the number of key pressing operations, which simplifies and speeds up the input operation of the Voiced sounds.

It is also preferable that each character key be set to the 7 keys, set for the consonants, in the following combinations; "KGF", "SZJ", "TDV", "NCQ", "HBP", "RML" and "YWX".

Such an arrangement of characters allows in the Romanized character input method to set as first or second character keys the consonants, "K", "S", "S", "N", "H", "M", "Y", "R" and "W", which are used, in combination with the vowels, to form the characters of the "カ行"/KA Group/ through the "WA 行"/ワ group/, facilitating the input operation of the consonants of the Voiceless sounds which are most frequently used next to the vowels, thereby improving even more the operability. Moreover most frequently used characters can be inputted by one or two key pressing operations, improving the operability compared with the conventional art where 1 to 5 key pressing operations are required regardless of the frequency of usage of characters.

Furthermore, numeral keys for inputting numerals "1", "2", "3", "4", "5", "6", "7", "8", "9" and "0" may also be set to 10 of the 12 keys and a mode switching device may be provided which switches over the key input modes between the numeric input mode and the Character input mode.

If numeric keys are provided, numerals can be inputted as well as characters which enables inputting of addresses and telephone numbers particularly into portable telephones, wrist watches and address books of electronic notebooks, making it possible to input numerals, Japanese and English text with the least number of keys.

In other words, it is possible by utilizing only 12 keys to execute three input modes, such as Numeric Input Mode for inputting numerals and the like in the telephones, the Romanized Japanese Character input Mode, and English Input Mode, making it adaptable to many input modes, and a highly versatile keyboard input apparatus can be realized.

Moreover, since each numeral is set to a different key, it is possible to input each numeral with a single key pressing operation, improving manipulation and numeric input operation of various telephones, including portable telephones and facsimiles.

Moreover, since the numerals are arranged in a matrix array of 4 horizontal rows and 3 vertical columns, corresponding to the numeric arrangement of a push-button system of usual telephones, including in particular the portable telephones, electronic calculators and ten digit keyboards, making it easily adaptable to the telephones, facsimiles, electronic calculators and ten digit keyboards.

It is also preferable that the mode-switching key executes the function of switching over the 3 different input modes, Numeric Input Mode, Japanese Input Mode and English Input Mode. Provision of 3 modes enables numeric input for inputting numerals in the telephones, input of Japanese by means of the Romanized character input method and input of English, making it easily adaptable to many input situations and a highly versatile keyboard input apparatus can be realized. In addition, since the key layout is the same for both the Japanese and English inputting modes, it is easy to remember the positioning of each character, compared with the conventional Japanese Syllabary arrangement or alphabetically ordered English arrangement, thereby improving further the operability.

It is further preferable that a second character key for inputting the long vowel symbol "—" be set to one of the five keys set for the vowels.

It is furthermore preferable that a second character key for inputting the long sound vowel key "つ"/t/ be set to one of the five keys set for the vowels.

Setting the long vowel symbol "—", or the long sound vowel key "つ"/t/ as a second character key to a vowel key, set solely for the vowels, enables inputting of the long vowel symbol "—" and the long sound vowel key "t" with, for instance, only two key pressing operations, facilitating the input operation of in the Japanese language frequently used long vowel symbol "—" and the long sound vowel key "t".

In this case, it is preferable that the long vowel symbol " " and the long sound vowel key "t" be set to the "A" and "E" keys as second character keys. When Japanese is inputted by the Romanized character input method, it is seldom that the vowel "A" succeeds another vowel "A", or the vowel "E" succeeds another vowel "E", when compared with other vowels such as "I", "U" or "O". Hence, setting the long vowel symbol "—" and the long sound vowel key "t" to the keys set for the vowels "A" and "E" as second character keys enables inputting of the long vowel symbol "—" and the long sound vowel key "t" with ease by only two key pressing operations, thereby facilitating the input operation of in the Japanese language frequently used long vowel symbol "—" and the long sound vowel key "t", thereby improving further the input efficiency and operability.

More precisely, the key input processing means is characterized such that a vowel is outputted when the long sound vowel key is pressed once, and the long vowel symbol "—" is outputted when the long sound vowel key is pressed twice in succession, and a vowel and the long vowel symbol "—" are outputted as prescribed in the long sound vowel key in the order of "the vowel plus the long vowel symbol —" when the long sound vowel key is pressed three times in succession, In such a keyboard input apparatus, a second character key for inputting the long vowel symbol "—" is set to one of the 5 vowel keys for which vowels have been designated, and the long vowel symbol "—" will be outputted by a key input processing means when the long sound vowel key is pressed twice in succession, whereby the input operation of in Japanese frequently used long vowel symbol "—" can be facilitated and the character input efficiency can be improved.

Similarly, when the long sound vowel key is pressed three times in succession, the vowel and the long vowel symbol "—" are outputted by the key input processing means in the order of "the vowel plus the long vowel symbol —", thereby improving even further the character input efficiency.

Again, the key input processing means may also be characterized such that the vowel set in the long sound vowel key is outputted when the long sound vowel key is pressed once, and the vowels set in the long sound vowel key are outputted in succession in the order of "the vowel plus the vowel" when the long sound vowel key is pressed twice in succession and the vowel and the long vowel symbol "—" set in the long sound vowel key are outputted in the order of "the vowel plus the Long sound" when the long sound vowel key is pressed 3 times in succession.

In such a keyboard input apparatus, a second character key for inputting the long vowel symbol "—" is set to one of the 5 vowel keys for which vowels have been set, and the vowel and the long vowel symbol "—" are outputted by the key input processing means in the Japanese language frequently used order of "a vowel plus the long vowel symbol" when the long sound vowel key is pressed three times in succession, thereby improving the character input efficiency.

Further, whether the long vowel symbol "—" or "a vowel plus a vowel" should be inputted when the long sound vowel key is pressed twice in succession, will have to be decided by the operator, taking into consideration the frequency of the two vowels being inputted in succession and either of the inventions should be selected.

Again it is preferable that the key input processing means is configured such that a vowel set to a vowel key and a vowel set to the long sound vowel key are outputted in the order of "the vowel plus the vowel set to the long sound vowel key" when the long sound vowel key is pressed once after pressing one of the four keys other than the long sound vowel key; a vowel and the long vowel symbol "—" are outputted in the order of "the vowel plus long vowel symbol —" when the long sound vowel key is pressed twice in succession after pressing one of the four vowel keys other than the long sound vowel key; and a vowel set to a vowel key, a vowel set in the long sound vowel key, and the long vowel symbol "—" are outputted in the order of "the vowel set in the vowel key plus the vowel set in the long sound vowel key plus the long vowel symbol —"

Even in such a case, a word including the long vowel symbol "—" can be easily outputted by two or three pressing operations of the long sound vowel key after a single pressing operation on one of the 4 vowel keys other than the long sound vowel key, attributing to an improvement of input efficiency.

Again it is preferable that the input process means be configured such that a consonant set in the consonant key, and a vowel set in the long sound vowel key are outputted in the order of "the consonant plus the vowel" when the long sound vowel key is pressed once after the consonant key; a consonant set in the consonant key, and vowels set in the long sound vowel key are outputted in the order of "the consonant plus the vowel plus the vowel" when the long sound vowel key is pressed twice in succession after the consonant key; and that a consonant set in the consonant key, and a vowel set in the vowel key and the long vowel symbol "—" are outputted in the order of "the consonant plus the vowel plus the long vowel symbol —" when the long sound vowel key is pressed three times in succession after the consonant key.

For instance, when the "A" key is designated to be the long sound vowel key, and a certain consonant key is pressed to output the character "W" and then the "A" key is pressed successively, it will give "W plus A", inputting the character "z,15 "/WA/.

When the "A" key is pressed twice in succession it will give "W plus W plus A", inputting the characters " "/WAA/. Further, when the character "A" is pressed three times in succession, it will give "W plus A plus the long vowel symbol "—", inputting the characters "わわ—"/WA "—"/.

In this manner, not only Japanese can be inputted by the Romanized character input method utilizing "a consonant plus a vowel" combination, but the long vowel symbol"—" can also be added to it when the long sound vowel key is pressed only three times following a consonant key, facilitating the input manipulation for characters with the long vowel symbol and input efficiency can be improved also from this standpoint.

Particularly, the long vowel symbol "—" never succeeds a consonant but always a vowel in usual Japanese. Taking this point into consideration, the apparatus is set in such a way that the long vowel symbol "—" is inputted when the vowel key is pressed twice in succession after another vowel, whereas "a consonant plus a vowel plus a vowel" are inputted when the long sound vowel key is pressed twice in succession after a consonant, improving character input operation in Japanese.

When one of the 5 vowel keys is designated as the double consonant vowel key for inputting the long sound vowel key "つ"/t"/ as a second character key, the key input apparatus may also be configured such that the key input processing means outputs a vowel when the double consonant vowel key is pressed once, and outputs the long sound vowel key "つ"/t/ when the double consonant vowel key is pressed twice in succession, and outputs a vowel and the long sound vowel key in the order of "the vowel plus the double consonant" when the double consonant vowel key is pressed three times in succession.

Such a keyboard input apparatus is set with a second character key for inputting the long sound vowel key "つ"/t/ in one of the 5 vowel keys where vowels are set, and the long sound vowel key "っ"/t/ is outputted by the key input processing means, when the double consonant vowel key is pressed twice in succession, facilitating the input operation of in the Japanese language frequently used long sound vowel key "っ"/t/, thereby improving the character input efficiency.

Similarly, a vowel and the long sound vowel key "っ"/t/ are outputted by the key input processing means in the Japanese language frequently used order of "a vowel plus the long sound vowel key" when the double consonant vowel key is pressed three times in succession, thereby improving further the character inputting efficiency.

Moreover, the present invention is characterized in that the key input processing means outputs a vowel set to the double consonant vowel key when the double consonant vowel key is pressed once; outputs two vowels set to the double consonant vowel key as "the vowel plus the vowel" when the double consonant vowel key is pressed twice in succession; and outputs a vowel and the long sound vowel key "っ"/t/ set in the double consonant vowel key in the order of "the vowel plus the double consonant "when the double consonant vowel key is pressed three times in succession.

Such a key input apparatus is set with a second character key for inputting the long sound vowel key "っ"/t/ in one of the 5 vowel keys, and a vowel and the long sound vowel key "っ"/t/ will be outputted by the key input processing means when the double consonant vowel key is pressed three times in succession in the Japanese language frequently used order of "the vowel plus the long sound vowel key", facilitating the character input effciency.

Furthermore, whether the long sound vowel key "っ"/t/, or "a vowel plus a vowel" are to be inputted, when the double consonant vowel key is pressed twice in succession, should be decided by taking into consideration how often the vowels set in the vowel keys, where the long sound vowel key is set, are inputted in succession, and either of the inventions should be selected.

Again, the key input processing means is preferably configured such that when the double consonant vowel key is pressed once after pressing one of the four vowel keys other than the double consonant vowel key, that the vowel set to the vowel key, and the vowel set to the double consonant vowel key, are outputted in the order of "the vowel plus the vowel, set to the double consonant vowel key"; and when the double consonant vowel key is pressed twice in succession after pressing one of the four vowel keys other than the double consonant vowel key, that the vowel set to the vowel key and the long sound vowel key "t"/っ/ are outputted in the order of "the vowel plus the long sound vowel key"; and when the double consonant vowel key is pressed three times in succession after pressing one of the four vowel keys other than the double consonant vowel key, that the vowel set to the vowel key, and the vowel set to the double consonant vowel key and the long sound vowel key "t"/っ/ are outputted in the order of "the vowel plus the vowel, set to the double consonant vowel key, plus the long sound vowel key".

Even in such a case, a word including the long sound vowel key "っ"/t/ can be outputted when the double consonant vowel key is pressed twice or three times in succession after pressing one of the four vowel keys other than the double consonant vowel key, attributing to the improvement of character input efficiency.

Moreover, the keyboard input apparatus is preferably configured such that, when a plurality of consonant keys are set with the characters expressing the 21 consonants of the Alphabet other than the five keys set for the vowels, that the key input processing means outputs a consonant set to a consonant key, and a vowel set to the double consonant vowel key, in the order of "the consonant plus the vowel", when the double consonant vowel key is pressed once after pressing the consonant key; and outputs a consonant set to the consonant key, and a vowel set to the double consonant vowel key in the order of "the consonant plus the vowel plus the vowel", when the double consonant vowel key is pressed twice in succession after pressing the consonant key; and outputs a consonant set to the consonant key, and the vowel and the long sound vowel key "t" set to the double consonant vowel key and the long sound vowel key "t" in the order of "the consonant plus the vowel plus the long sound vowel key", when the double consonant vowel key is pressed three times in succession after pressing the consonant key.

In this case the key input apparatus may also be set such that a consonant set to the consonant key, and a vowel and the double consonant "t" set to the double consonant vowel key are outputted in the order of "the consonant plus the vowel plus the vowel plus the double consonant" when the double consonant vowel key is pressed four times in succession after pressing a consonant key.

For example, when the key "E" is to be designated as the double consonant vowel key, and when any one of the consonant keys is pressed to select the character "N", and then the "E" key is pressed in succession, it gives "N plus E", inputting as a result the character "ね"/NE/. Now, when the "E" key is pressed twice in succession, it gives "N plus E plus E", inputting the characters "ねえ"/NEE/. Further, when the "E" key is pressed 3 times in succession, it gives "N plus E plus っ(t)", inputting the characters "ねっ"/NE っ/t/

Now, when the processing means is set also for four key pressing operations, and when the "E" key is pressed four times in succession, it gives "N plus E plus E plus っ/t/", inputting the characters " ねえっ"/NEE っ/t/.

In this way, not only can Japanese text be inputted by the Romanized character input method by means of "a consonant plus a vowel" combination by pressing consecutively the double consonant vowel key, but also the long sound vowel key "t" can be added thereto, enabling to input characters including the long sound vowel key with ease, thereby improving the input efficiency also from this standpoint.

Particularly, a consonant is never succeeded by the double consonant "t" but by a vowel in generally used Japanese. Taking this into consideration, the long sound vowel key "t" is arranged to be inputted when the double consonant vowel key is pressed twice in succession after pressing another vowel, whereas "a consonant plus a vowel plus Vowel" are outputted when the double consonant vowel key is pressed twice in succession after a consonant key, so that the Romanized character input method can be most advantageously utilized, thereby improving the Japanese character input efficiency.

Moreover, if the apparatus is set, in consideration of the frequency of usage of character arrangement in Japanese, in such a way that the characters are inputted in the order of "a consonant plus a vowel plus a vowel plus the long sound vowel key" when the double consonant vowel key is pressed four times in succession after pressing a consonant key, characters including a vowel and the long sound vowel key can be inputted even more easily, thereby improving the character input efficiency.

Moreover, it is preferable that the key input processing means be configured such that the character "N" is outputted when a consonant key set for the character "N" is pressed once; the character "ん" is outputted when the consonant key set for the character "N" is pressed twice in succession; and the character "ん" and the character "N" are outputted in the order of "ん plus N", when the consonant key, set for the character "N", is pressed three times in succession.

In this manner, by setting the Nasal sound "ん" to the "N" key, input operability and character input efficiency, can be improved. Particularly, in consideration of the fact that "N plus ん" are never used in this order in the Romanized character Input Mode, the apparatus is so set that "ん plus N" are outputted in this order when the key is pressed three times in succession, thereby facilitating inputting of characters including the Nasal sound, improving thereby even more the character input efficiency.

Moreover, it is preferable that the keyboard input apparatus be provided with a main area, consisting of 5 vowel keys and a plurality of consonant keys, and a function key area, consisting of a plurality of function keys arranged on the upper part, right side and lower side of the main key area in the form of the character C.

Placing of various function keys around the frequently used main keys for character inputting operation, enables the operator to move fingers from the main keys to the various function keys, thereby improving the operability even more.

In this case, it is preferable that a shifting function for inputting characters and functions, set in a shift condition of each key, a conversion function for converting unconfirmed characters into Chinese Characters, a space inputting function for inputting space be set to one of the function keys, and that the shift function key performs its functions when another vowel key, consonant key or function key are pressed during and after a certain period of time of the pressing operation of the function key, and that the conversion function key performs its function when the function key is pressed and then released independently before the characters inputted in the Japanese input mode are confirmed, and that the Space input function key performs its function when the function key is pressed independently.

Since it is possible to set three functions, namely Shift function, Conversion function and Space input function to one single function key, the number of keys can accordingly be reduced, improving at the same time the operability.

BRIEF DESCRIPTION OF DRAWINGS

FIG. 2 is a plan view of a key arrangement of the keyboard input apparatus of the foregoing first embodiment.

FIG. 4 is a diagram showing an example of key inputs manipulation used to input Japanese in the first embodiment.

FIG. 5 is a diagram showing an example of key input manipulation used to input English in the first embodiment.

FIG. 6 is a diagram showing an example of keyboard input manipulation used to input English in the first embodiment.

FIG. 16 is a diagram showing an example of key input manipulation used to input Japanese in the sixth embodiment.

FIG. 17 is a diagram showing an example of key input manipulation used to input symbols in the sixth embodiment.

FIG. 18 is a diagram showing an example of key input manipulation used to input functions in the sixth embodiment.

FIG. 19 is a diagram showing an example of key input manipulation used to input English in the sixth embodiment.

FIG. 22 is a diagram showing an example of key input manipulation used to input Japanese in the seventh embodiment.

FIG. 23 is a diagram showing an example of key input manipulation used to input English in the seventh embodiment.

FIG. 24 is a diagram showing an example of key input manipulation used to input English in the seventh embodiment.

FIG. 27 is a diagram showing an example of key input manipulation used to input Japanese in the eighth embodiment.

FIG. 28 is a diagram showing an example of key input manipulation to input Japanese utilizing a long vowel symbol vowel key of the eighth embodiment.

FIG. 29 is a diagram showing an example of key input manipulation to input Japanese utilizing a double consonant vowel key of the eighth embodiment.

FIG. 30 is a diagram showing an example of key input manipulation to input symbols in the eighth embodiment.

FIG. 31 is a diagram showing an example of key input manipulation to input functions in the eighth embodiment.

FIG. 32 is a diagram showing an example of key input manipulation used to input English in the eighth embodiment.

FIG. 36 is a table showing the functions of a normal keyboard corresponding to the function keys of the ninth embodiment.

FIG. 37 is a table showing input operation in "Kana" mode of the ninth embodiment.

FIG. 38 is a table showing input operation in "Kana" mode of the ninth embodiment.

FIG. 39 is a table showing input operation of the long sound vowel key and the double consonant vowel key of the ninth embodiment.

FIG. 40 is a table showing input operation of the English- and Numeric Mode of the ninth embodiment.

FIG. 41 is a table showing input operation of the English- and Numeric Mode of the ninth embodiment FIG. 42 is a table showing Input Processing response of the main keys in each input mode of the ninth embodiment.

FIG. 44 is a plan view showing a key layout of the keyboard input apparatus of other embodiment of the present invention.

FIG. 45 is a plan view showing a key layout of the keyboard input apparatus of other embodiment of the present invention.

FIG. 48 is a plan view showing a key layout of the keyboard input apparatus of other embodiment of the present invention.

FIG. 57 is a plan view showing another key layout of the main part of the keyboard input apparatus of FIG. 55.

FIG. 58 is a plan view showing a key layout of the main part of the keyboard input apparatus of another embodiment of the present invention.

FIG. 59 is a plan view showing a key layout of the main part of the keyboard input apparatus of other embodiment of the present invention.

FIG. 64 is a table comparing the number of key pressing operations for inputting Japanese and English.

DETAILED DESCRIPTION OF THE PREFERRED EMBODIMENT

In order to explain the present invention more in detail, explanations will be given with reference to the accompanying drawings.

Figure 1:
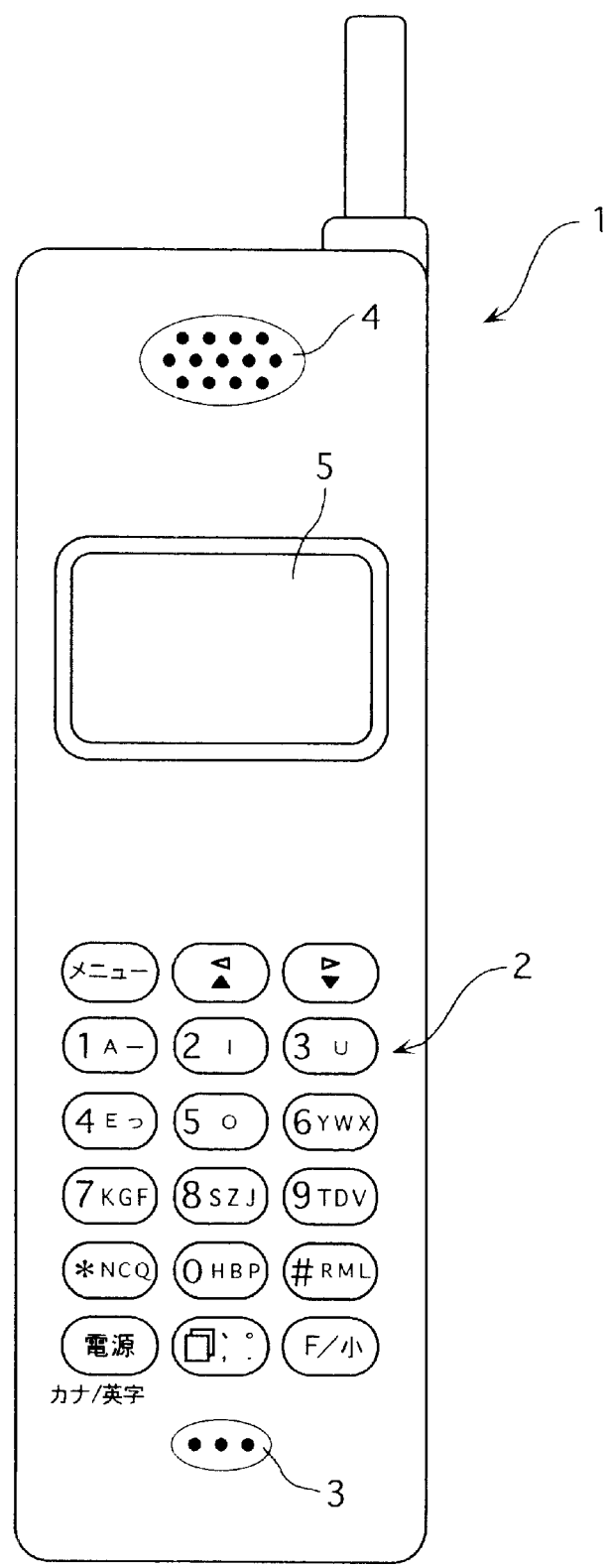
FIG. 1 is a front view of a portable telephone adapted for a keyboard input apparatus of a first embodiment of the present invention.

Hereunder is described a first embodiment of the present invention with reference to the attached drawings. The present embodiment is used, as shown in FIG. 1, as a keyboard input apparatus 2 of a portable telephone 1. The portable telephone 1 is provided with a microphone 3, a speaker 4 and a liquid crystal display 5, together with a keyboard input apparatus (key inputting section), arranged with a plurality of keys.

As shown in FIG. 2, the keyboard input apparatus 2 comprises 18 keys in total, arranged in a matrix array of 6 horizontal rows and 3 vertical columns, and main keys for inputting numerals and characters arranged in the middle part thereof, consisting of keys 21 through 32, totaling 12 keys, placed in 4 horizontal rows and 3 vertical columns. 6 keys in the upper and bottom rows constitute function keys 51 through 56.

Characters and various functions are set to the main keys 21 through 32 and the function keys 51 through 56.

More precisely, numeric keys used for inputting telephone numbers, for instance, are set on the left side of each of the key tops of the main keys 21 through 32 and characters such as the Alphabet, used for inputting English or Japanese by the Romanized character input method are set on the right side.

Here, the characters of the foregoing main keys 21 through 32 are arranged in such a way that the vowel keys are set in the uppermost row, and the consonant keys, which are used in the Romanized character input mode for inputting the characters in the "か行"/KA Group/ through the "わ行"/WA Group/ in combination with the foregoing vowel keys, are arranged from the uppermost row downwards in the corresponding order.

One of the characteristics of the present invention is the adoption of the Romanized character input method although conventional portable telephones utilize the KANA input method based on the Japanese Syllabary arrangement of 50 sound symbols order.

The Romanized character input method with lesser number of characters compared with the conventional Japanese Syllabary is particularly simpler in manipulation for portable telephones and the like with only a small number of keys, and the fact that a majority of users utilize nowadays the Romanized characters for inputting Japanese with their personal, computers make it easily acceptable to the public.

Moreover, the Romanized Japanese Character Input Method has certain rules regards frequency of character usage where the vowels are most frequently used, followed by the consonants "K, S, T, N . . ." corresponding to the order of the Japanese Syllabary.

Consequently, the vowel keys are set together in the present invention in the main keys 21 through 25 in the uppermost row, and the consonant keys 26 through 32 are arranged underneath thereof in the order of frequency of usage, making it easier to remember and simpler to input.

More specifically, a telephone can be manipulated by setting the following numerals to the keys 21 through 32: numeral "1" to the key 21; numeral "2" to the key 22; numeral "3" to the key 23; numeral "4" to the key 24; numeral "5" to the key 25; numeral "6" to the key 26; numeral "7" to the key 27; numeral "8" to the key 28; numeral "9" to the key 9; the symbol "*" to the key 30; numeral "0" to the key 31; and the symbol "#" to the key 32.

Further, characters expressing the vowels "A", "I", "U", "E" and "O" are set as first character keys to the keys 21 through 25, respectively.

This character arrangement takes into consideration the facility of learning, and the characters "A", "I", "U", "E" and "O" are arranged from left to right, and from the first row down to the second row.

On the other hand, consonant keys "K","S", "T", "N", "H" and "R", expressing the Japanese consonants, are set as first character keys to each of the keys 27 through 32 and the consonant key "Y" is set to the key 26. This key layout takes into consideration that the consonants of the "か行"/KA Group/, "さ行"/SA Group/, "た行"/TA Group, "な行"/NA Group/, "は行"/HA Group, "ら行"/RA Group/ and "や行"/YA Group can be arranged approximately in the order of "アカサタナ"/A,KA,SA,TA,NA and so on/of the Japanese Syllabary arrangement.

Further, the consonants "M" and "W" are set as second character keys to the keys 32 and 26. This arrangement takes into consideration that the remaining "ま行"/MA Group and "わ行"/WA Group/ can be arranged side by side.

Moreover, the keys "G", "Z", "D" and "B" are set as second character codes to the keys 27 through 29. More specifically, the consonants "G", "Z", "D" and "B" for inputting the "が行"/GA Group/, "ざ行"/ZA Group/, "だ行"/DA Group and "ば行"/BA Group are arranged so as to correspond to the consonants "K", "S", "T" and "H" for inputting voiceless sound of the "か行"/KA Group, "さ行"/SA Group, "た行"/TA Group" and "は行"/HA Group, whereby voiceless sound and voiced sound can be arranged to correspond to each other.

Further, the character "P" for inputting the "ば行"/PA Group/ is arranged as a third character code on the key 31 where the characters "H" and "B" for inputting the "は行"/HA Group/ and "ば行"/BA Group/ are set, thereby facilitating inputting of the "ば行"/PA Group and operability can be improved.

Moreover, the long vowel symbol "—" and the long sound vowel "つ"/t/ are set respectively as second character codes on the vowel keys 21 and 24 where the characters "A" and "E" are set. In other words, since the characters "A" and "E" are hardly ever used in succession, the keys 21 and 24 are set to input the long vowel symbol "—" and the long sound vowel key "t" when pressed twice in succession.

Again, the characters "X", "F", "J" and "V" are set as third character keys to the keys 26 to 29.

In addition, the character "C" is set as a second character key and character "Q" is set as a third character key to the character key 30.

Consequently, as regards the 26 characters of the Alphabet, 5 of the 12 keys, namely, 21 through 25, are set independently for the vowels "A", "I", "U", "E" and "O", and the remaining 21 characters are set to each of the keys 26 through 32 in groups of three. More specifically, the characters "YWX" are set to the key 26; "KGF" to the key 27; "SZJ" to the key 28; TDV" to the key 29; "NCQ" to the key 30; "HBJ" to the key 31; and "RML" to the key 32.

On the other hand, in addition to the various functions for the telephone, functions for inputting characters are also set to the function keys 51 through 56.

More precisely, a menu function for displaying menus and the like for switching the character input mode into the numeric input mode (standard), Japanese input mode and English input mode are set to the key 51. Further, it can be switched into the Japanese "かな"/KANA input mode or English input mode by utilizing an power switch when the mode switching menu is displayed by the menu key 51.

Moreover, a cursor moving key (cursor key) is set to the keys 52 and 53. The cursor moving key is used not only for moving the cursor (for setting the character input position) but also for confirming a character input in the English input mode.

Further, a Japanese comma "、", a Japanese period "。", an alphabetical comma "," and a period "." are set to the function key 55. Basically, the apparatus is so set in the Japanese input mode that the comma "、" is inputted when the key 55 is pressed once, and the period "。" is inputted when the same is pressed twice. Further, in the English input mode, the comma "," is inputted when the key 55 is pressed once, and the period "." is inputted when the same is pressed twice.

Furthermore, a Small letter function is set into the function key 56 for converting inputted vowels and characters "ヤ"/YA, "ユ"/YU and "ヨ"/YO, into small characters "ア", "イ", "ウ", "エ", "オ", "ヤ", "ユ", and "ヨ" or converting the characters of the Alphabet into small letters.

Next will be described the input processing function of the keyboard apparatus 2 with the above mentioned keyboard layout referring to the block diagram shown in FIG. 3.

First, a key input detecting means 101 detects whether any of the keys 21 through 32, and keys 51 through 56 has been pressed or not. For instance, an input can be checked by executing a timer interruption at a certain cycle(e.g. 1–10 m/s) and check an I/O port, attributed to each of the keys 21 through 32 and keys 51 through 56.

When it is judged that the input is invalid, the timer interruption is to be repeated at a certain cycle and an input is to be awaited. If it is judged, on the other hand, that the input is valid, the input will be processed at the key input processing means 102.

It must be noted that it is also made possible by use of the key input detecting means 101 to check how many times each one of the keys 21 through 32 has been pressed in succession.

In this case the key input detecting means 101 is set so that when the keys 21 through 32 are pressed more number of times than the numbers designated for the keys, the number of key pressing operations of the keys 21 through 32 will be re-counted from the first key pressing operation by ignoring the number of key pressing operations already executed.

For instance, when a key set with a first through a third character keys is pressed four times in succession, three (number of key pressing operations designated for the key) out of four times will be ignored and the remaining one key operation is registered.

The key input detecting means 101 is set in this manner so that a consecutive pressing of a key enables the selection of the correct key even when the key is pressed a false number of times, contributing thereby to improve manipulation.

Again, the key input detecting means 101 is set in such a way that the aforementioned number of key operation is confirmed the moment a key, other than the key just being pressed, is operated.

More precisely, since each of the keys 21 through 32 has to be pressed more than once when a character key is to be selected and inputted, it is not possible, at the time the key is pressed once, to distinguish whether the key is going to be pressed once again or whether it has been the final key operation. For this reason the number of pressing operations of the precedent key is set to be confirmed the moment a key other than the key just being pressed is operated.

It must be added that the mode switching means 103 will be actuated and the input mode for the key input processing means 102 will be set when the menu key 51 and "KANA"/English selection key 54 is operated.

The key input processing means 102 processes such that the prescribed numerals and characters are outputted corresponding to the selected input mode and key inputted. The outputted numerals and characters will be exhibited on a liquid crystal display via display control means 104.

Output processing means for numerals and characters of the key input processing means 102 will be described in further detail hereunder.

First, when the input mode is set for the numeric input mode, the input processing means 102 outputs the numerals set in the keys 21 to 32 when the keys 21 through 32 are operated. Consequently, when a telephone is ready for transmission, the telephone can be operated by inputting a telephone number, and when it is in the state of inputting a telephone number from the address book, the telephone number can be inputted and registered.

Moreover, when Japanese input mode is set, characters (Katakana) are outputted and displayed on the liquid crystal display 5, as shown in FIG. 4.

More precisely, when the keys 21 through 25 are pressed once, the characters "ア"/A/ through "オ"/O/ are outputted. Now, when the vowel keys 21 through 25 are pressed after pressing the consonant Keys 26 through 32, Voiceless sounds "カ"/KA/ through "ワ"/WA/ are outputted. In other words, when the key 27 is pressed once, the character "K" is selected, and when the key 21 is pressed in succession, the character "A" is selected, giving "K plus A" and the character "カ"/KA/ is outputted. Similarly, the character "キ"/KI/ is outputted when the keys 27 and 22 are pressed in succession.

Furthermore, when the key 26 is pressed twice, the character "W" is selected, and when the key 21 is pressed in succession, the character "A" is selected, giving "W plus A", outputting the character "ワ"/WA.

The same is true with the other Voiceless sounds, namely, characters in the "カ行"/KA Group/ through "ワ行"/WA Group/ are outputted when the vowel keys 21 through 25 are pressed after selecting the first or the second character key by pressing once or twice the keys 26 through 32.

Further, Voiced sounds of the "ガ行"/GA Group/, "ザ行"/ZA Group/, "ダ行"/DA Group/ and "バ行"/BA Group/ are outputted when the keys 21 through 25 are pressed after selecting the characters "G", "Z", "D" and "B" by pressing twice the keys 27 through 29 pd 31.

Further, the characters "パ"/PA/, "ピ"/PI, "プ"/PU/, "ペ"/PE/ and "ポ"/PO/ are outputted when the keys 21 through 25 are pressed after selecting the third character key "P" by pressing the key 31 three times.

When the key 21 is pressed twice the second character key, the long vowel symbol "—" is outputted, and when the key 24 is pressed twice, the second character key, the long sound vowel key "ッ"/t/ is outputted. Again, when the key 30 is pressed twice in the Japanese input mode, the Nasal sound symbol "ン" is outputted.

Moreover, when the character "Y" of the key 26 is pressed between a consonant and a vowel, a Twisted sound can be outputted. For instance when the keys 27, 26 and 21 are pressed once in turn it becomes "K plus Y plus A" and the characters "キャ"/KYA/ are outputted. Similarly, when the keys 26 and 25 are pressed once in turn after pressing the key 27 twice, it gives "G plus Y plus O", and the characters "ギョ"/GYO/ are outputted.

Likewise, when the key 55 is pressed once the comma "、" is outputted, and when pressed twice the period "。" is outputted.

In addition, when Katakana, is to be inputted in the Japanese Syllabary arrangement in a conventional telephone, each character has to be confirmed by cursor moving key operation by pressing the cursor key. However, with the present embodiment of the invention, the Romanized character input method is adopted where basically a consonant and a vowel key are pressed in this order which enables to confirm the characters the moment the vowel keys 21 through 25 are pressed (or when the key 30 is pressed twice), and thereby eliminating the cursor moving key operation.

Moreover, although the present embodiment shows an example of inputting in Katakana for the Japanese Input, it is also possible to input a standard Japanese text in Kana-Kanji mixture (Japanese Syllabary and Chinese characters) by setting into a function key a function for converting into Chinese characters, or setting a Hiragana input mode.

On the other hand, when the English input mode is set, characters (Alphabet) are outputted, corresponding to the key input manipulation, and displayed on the liquid crystal display 5 as shown in FIGS. 5 and 6.

More precisely, when the keys 21 through 25 are pressed once, characters "A" through "O" are outputted. When the keys 26 through 32 are pressed once, the first character keys, "Y", "K", "S", "T", "N", "H" and "R", are outputted.

Again, when the keys 26 through 32 are pressed twice, the characters "W", "G", "Z", "D", "B", and "M" are outputted.

Further, when the keys 26 through 32 are pressed three times, the characters "X", "F", "J", "V", "Q", "P" and "L" are outputted.

In order to input small letters of the Alphabet, the key 56, where a small letter conversion function is set, may be pressed after pressing the key for inputting the Alphabet, as illustrated in FIG. 6. It is also possible to operate the Menu key 51 to make inputting of small letters a standard where small letters of the Alphabet are inputted by normal key manipulation and the letters are converted into capital letters when the key 56 is operated.

Furthermore, in the case of the Alphabet, where a certain rule such as "a consonant plus a vowel" does not exist as in the Romanized character input method, it is not possible to distinguish whether, for instance, the key 27 is pressed once and then twice to input the characters "K" and "G", or whether the key 27 is pressed three times to input the character "F"; For this reason each character is confirmed either by operating the cursor moving key 53 or inputting another key.

For instance, when the characters "K" and "G" are to be inputted in succession, the key 53 is pressed to confirm the character "K" after pressing the key 27, and then the key 53 is pressed to confirm the character "G" after pressing the key 27 twice.

It is also possible to confirm a character without having to press the key 53 when characters set on different keys are to be inputted in succession. In other words ,when the characters "K" and "S are to be inputted in succession, the key 28 is to be pressed after pressing the key 27 once.

The present embodiment has the following effects:

1) Possibility of setting plural character keys on one single key enables to input the Romanized characters and the Alphabet by utilizing 12 main keys 21 through 32 which are substantially less in number in comparison with the keys of a conventional keyboard. For this reason, the key input apparatus 2 can be miniaturized, making it not only easily adaptable to very small apparatus such as portable telephones, wrist watches and the like, but is also easy to remember the key positions and is operable by one hand, making it easily learnable even for beginners.

2) A plurality of character keys set on each of the keys 21 through 32 can be selected by a number of pressing operations of the keys 21 through 32, and since a Shift key and the like are not required for the selection of the keys, the number of keys can be reduced and miniaturization of the apparatus can be realized. Moreover, since the designated character keys can be selected by altering simply the number of pressing operations of the keys 21 through 32, manipulation for the selection of the keys can be made intuitive and easily comprehensible, thereby improving the character input operation.

3) Since a first character key can be inputted by pressing once the keys 21 through 32, a second character key can be inputted by pressing the keys twice, and a third character key can be inputted by pressing the keys three times, and since the numbers of the character keys and the number of pressing operations of the keys 21 through 32 coincide, the key manipulation becomes easy to remember and operability is thereby improved.

4) Even when the keys 21 through 32 are pressed more number of times than the numbers designated for the keys, the previous key pressing operations will be ignored and the right character can be selected by pressing further the key, hence the operability can be improved.

5) As the number of pressing operations of the keys 21 through 32 can be confirmed, by pressing another key, for instance, another consonant key or a vowel key, a plurality of characters can be inputted in succession, thereby improving the manipulation efficiency.

6) Particularly, as the Japanese input mode utilizes the Romanized character input method, characters can be confirmed the moment any of the vowel keys 21 through 25 is pressed after pressing a consonant key 26 through 32, making it unnecessary to operate the cursor moving key 53, reducing thereby the number of keys and manipulation can be improved.

Moreover, the need to press the same key in repetition can be reduced also in the English input mode when different characters of the Alphabet are to be inputted in succession by setting frequently occurring consonants and vowels alternatively on different keys, leading to a reduction of pressing operations of the cursor moving key 53, thereby improving the working efficiency.

7) Provision of the cursor moving key 53 enables to confirm with certainty the characters when the characters set to the same key have to be inputted in succession and a different key cannot be inputted inbetween in the English input mode.

8) The most frequently used vowels both in Japanese and English, namely the characters "A", "I", "U", "E", and "O" are set independently to the keys 21 through 25 so that those characters can be inputted by only one key pressing operation. This reduces the number of key pressing operations for vowels of frequent usage compared with the conventional Japanese Syllabary layout or the English QWERTY layout where characters other than the character "A" have to be pressed a plural number of times to be inputted, whereby input manipulation can be improved and a speedy input realized.

9) The vowels "A", "I",it "U", "E" and "O" are positioned from left to right from the first row to the second row, making it easy to remember the position of each key, and manipulation efficiency can be improved.

10) Since the 21 characters of the Alphabet, other than the vowels, are set to each of the 7 keys, namely the keys 26 through 32, in groups of three, it is possible to input the 26 characters of the Alphabet by as little as 12 keys, enabling to form a small and highly portable keyboard input apparatus 2 and the portable telephone 1 can also be miniaturized.

11) Since 3 consonants are set to each of the 7 keys, 26 through 32, designated for the consonants, and inputting of characters is selected by the number of key pressing operations, it is possible to input any character by pressing each key maximum three times, which improves input manipulation and a rapid input is also made possible, compared with the conventional Japanese Syllabary layout where a maximum of 5 key pressing operations are required to input a character.

Moreover, as the consonants are arranged uniformly to the keys 26 through 32, a proper balance of key input manipulation can be achieved, improving the operability even more.

12) The keys 26 through 32, set with the consonants "K" through "W", and the keys 21 through 25, set with the vowels "A" through "O", are positioned separately, so that Japanese can be inputted by "a consonant plus a vowel" combination of the Romanized character input method. For this reason, only two key pressing operations on the average are sufficient for inputting Japanese, which can improve and speed up the input manipulation in comparison with the conventional Japanese Syllabary layout where, for instance, the characters of the "あ行"/A Group/ through "わ行"/WA Group/ are set to 10 keys which necessitates the keys to be pressed one to five times, or four to five times on the average, for inputting a character.

13) Similarly, since the percentage of occurrence of consonants and vowels alternatively is just as high in the English usage, number of having to touch the keys (number of key pressing operations) can be reduced by setting the consonants and the vowels separately, whereby input manipulation can be improved. In particular, when inputting different characters of the Alphabet in succession, the number of key pressing operations can be reduced, and less key pressing operations of the cursor moving key 53 are required, whereby manipulation efficiency can be improved.

14) Since the consonants set to the keys 26 through 32 are set so that comparatively frequently used characters in both Japanese and English can be inputted with a minimum number of key pressing operations, enabling to use lesser strokes than the average and input efficiency can thus be even more improved.

15) Since the arrangement of the Alphabet is the same in the Japanese input mode as in the English Input Mode, the positions of the keys can be easily remembered. It is particularly easy to remember the key positions when the Japanese input mode and English input mode have to be used alternatively, whereby key input manipulation can be improved.

16) Since Voiced sounds and the like can be inputted by character combinations in accordance with the Romanized character input method of a conventional type of a keyboard, Voiced sounds can be inputted by using the characters "G", "Z","D" and "B" and the Nasal sound "ん"/N/ by pressing the character "N" twice, and because a Twisted sound can be inputted by "a consonant plus Y plus a vowel" combination, manipulation can be rapidly mastered, operability improved and rapid inputting is made possible.

17) Further, since the character "K" for inputting the" カ行"/KA Group/ and the character "G" for inputting the "ガ行"/GA Group/ are both set to the key 27; the character "S" for inputting the "サ行"/SA Group/ and the character "Z" for inputting the "ザ行"/ZA Group/ are set to the key 28; the character "T" for inputting the "タ行"/TA Group/ and the character "D" for inputting the " ダ行"/DA group/ are both set to the key 29; and the character "H" for inputting the " ハ行"/HA Group/ and the character "B" for inputting the " バ行"/BA Group/ are both set to the key 31, in the Romanized Input Method, so that the related Voiced and Voiceless sounds can be inputted by altering the number of key pressing operations of the same key. For this reason, key positions for inputting the Voiced sounds can be easily remembered, input manipulation easily comprehended, and a speedy input is made possible.

18) Since the long vowel symbol "—" is set as a second character key to the key 21 where in repetition rarely used character "A" is set, the long vowel symbol "—" can be inputted with ease by pressing twice the key 21, improving further the input manipulation.

Similarly, since the long sound vowel key "つ"/t/ is set as a second character key to the key 24 where in repetition rarely used character "E" is set, the long sound vowel key "つ"/t/ can be inputted with ease by pressing twice the key 24, improving thereby the input manipulation.

19) Since numeric keys are also set to the keys 21 through 32, not only characters but also numerals can be inputted. For this reason, addresses and telephone numbers can be easily inputted into particularly telephone books of the portable telephones, wrist watches and electronic notebooks and so on.

In other words, a highly versatile and for many types of inputs adaptable key input apparatus 2 can be realized with the use of 12 keys, 21 through 32, utilizing three input modes, such as numeric input mode for inputting, for instance, telephone numbers into telephone books and the like, Japanese input mode for inputting text with the Romanized character input method, and English input mode for inputting in English.

20) Moreover, since the 12 keys of the keys 21 through 32 are arranged in a matrix array of 4 horizontal rows and 3 vertical columns, and particularly since the key layout of the numerals are the same as in the layout of the push-button system of various telephones including portable telephones, the apparatus can be easily adapted to the telephones and facsimiles.

Figure 7:
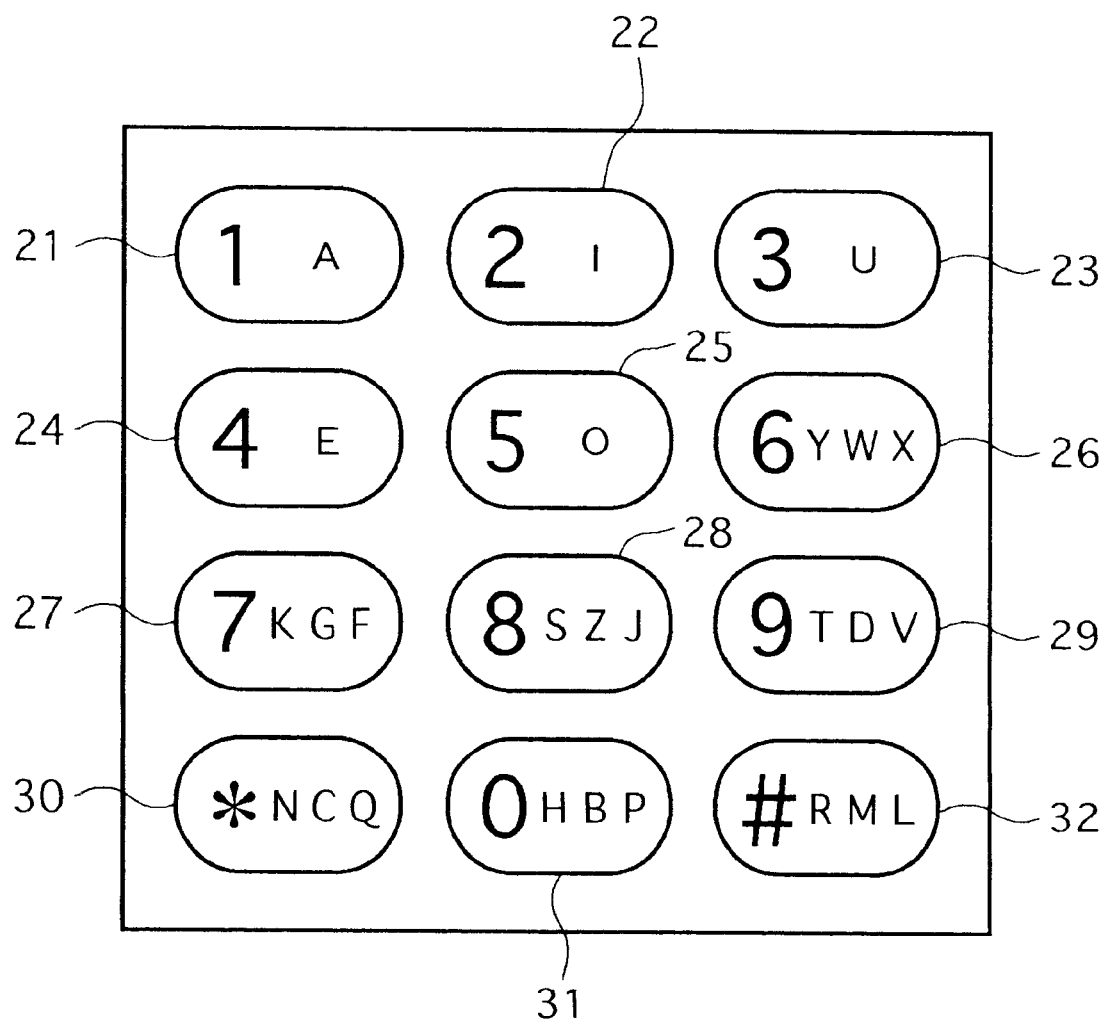
FIG. 7 is a plan view of the main part of the key layout of the keyboard input apparatus of a second embodiment of the present invention.

Next, will be described a second embodiment of the present invention with reference to FIG. 7. It should be noted that when the present embodiment is identical or corresponds to the foregoing embodiment, identical symbols will be used and explanations are either eliminated or abbreviated.

The present embodiment is a keyboard input apparatus where the key input apparatus 2 of the foregoing first embodiment has been modified to a keyboard input apparatus 2 exclusively for an English use. More specifically, of the main keys 21 through 32, the long vowel symbol "—" of the second character key for the vowel key 21 and the long sound vowel key "つ"/t/ of the second character key for the vowel key 24, which are only used when inputting Japanese, are omitted, as illustrated in FIG. 7.

Further, when adapting the keyboard input apparatus of the present embodiment to the portable telephone 1, each of the function keys 51 through 56 may be set for the English input mode, thereby eliminating unnecessary function keys. As for function keys for the English input, keys such as a cursor moving key for confirming a character input, a Shift key for inputting numerals while the main keys 21 through 32 are being held down, a Space key for inputting a space, a Numeric key for switching into the Numeric input mode, a Mark Key for switching into the Symbol input mode, a Help key for showing the helping instructions, a Menu key for displaying the menu for various mode selections, are to be accommodated accordingly.

The input manipulation of the keyboard input apparatus 2 exclusively for English usage is identical to the English input mode of the foregoing first embodiment, illustrated in FIGS. 5 and 6, and the first character keys can be inputted when the keys 21 through 32 are pressed once, the second character keys can be inputted when the keys 26 through 32 are pressed twice, and the third character key can be inputted when the keys are pressed three times.

Moreover, it is set so that each key can be confirmed by operating either the cursor moving key or a different key and is identical to the foregoing first embodiment.

Also in this embodiment the effects 1) through 5), 7) through 11), 13) through 15), 19) and 20) of the effects of 1) through 20) of the foregoing first embodiment, except for the effects concerning only the Japanese input mode, namely, 6), 12), 16) through 18) can also be attained.

Next will be described a third embodiment of the present invention with reference to FIGS. 8 and 9. It must be noted that in the present embodiment comprising parts identical or corresponding to the foregoing first embodiment are affixed the same symbols and explanations are either eliminated or abbreviated.

The present embodiment differs from the foregoing first embodiment through utilization of in total of 15 keys as character input keys by adding 3 keys, keys 33 through 35, to the 12 keys, key 21 through 32. However,s the basic composition that it can be used in the portable telephone 1 and that the vowel keys and consonant keys are placed apart remains the same.

Figure 8:
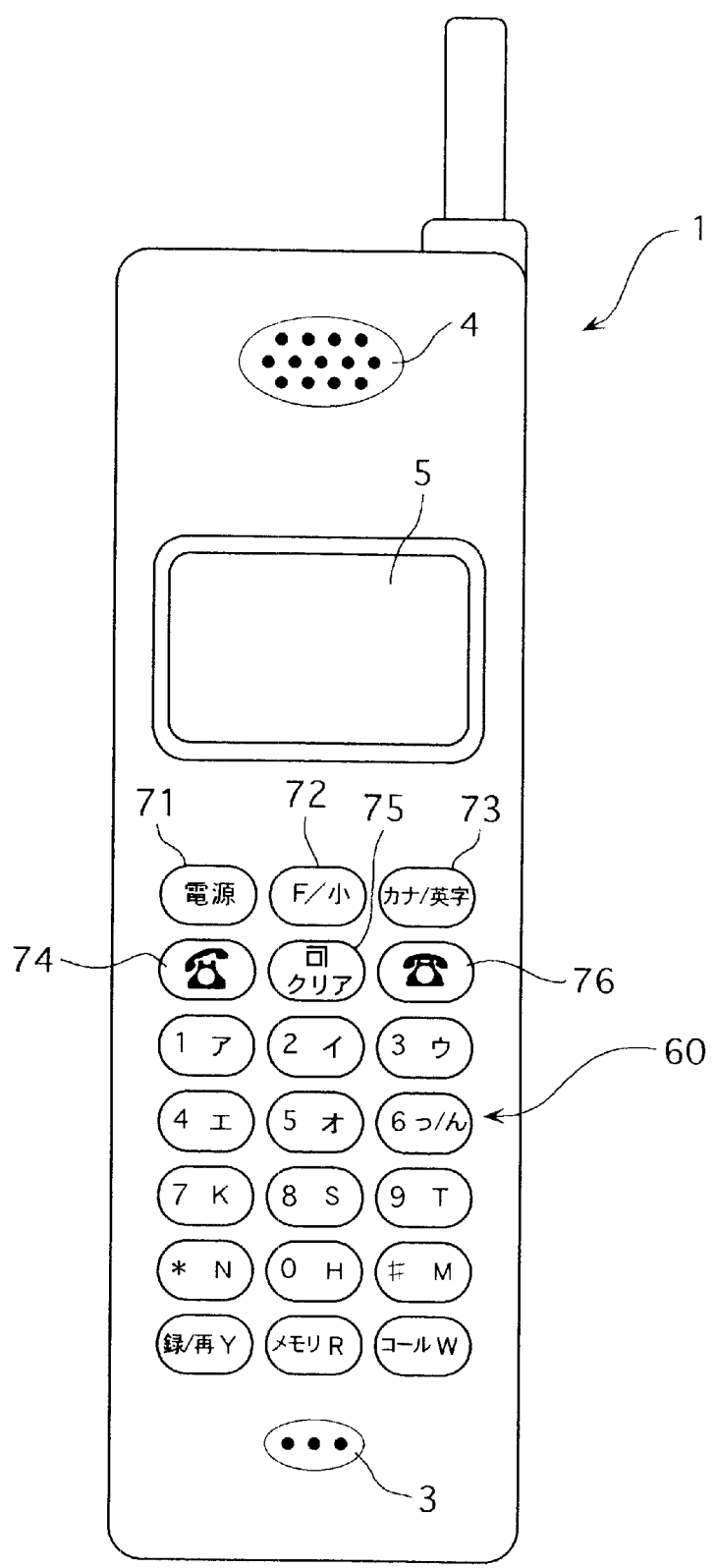
FIG. 8 is a front view of a portable telephone adapted for the keyboard input apparatus of a third embodiment of the present invention.
Figure 9:
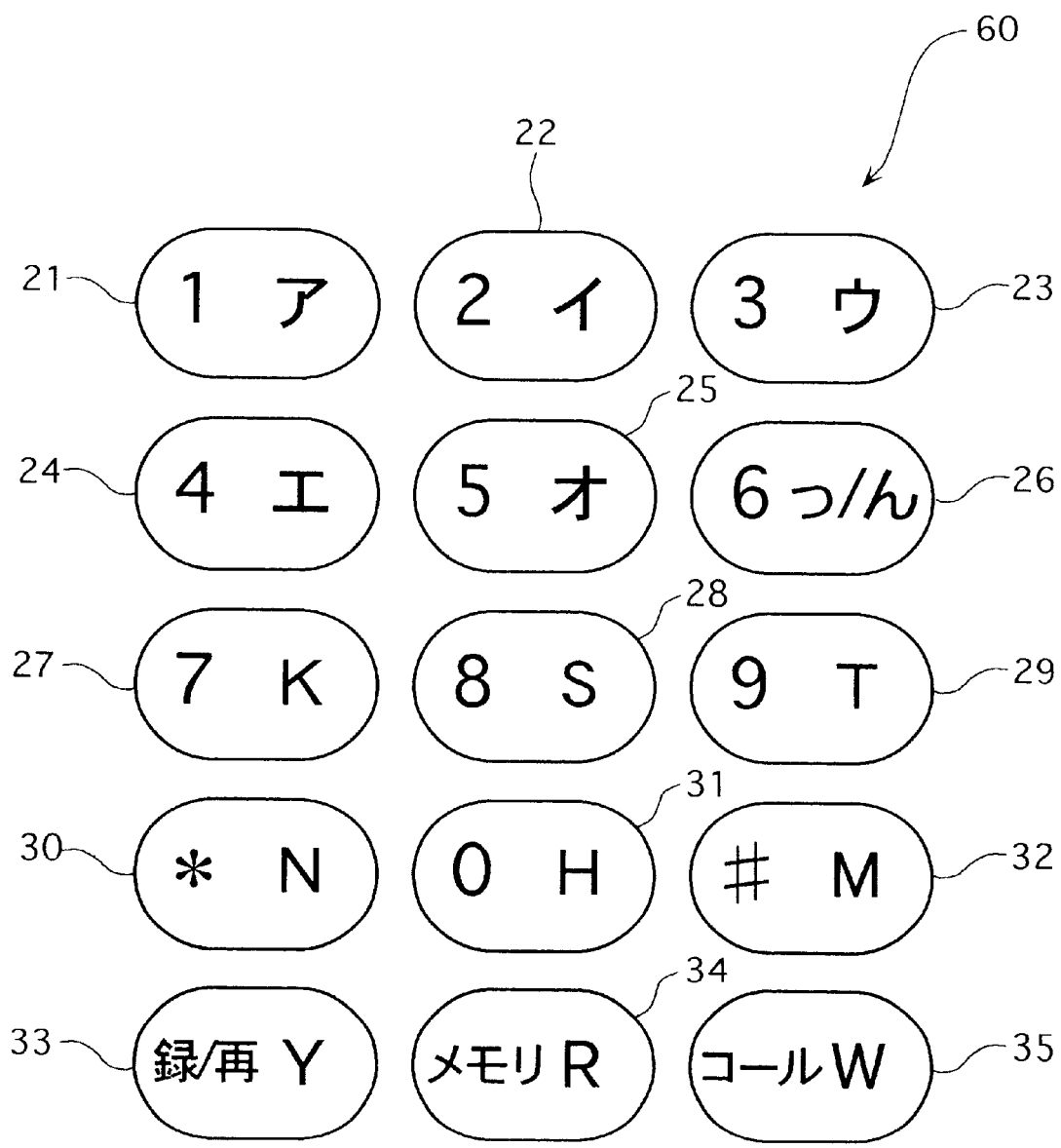
FIG. 9 is a plan view of the key input apparatus showing a key layout of the foregoing third embodiment.

More precisely, the keyboard input apparatus 60 comprises 15 main keys, 21 through 35, arranged in a matrix array of 5 horizontal rows and 3 vertical columns, and 6 function keys, 71 through 76, arranged in a matrix array of 2 horizontal rows and 3 vertical columns as illustrated in FIGS. 8 and 9.

Here, in addition to the various functions set to the function keys 71 through 76 for, the telephone, a mode selection function is set to the key 73 for converting the Character input mode into the Numeric (standard) input mode, Japanese input mode and English input mode and so on, and a Small letter converting function is set to the key 72.

It should be noted that the cursor moving key (Cursor Key) is not illustrated in the drawing but is set to either of the keys 74 or 76, accordingly.

On the other hand, identical numeric keys as in the first embodiment are set to the main keys 21 through 32. Again, various functions for the telephone are set to the keys 33 through 35,and although the keys 33 through 35 are provided in the telephone 1 as function keys, it is also used in the present embodiment for inputting characters.

Similar to the foregoing first embodiment, the vowels "A", "I", "U", "E" and "O" are set to the keys 21 through 25 as first character keys. On the key tops are inscribed in Katakana, the characters "ア", "イ", "ウ", "エ" and "オ".

Moreover, the characters "K", "S", "T", "N", "H", "M", "Y", "R" and "W" are set as first character keys to the keys 27 through 35. The characters "M" and "W" are not set to independent keys in the first embodiment, but due to the increase in number of keys in the present embodiment, the characters "M" and "W" are set to the keys 32 and 35 independently.

In addition, the long sound vowel key "っ"/t/ is set as a first character key to the key 26 and the Nasal sound "ん"/n/ is set as a second character key.

Though not inscribed on the key tops, characters for inputting Voiced sounds, such as "G", "Z", "U", "D" and "B", are set as second character keys into the keys 27 through 29 and 31.

Moreover, the characters "C", "F", "J", "L", "Q", "V" and "X" for inputting in English may also be set as second or third character keys on each of the keys 27 through 35.

Also in the present embodiment it is possible, as in the foregoing embodiment, to input numerals, Japanese and English characters by pressing each of the keys after switching the Input modes accordingly.

In this case, if a second character key has to be inputted, the key has to be pressed twice in succession similar to the procedure of the first embodiment and the explanation is here thus eliminated.

Also in this embodiment the effects 1) through 20) of the first embodiment can be attained.

Moreover, since the key 21) has been added, the characters "R", "W", and the long sound vowel key "っ"/t/ can be inputted by one single key operation, attributing to the improvement of manipulation when those characters are inputted.

Next will be described a fourth embodiment of the present invention with reference to FIG. 10.

The keyboard input apparatus 10 of the present embodiment is used as an input apparatus for a personal computer comprising a body of the personal computer, a display unit, consisting of a liquid crystal display, and a CRT display.

Figure 10:
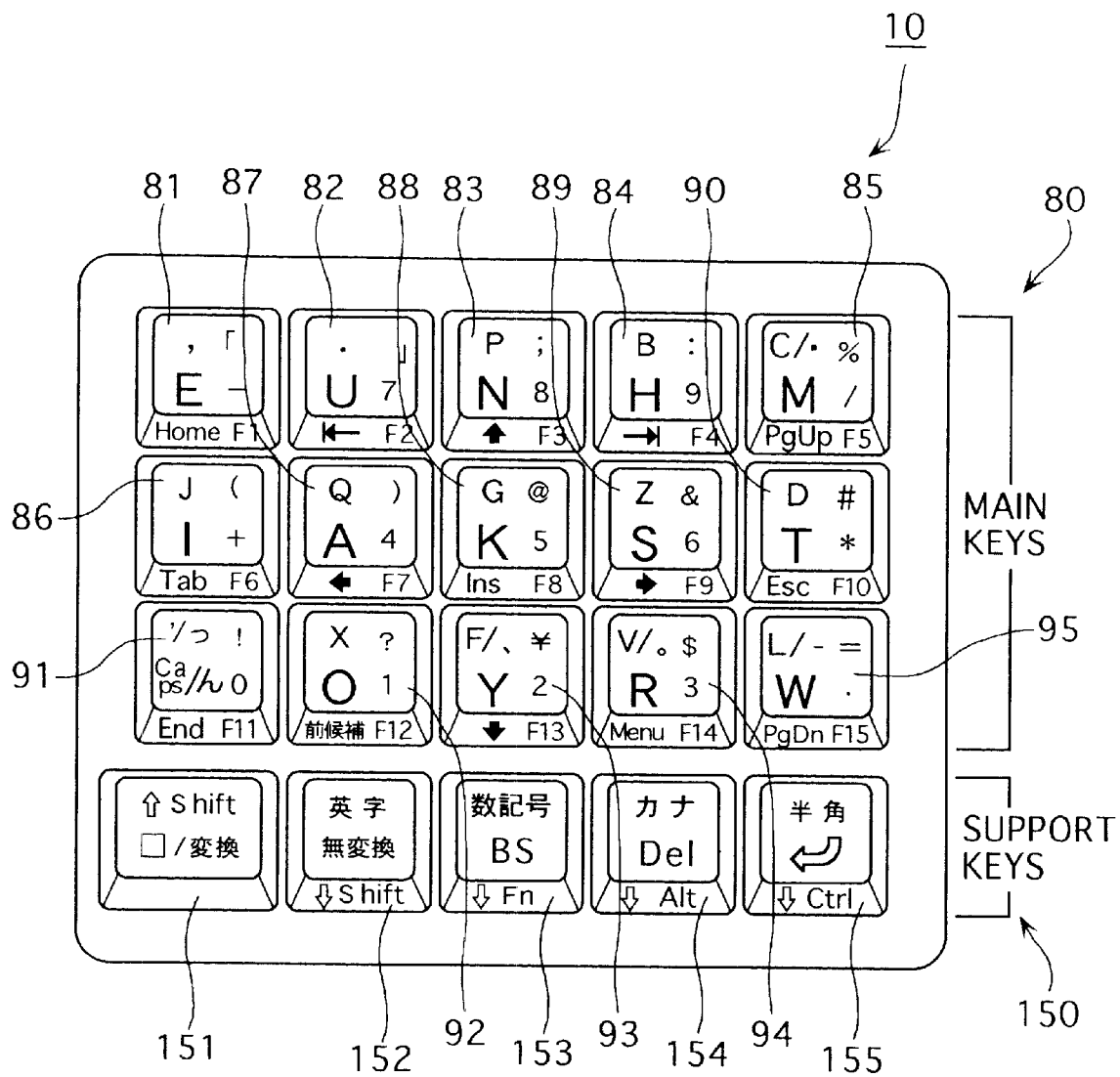
FIG. 10 is a plan view of the keyboard input apparatus showing a key layout of a fourth embodiment of the present invention.

The substantial part of the keyboard input apparatus 10 comprises, as illustrated in FIG. 10, a main key area 80, consisting of main keys 81 through 95 arranged in a matrix array of 3 horizontal rows and 5 vertical columns, and a support key area 150, consisting of 5 support keys 151 through 155 arranged in a matrix of 1 horizontal row and 5 vertical columns underneath of the foregoing main key area 80.

It must be noted that the keyboard input apparatus 10 is normally placed on the table and operated by the right hand. In this case, the working efficiency can be enhanced when keys in the left two columns, keys 81, 82, 86, 87, 91 and 92, are inputted by the very mobile index finger, and the keys 83 through 85, 88 through 90 and 93 through 95 of the remaining 3 columns are operated by the middle, ring and small fingers, respectively, and the Support keys 151 through 155 are operated by the thumb. This setting is however only a basic manipulation and when a plurality of keys have to be pressed simultaneously, any appropriate fingers can be selected for the purpose. Moreover, the left hand can also be utilized for the input operation, or the keyboard input apparatus 10 may also be held in the left hand instead of being placed on the table.

It should be noted that the basic home position is set to the keys 87 through 90 in the middle row of the main key area 80.

Each character is set to the main keys 81 through 95 and Support keys 151 through 155, as illustrated in FIG. 10.

More precisely, the Alphabet which is used for inputting English or Japanese with the Romanized character input method, is inscribed on the upper left and lower left side of each of the main keys 81 through 95, and symbols and numerals are set on the upper right and lower right side thereof. Functions and F-numbers are set on the lower side of the key tops.

The characters in the main key area 80 are arranged in consideration of both the facility of inputting order of each key in the main key area 80, and the frequency of usage of the vowels and consonants of the Alphabet when inputted in the Romanized Japanese Character Input Method. The vowels and consonants are further arranged, depending on the frequency of usage, in the order of the middle, top and bottom row, respectively, corresponding to the easiness of inputting, and also from the basic side to the other side, to facilitate the input operation.

The Support keys (Function keys) 151 through 155 are set mainly with functions for conversion, non-conversion and shifting operations and executes various functions of the keyboard input apparatus 10 in combination with the 15 keys, 81 through 95, arranged in the main key area 80.

Therefore, the 15 keys, 81 through 95 within the main area 80, comprise the character keys with various characters, and the 5 keys, 151 through 155 within the support area 150, comprise the Function keys.

Characters used for character keys are not only limited to the Alphabet but include also numerals, symbols, functions and key numbers.

Of the main key area 80, one side (the left side in the drawing) is assigned as the basic side for the home position of the index finger, and a zone, consisting of the keys in the two columns of the basic side, is assigned as the vowel zone for inputting the vowels, and a zone, consisting of the keys in the remaining 3 columns of the main key area 80, is assigned as the consonant zone for inputting the consonants.

In the vowel zone, consisting of the keys in 2 columns of the basic side, the 6 keys 81, 82, 86, 87, 91 and 92 are set, and the vowel keys "A", "I", "U", "E" and "O", for expressing the vowels, are arranged as first character keys on each of the keys 81, 82, 86, 87, 91 and 92 as follows:

Of the vowel keys, the keys "A" and "I" are set to the keys 87 and 86 of the middle row, "U" and "E are set to the keys 82 and 81 of the upper row and "O" and the Nasal sound "ん" are set to the keys 92 and 91 in the lower row, respectively.

This arrangement has been made so that, when the right index finger is placed in the home position of the vowel zone, the frequently used character "A" can be set to the key 87 which becomes the home position of the index finger, adjoining it is set the character "I" to the key "86", and the characters "U", "E" and "O" are set in the upper and lower row, in turn, corresponding to the frequency of character usage, respectively. The key arrangement in the vowel zone is made in consideration of the facility of learning the characters by way of placing the characters "A", "I", "U", "E" and "O" in the middle, upper and lower row in turn.

On the other hand, the consonant keys, "K", "S", "T", "N", "H", "M", "Y", "R" and "W", which express Japanese consonants as first character keys, are arranged in the 3 rows on the right side in the consonant zone. More specifically, the basic structure is such that the keys 88, 89 and 90 of the middle row become, from left to right, the keys "K", "S", and "T", respectively, and the keys 83, 84 and 85 in the upper row become the keys "N", "H" and "M" respectively, and the keys 93, 94 and 95 in the lower row become, from left to right, the keys "Y", "R" and "W", respectively. Further the key arrangement takes into consideration that consonants of the "か行"/KA Group/, "さ行"/SA Group/, "な行"/NA Group, "は行"/HA Group/, "ま行"/MA Group, "や行"/YA Group, "ら行"/RA Group/ and "わ行"/WA Group/ are arranged in the middle row, upper row and the lower row in the order of "アカサタナ"/A,KA,SA,TA,NA/ Japanese Syllabary/ and also from the basic side to the other side.

Needless to say, this arrangement, similar to the arrangement of the vowels, takes into consideration the ease of inputting and the order of frequency of usage of characters in the Romanized character input method, and the character "K", which is frequently used in Japanese, is set to the key 88 which becomes the home position for the middle finger in the middle row when the index finger of the right hand is made to be the home position of the vowel zone.

In addition, adjoining the foregoing key 88, set for the middle finger, is set the key 89 for the character "SS", and adjoining it is set the key 90 for the the key "T". The keys are placed such that the frequency of usage of characters is reflected into the order of the positioning of the keys, namely, in the order of the higher row and then the lower row and also the distance from the basic side outwards, and are arranged in the following manner: The character "N" is set to the key 83; "H" to the key 84; "M" to the key 85; "Y" to the key 93; "R" to the key 94; and "W" to the key 95, respectively.

Moreover, characters and symbols that are used in English, such as, "QI", "J", "X", the period ".", the comma ",", and the characters and symbols used in Japanese, such as the long sound vowel key "つ", a comma "、", a period " 。", the long vowel symbol "—", a dot"." and the keys "P", "B", "G", "Z" and "D", used to make Voiced and Half-voiced sounds in combination with the vowels, are set as second character keys to the vowel keys and consonant keys, which are the upper characters of the characters inscribed on top and bottom on the keys 81 through 95 of the main key area 80, and can be inputted by pressing the keys 81 through 95 twice in succession.

More precisely, the characters and symbols, "Q", "J", "." and "X" are set to the keys 87, 86, 82, 81 and 92, corresponding to the characters "A", "I", "U", "E" and "O"; the long sound vowel key "つ"/t/ is set to the key 91 for the character "ん"; the characters and symbols "P", "B" and a dot"." are set to the keys 83, 84, and 85, corresponding to the characters "N", "H" and "M" of the upper row of the consonant zone; the characters "G", "Z" and "D" are set to the keys 88, 89 and 90 which correspond to the characters "K", "S" and "T" of the middle row; and further a Japanese comma "、" period " 。", and long vowel symbol "—" are set to the keys 93, 94 and 95, corresponding to the characters "Y", "R" and "W" of the lower row.

Further, the present embodiment shows the key positioning for the right hand manipulation but it goes without saying that the basic side should be reversed in case it is to be manipulated with the left hand.

In addition, keys which can be inputted in the English input mode are set to the keys 85, 91 and keys 93 through 95. More precisely the characters "C", "F", "V", "L" and the apostrophe "'" are set to the keys 85, 91 and keys 93 through 95 as second character keys in the English input mode. The symbol "CAPS" is also set as a first character key in the English input mode.

Further, the characters "F" and "V" set to the keys 93 and 94 are also used sometimes in the Romanized character input mode. For this reason, the keys 93 and 94 are set so that the characters "Y" and "R" are inputted when the keys are pressed once in the Japanese input mode, a Japanese comma "、" and period " 。" are inputted when the keys are pressed twice, and "F" and "V" are inputted when the keys are pressed three times. Now, since the Japanese comma "、" and period " 。" are not used in the English input mode, it is set such that the characters "F" and "V" are inputted when the keys 93 and 94 are pressed twice in succession.

On the other hand, the support key area 150 comprises, starting from the basic(left) side, a Shift function key; the key 151 having both a conversion function from the Hiragana into Chinese characters and also a space inputting function; the key 152, having both the non-conversion function into Chinese characters, and a mode switching function to change into the English input mode; the key 153 for converting the Back-space function into the Numeric- Symbol input mode; the key 154, having the function of converting the deletion(DEL)function into the Katakana input mode; and the key 155 having a line feed function and a Half-size inputting function.

Moreover, to each of the main keys 81 through 95 is set a series of numerals as first character keys, which can be inputted by one key pressing operation, when set in the Numeric-Symbol input mode. With this numeric arrangement numeral keys are set in the middle three columns of the main key area 80 and mathematical symbols are set in two columns on the right and left side. More specifically, the following numerals and symbols are set in the main key area 80 from the upper left row in turn: the symbol "—" is set to the key 81; the numeral "7" to the key 82; the numeral "8" to the key 83; the numeral "9" to the key 84; and the symbol "/" to the key 85. In the middle row from left to right are set the following numerals and symbols: the symbol "+" to the key 86; the numeral "4" to the key 87; the numeral "5" to the key 88; the numeral "6" to the key 89; and the symbol "*" to the key 90. In the bottom row from left to right are set the following numerals and symbols: numeral "0" to the key 91; the numeral "1" to the key 92; the numeral 2 to the key 93; the numeral 3 to the key 94; and the symbol "." to the key 95.

Moreover, to each of the main keys 81 through 95 is set a series of symbols as second character keys, where symbols can be inputted by two key pressing operations, when set in the Numeric-Symbol mode. With this symbol arrangement the symbols are set to the keys in the main key area 80 as follows: in the top row are set from left to right: a bracket symbol "[" to the key 81; a bracket symbol "]" to the key 82; a semi colon symbol ";" to the key 83; a colon symbol ":" to the key 84; and a percent symbol "%" to the key 85. In the middle row are set from left to right: a bracket symbol "(" to the key 86; a bracket symbol ")" to the key 87; a modified symbol "@" to the key 88; an "and" symbol "&" to the key 89; and sharp symbol "#" to the key 90. Further, in the bottom row are set from left to right: an exclamation mark "!" to the key 91, a question mark "?" to the key 92, an Yen mark "¥" to the key 93; a dollar mark "$" to the key 94 and an equal mark "=" to the key 95.

With the keyboard input apparatus 10, Japanese can be inputted by the Romanized character input method through pressing the consonant and vowels keys in turn in the Japanese input mode (standard), or in the Katakana input mode. In this case, similar to the foregoing embodiment, the consonant keys are pressed once to select the first character key and pressed twice to select the second character key and they are confirmed the moment a vowel key is pressed.

Moreover, various conversion processes, such as Kana-Kanji conversion (Japanese Syllabary into Chinese characters) or Non-conversion (Hiragana remains unchanged) can be carried out in the Japanese input mode when the Conversion mode key 51 or the Non-conversion key 52 are pressed after inputting a character key.

The process for one key pressing operation is now completed and if another key inputting is required, the above mentioned process is repeated and keys are inputted in turn.

On the other hand, the English input mode can be executed by inputting each key in succession. When characters set on the same key, or the same characters are to be inputted in repetition, for instance, if the characters "P" and "N" of the key 83 are to be inputted in succession, the key 83 is to be pressed twice, followed by pressing of the Non-conversion key 152 or the Return key 155 to perform the forward sending operation of the key, and then the key 83 is to be pressed once for inputting.

Again, when characters set to different keys, are to be inputted, for example, the character "S" of the key 89 and the character "D" of the key 90 are to be inputted in succession, the key 90 may be pressed twice after pressing the key 89 once.

In this manner, a character input can be confirmed in the English input mode by either pressing a different key, or the keys 152 and 155, golf which have a function to advance a key, after pressing a certain key.

Further, when set in the Numeric-Symbol input mode, any numeral (character) of the numerical arrangement can be inputted by pressing once the keys 81 through 95, and any symbol (character) of the symbol arrangement can be inputted by pressing twice the keys 81 through 95. In this case, similar to the English input mode, inputting procedure can be confirmed by either pressing a different key, the key 152 or 155, which have a function to advance a key, after pressing a certain key.

Further, since it is often the case that numerals and symbols are inputted in succession, a fixing mode for the numeric and symbol arrangement can be set which enables the numerals and symbols to be inputted by a single pressing operation of each of the keys. In this case, the key forward moving process becomes unnecessary when inputting numerals and symbols in succession, thereby improving further the input efficiency.

Further, various functions and F numbers set to each of the keys 81 through 95 can be inputted by pressing simultaneously the key 152 or the key 153 and any of the keys 81 through 95.

In this embodiment, operational effects similar to 1) through 21) of the foregoing embodiment can also be attained.

22) Moreover, not only characters and numerals but also symbols are set to each of the keys 81 through 95, whereby working efficiency for inputting symbols can be enhanced.

23) Further, since in the Japanese input mode frequently used symbols including the comma " 、 ", period " 。 " and the like can be set to the keys 81 through 95, in addition to the 26 characters of the Alphabet, Japanese text can be inputted with ease even with a small number of keys. Similarly, since in the English input mode frequently used symbols including the comma ",", period "." and the like can be set to the keys 81 through 95, in addition to the 26 characters of the Alphabet, English text can also be inputted with ease.

Next will be described a fifth embodiment of the present invention with reference to the drawings. It must be noted that in the present embodiment any identical symbols or corresponding parts as in the foregoing first to the fourth embodiments are given the same symbols, and explanations are either eliminated or abbreviated.

Figure 11:
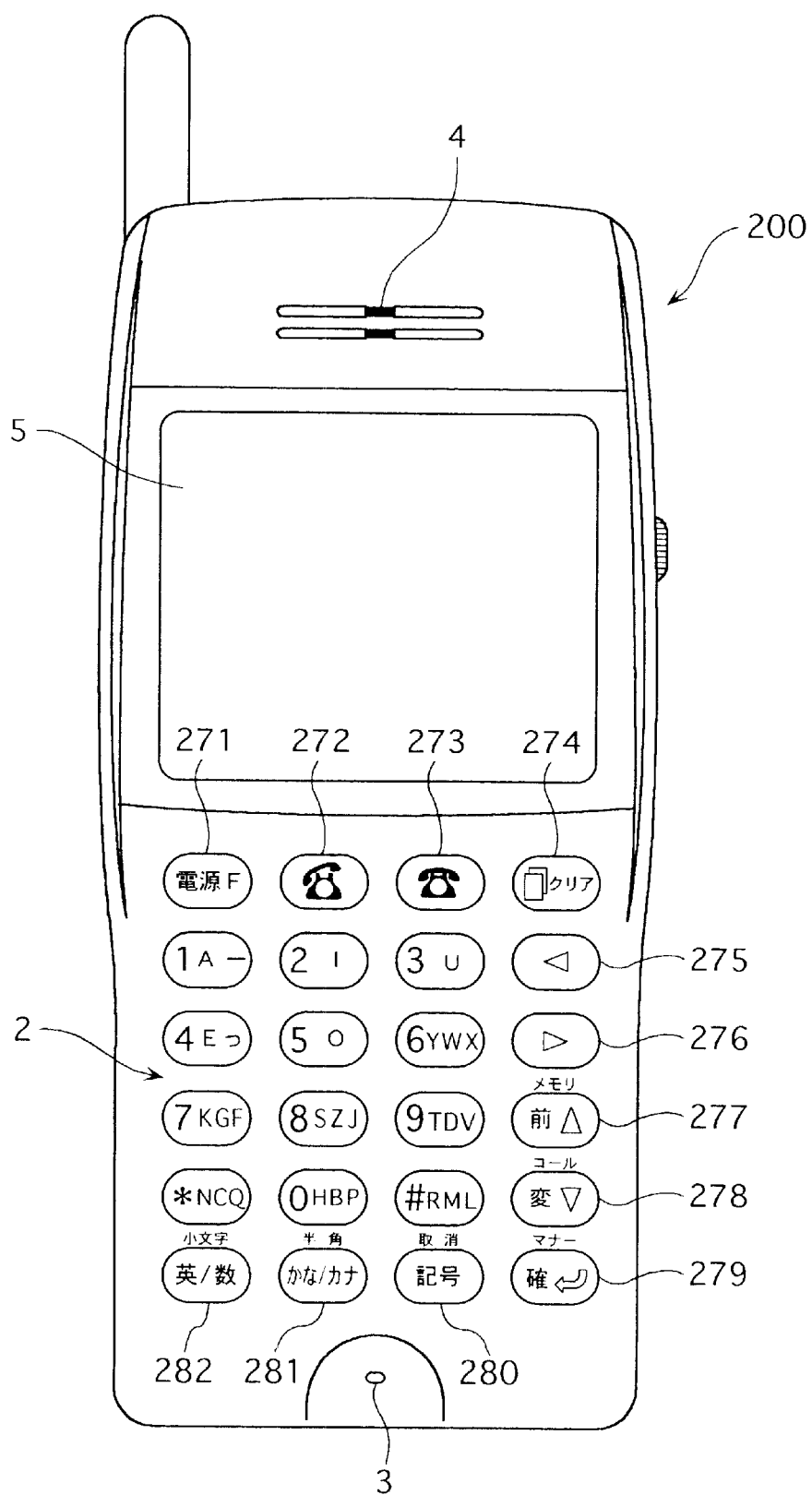
FIG. 11 is a front view of a portable telephone adapted for the keyboard input apparatus of a fifth embodiment of the present invention.

The present embodiment has been made adaptable to a keyboard input apparatus of a portable telephone 200 as illustrated in FIG. 11.

The portable telephone 200 comprises a microphone 3, a speaker 4 and a liquid crystal display 5 and also a keyboard input apparatus 2 (key inputting section).

Figure 12:
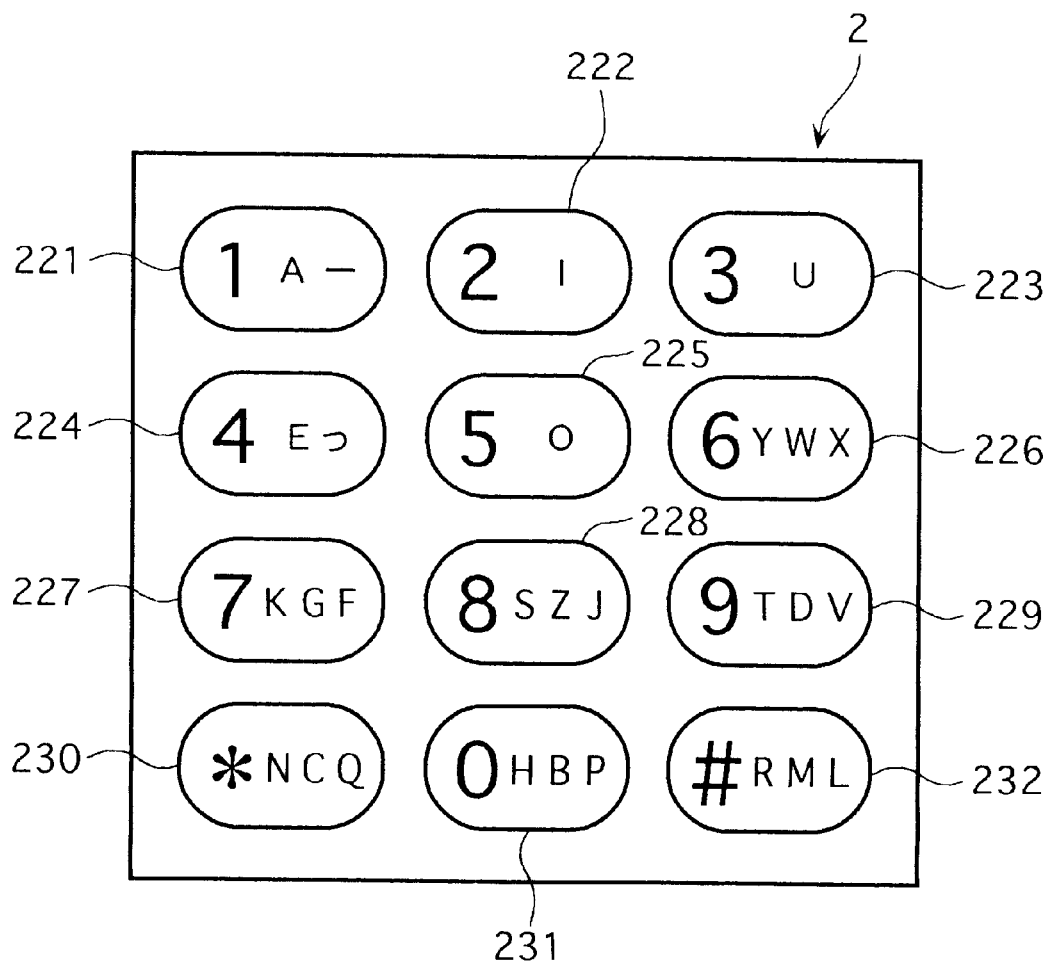
FIG. 12 is a plan view of the main part of the key layout of the keyboard input apparatus of the foregoing fifth embodiment.

The key input apparatus 2 comprises in total of 24 keys arranged in a matrix array of 6 horizontal rows and 4 vertical columns, and in the left middle side of which are arranged in total of 12 main keys, 221 through 232, arranged in a matrix array of 4 horizontal rows and 3 vertical columns, for inputting numerals and characters, as shown in FIG. 12. Function keys 271 through 282 are set to the remaining 12 keys.

Characters and various functions are set to the main keys 221 through 232 and function keys 271 through 282.

More precisely, on the left side of the key tops of the main keys are set numeric keys which are used to input telephone numbers and the like, and on the right side are set character keys, such as the characters of the Alphabet used for inputting English, or Japanese in the Romanized character input method.

Here, the character arrangement of the keys 221 through 232 is identical to the foregoing embodiment 1, which is to say that the vowels keys are set in the upper row and consonants, which are used in combination with the aforementioned vowel keys to input the "か行"/KA Group/, through "わ行"/WA Group/ in the Romanized character input method are positioned below in that order from top to bottom.

More specifically, as shown in FIG. 12, the keys 221 through 232 are arranged for telephone operation in the order starting from the top left as follows: the numeral "1" is set to the key 221; the numeral "2" to the key 222; the numeral "3" to the key 223; the numeral "4" to the key 224; the numeral "5" to the key 225; the numeral "6" to the key 226; the numeral "7" to the key 227; the numeral "8" to the key 228; the numeral "9" to the key 229; the symbol "*" to the key 230; the numeral "0" to the key 231; and the symbol "#" to the key 232.

To each of the keys 221 through 225 are set as first character keys the characters "A", "I", "U", "E" and "O", respectively, for expressing the vowels.

The character arrangement takes into consideration the facility of learning of the character positioning by laying the characters in such a way that the characters "A", "I", "U", "E" and "O" are arranged in this order, from left to right and from top to bottom.

On the other hand, consonant keys expressing the Japanese consonants, "Y", "K", "S", "T", "N", "H" and "R" are set as first character keys to each of the keys 226 through 232. This character arrangement takes into consideration that the consonants of the "か行"/KA Group/,"さ行"/SA Group/, "た行"/TA Group/, "な行"/NA Group/, "は行"/HA Group/, "ら行"/RA Group/ and "や行"/Ya Group can be laid approximately in accordance with the Japanese Syllabary arrangement.

Further, consonant keys "M" and "W" are set as second character keys to the keys 232 and 226. This arrangement takes into consideration that the remaining "ま行"/MA Group/, and "わ行"/WA Group/ can be lined up together. It must be mentioned that the character "M" may be set to the key 232 as a first character key and the character "R" as a second character key.

Further, the characters "G", "Z", "D" and "B" are set to each of the keys 227 through 229 and 231 as second character keys. More specifically, the consonants "G", "Z", "D" and "B" for inputting the Voiced sounds of the "が行"/GA Group/, "ザ行"/ZA Group/, "だ行"/DA Group/ and "ば行"/Ba Group/ are arranged in correspondence with the consonants "K", "S", "T" and "H" for inputting Voiceless sounds of the "か行"/KA Group/, "さ行"/SA Group/, "た行"/TA Group/, and "は行"/HA Group.

Since the character "N" used to input the "な行"/NA Group/" is used in the Romanized character input method for inputting the Nasal sound "ん", the key 230 where the character "N" is set may also be used to input the character "ん" as a second character key.

Further, the character "P" for inputting the "ば行/PA Group/" is set as a third character code to the key 231, where the characters "H" and "B" for inputting the "は行/HA Group/" and "ば行/Ba Group/" are set, making it easy to remember the input procedure of the "PA Group" and thereby improving the manipulation efficiency.

Moreover the long vowel symbol "ー", and the long sound vowel key "つ"/t/ are set as second character codes on the vowel keys 221 and 224 to which the characters "A" and "E" are set, respectively. In other words, since the characters "A" and "E" are rarely used in repetition in the Romanized character input mode, the long vowel symbol "ー" and the long sound vowel key "つ"/t/ are arranged to be inputted when the key 221 and 224 are pressed twice.

Further, the characters "X", "F", "J", and "V" are set as third character keys to each of the keys 226 through 229. Moreover, the character "C" is set as a second character key to the key 230 and the character "Q" as a third character key. Further, the character "L" is set as a third character key to the key 232.

Consequently, as regards the 26 characters of the Alphabet, the vowels "A", "I", "U", "E" and "O" are set, similar to the foregoing first embodiment, independently to the 5 keys 221 through 225 of the 12 main keys 221 through 232, and the remaining 21 characters are set to the other keys 226 through 232 in groups of three, respectively. More specifically, the keys are respectively set as follows: the characters "Y", "W" and "X" are set to the key 226; the characters "K", "G" and "F" to the key 227; the characters "S", "Z" and "J" to the key 228; the characters "T", "D" and "V" to the key 229; the characters "N", "C" and "Q" to the key 230; the characters "H", "B" and "P" to the key 231; and the characters "R", "M" and "L" to the key 232.

Each of these characters is inscribed on the right side of each of the keys 221 through 232, as shown in FIG. 12.

On the other hand, in addition to the various functions set for the telephone use, character inputting function is also set to the function keys 271 through 282, as shown in FIG. 11.

When a plurality of functions are provided in each of the keys 271 through 282, functions can be selected by altering the number of key pressing operations of the keys 271 through 282, or by simultaneously pressing the "F" (function) key 271.

A cursor moving key (cursor key) is set to the keys 275, 276, 277 and 278.

Furthermore, a conversion function for converting the inputted Japanese into Kanji (Chinese character) is also set to the key 278. A Return and a confirming function for the converted characters are provided to the key 279.

As regards the function keys 280 through 282, one key pressing operation of each of the keys 280 through 282 executes the functions inscribed on the left part of the keys and two pressing operations execute the functions inscribed on the right side of the keys.

In other words, mode switching functions for both the English input mode and numeric input mode are set to the key 282. Moreover, switching functions into both Hiragana input mode (Hiragana/Chinese characters) and Katakana input mode are set to the key 281. Further, a switching function into the Symbol input mode is set to the key 280.

Each of the keys 280 through 282 is utilized to confirm an inputted key into various modes but can also be employed as a key to convert the inputted keys into numerals, Alphabet, Hiragana and Katakana.

A power switch and a F (function) switch are set to the key 271. Therefore, when the key 271 is pressed independently, an electrical connection is made and various functions, such as telephone functions like " Memory", "Call", "Manner", and character input functions such as "Cancel", "Half-size", "Small characters" and so on, inscribed on the upper part of each of the keys 277 through 282, are executed when any of the keys 227 through 282 is pressed simultaneously with the key 271 held down.

Various functions for the telephone such as, Transmission, Cut off, Cancellation of a call, and so on, are set to the keys 272 through 274.

The input processing function of the keyboard input apparatus 2 with this key arrangement is basically identical to the foregoing first embodiment with the key arrangement of the main keys 221 through 232.

Figure 3:
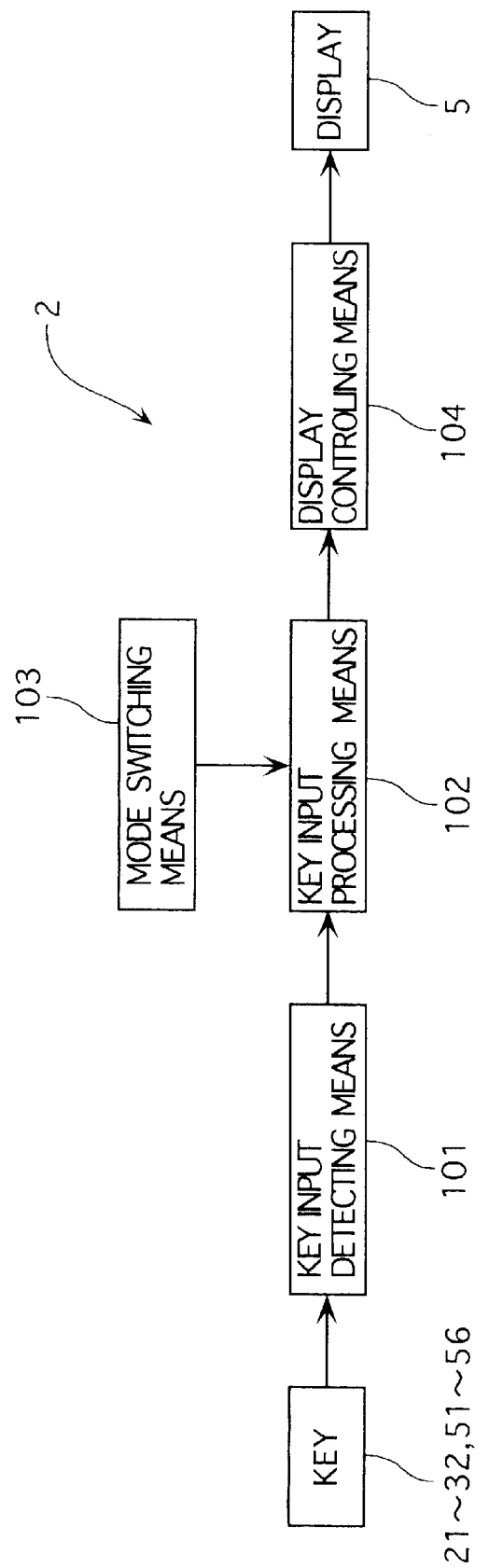
FIG. 3 is a block diagram of an interior configuration of the keyboard input apparatus of the foregoing first embodiment.

In other words, the keyboard input apparatus 2 of the present embodiment is also provided with the identical key input detecting means 101 and the key input processing means 102, as shown in FIG. 3 of the foregoing first embodiment and whether any of the keys 221 through 232 and 271 through 282 has been pressed or not is checked by the key input detecting means 101. For instance, an input can be checked by executing a timer interruption at a certain cycle (for example at 1–10 m/s) and examine the I/O port allotted for each of the keys 221 through 232 and 271 through 282.

When it is judged that an input has been invalid, timer interruption is to be repeated at a certain cycle and an input is to be awaited. On the other hand, if a key input has been judged to be valid, input processing is carried out by the key input processing means 102.

In the event the mode switching operation is executed by pressing the keys 280 through 282, the mode switching means will be set in operation and the input modes of the key input processing means 102 will be changed and set accordingly.

The input processing means 102 processes so that the prescribed numerals and characters are outputted according to the input mode set and the key inputted. Outputted numerals and characters are exhibited on a liquid crystal display 5 via display control means 104.

Next will be described in detail the output processing of the numerals and characters by the key input processing means.

First, in the event that the input mode is set in the numeric input mode, the key input processing means 102 outputs the numerals set to the keys 221 through 232 when one of the keys 221 through 232 is pressed. Consequently, when a telephone is ready for transmission the telephone can be used by inputting a telephone number, and when the telephone is ready for an input of a telephone number through the telephone book, the telephone number can be inputted and registered.

Again, since the main keys 221 through 232 are arranged in the same way as the foregoing fist embodiment, when the Japanese input mode or the English input mode is set, characters corresponding to the manipulation of the key will be outputted and displayed on the liquid display 5 by the identical manipulation, as shown in FIGS. 4 and 5 of the first embodiment Similar operational effects can also be attained in the present embodiment as with 1) through 20) of the foregoing first embodiment.

24) Moreover, addition of the function keys 271 through 282 to the keys of the first embodiment, enables to set more convenient functions for inputting characters or for using the telephone, thereby improving the working efficiency.

25) Various Function Keys 271 through 282 are arranged around the main keys 221 through 232, which are used extensively for inputting characters, so that fingers have an easy access to each of the function keys 271 through 282 from the main keys 221 through 232, and when the keys 224 through 226 are made to be the home position, for example, not only the main keys 221 through 232, but also the various function keys 271 through 282 can be accessed with ease, thereby improving the working efficiency.

Next will be described a sixth embodiment of the present invention with reference to FIGS. 13 through 19. The present embodiment, similar to the foregoing embodiment 5, relates to the keyboard input apparatus 2 of the portable telephone 200, differing however in the character key layout set to the main keys 221 through 232, the positions of each of the main keys 221 through 232, and positions and contents of various function keys 251 through 262.

The portable telephone is provided with a microphone 3, a speaker 4 and a liquid crystal display 5 and also a keyboard input apparatus 2 (key inputting section) with a plurality of keys.

Figure 14:
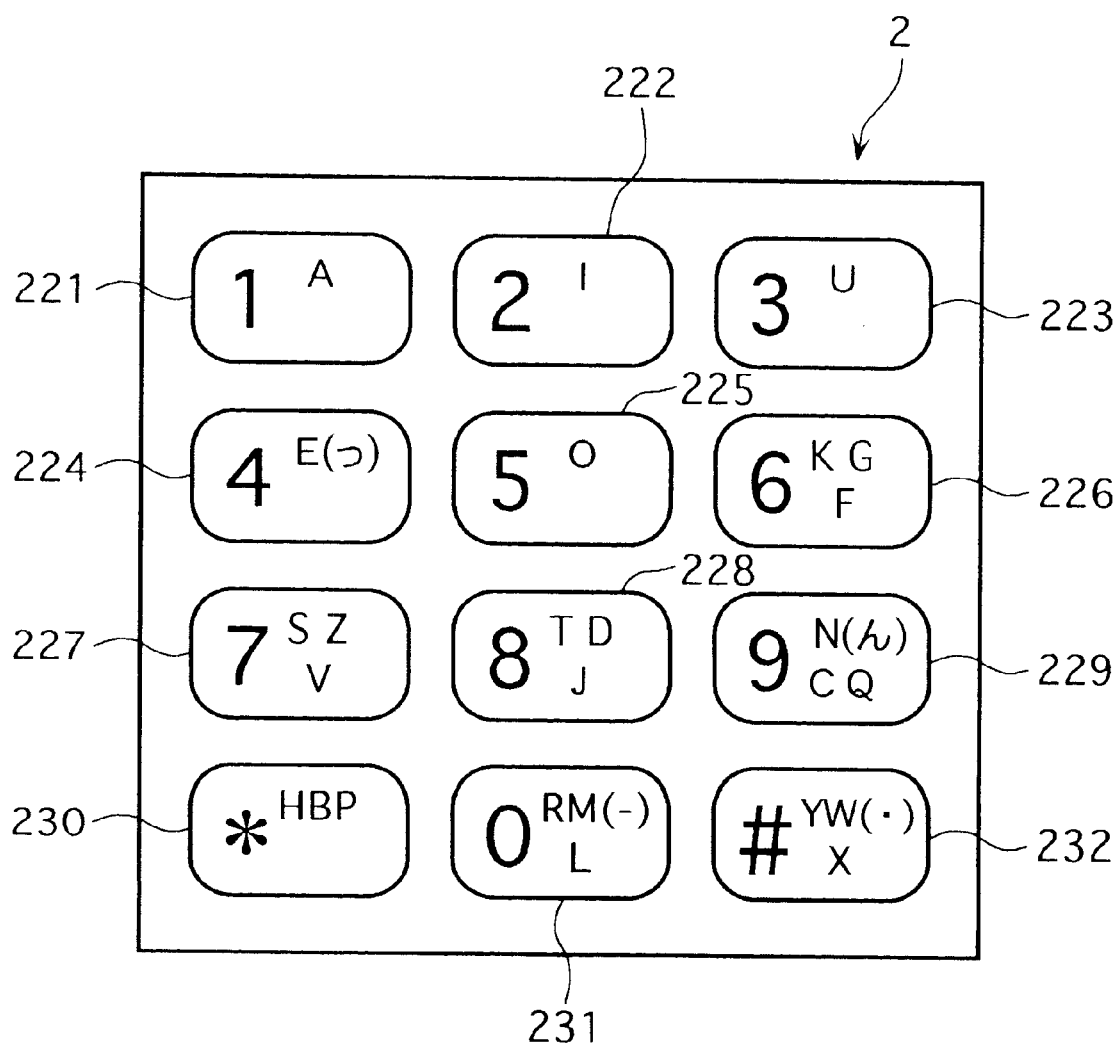
FIG. 14 is a plan view of the main part of the key layout of the keyboard input apparatus of the foregoing sixth embodiment.

In the keyboard input apparatus 2, a total of 24 keys are arranged in a matrix array of 6 horizontal rows and 4 vertical columns and on the right lower side thereof are 12 main keys, 221 through 232, for inputting numerals and characters, arranged in a matrix of 4 horizontal rows and 3 vertical columns, as shown in FIG. 14. Function keys 251 through 262 are set to the remaining 12 keys.

Characters and functions are set to the main keys 221 through 232 and function keys 251 through 262.

In other words, on the left side of the key tops of the main keys 221 through 232 are set numeric keys used for inputting telephone numbers and the like and on the right side are set character keys such as characters of the Alphabet for inputting English and Japanese in the Romanized character input mode.

The character key arrangement of the foregoing main keys 221 through 232 is such that the vowels are set in the upper rows and underneath thereof are set in the order from top downwards the consonant keys which are used to input the "か行/KA Group/" through "わ行/WA Group/" in combination with the aforementioned vowels in the Romanized character input mode. In other words, the character arrangement of the present embodiment takes into consideration, similar to the first through the fifth embodiments, the facility of inputting Japanese with the Romanized character input method.

More specifically, numerals are set to the keys 221 through 232, as shown in FIG. 14, to enable telephone manipulation in the order starting from the top left row as follows: the numeral "1" is set to the key 221; the numeral "2" to the key 222; the numeral "3" to the key 223; the numeral "4" to the key 224; the numeral "5" to the key 225; the numeral "6" to the key 226; the numeral "7" to the key 227; the numeral "8" to the key 228; the numeral "9" to the key 229; the symbol "*" to the key 230; the numeral "0" to the key 231 and the symbol "#" to the key 232.

Further, in regard to the character arrangement, the characters "A", "I", "U", "E" and "O", expressing the vowels, are set as first character keys to each of the keys 221 through 225.

This character arrangement is made such that the vowels, "A", "I", "U", "E", and "O" are positioned from left to right and from the first to the second row in this order to facilitate remembering of the character positions.

Alternatively, the consonant keys "K", "S", "T", "N", "H", "R" and "Y", expressing the Japanese consonants, are set as first character keys to each of the keys 226 through 232. This character arrangement takes into consideration that the consonants of the following groups, namely, the "か行"/KA Group/, "さ行"/SA Group/, "た行"/TA Group/, "な行"/NA Group/, "は行"/HA Group/, "ら行"/RA Group/ and "や行"/Ya Group/ can be arranged approximately in accordance with the Japanese Syllabary arrangement.

Further, the consonant keys "M" and "W" are set as second character keys to the keys 231 add 232. This arrangement takes into consideration that the remaining "ま行"/MA Group/, and "わ行"/WA Group/ can be lined up together. Further more, the character "M" may be set to the key 231 as a first character key and the character "R" as a second character key.

Further, the characters "G", "Z "D" "ん" and "B" are set to each of the keys 226 through 230 as second character keys. More specifically, the consonants "G", "Z", "D" and "B" for inputting Voiced sounds of the "が行"/GA Group/, "ザ行"/ZA Group/, "だ行"/DA Group/ and "ば行"/Ba Group/ are arranged in correspondence with the consonants "K", "T" and "H" for inputting Voiceless sounds of the "か行"/KA Group/, "さ行"/SA Group/, "た行"/TA Group/, and "は行"/HA Group.

Since the character "N" for inputting the "な行/NA Group/" is used in the Romanized character input mode for inputting the Nasal sound "ん", the key 229, where the character "N" is set, can be made to input also the character "ん" as a second character key, so as to facilitate remembering of the key manipulation.

Further, the character "P" for inputting the "ば行/PA Group/" is set as a third character code to the key 230 where the characters "H" and "B" are set for inputting the "は行/HA Group/" and "ば行/Ba Group", making it easy to remember the input operation of the "PA Group" and thereby improving the manipulation efficiency.

Moreover the long vowel symbol "—", and the dot "." are set as third character keys to the keys 231 and 232 in the Japanese input mode.

Moreover the long sound vowel key "つ"/t/ is set as a second character code to the vowel key 224 where the character "E" is set. Since the character "E" is rarely used in repetition, the long sound vowel key "つ"/t/ is made to be outputted when the key 224 is pressed twice in succession.

These characters are inscribed on the upper right side of each of the keys 221 through 232 as shown in FIG. 14.

Further, characters which are used exclusively for English are inscribed on the lower right side of the keys 221 through 232 and are set as third character keys (partially as second character keys).

The characters "F", "V" and "J" are set as third character keys to the keys 226 through 228, respectively.

The character "C" is set as a second character key to the key 229 and the character "Q" as a third character key in the English input mode.

Further, the characters "L" and "X" are set as third character keys in the keys 231 and 232 in the English input mode.

Consequently, as regards the 26 characters of the Alphabet, the vowels "A", "I", "U", "E" and "O" are set independently to the 5 keys, 221 through 225, of the 12 main keys, 221 through 232, and the remaining 21 characters are set to the other keys, 226 through 232, in groups of three, respectively. More specifically, characters are set to each key as follows: the characters "K", "G" and "F" are set to the key 226; the characters "S", "Z" and "V" are set to the key 227; the characters "T", "D" and "J" are set to the key 228; the characters "N", "C" and "Q" are set to the key 229; the characters "H", "B" and "P" are set to the key 230, the characters "R", "M" and "L" are set to the key 231; and the characters "Y", "W", "X" are set to the key 232.

Figure 13:
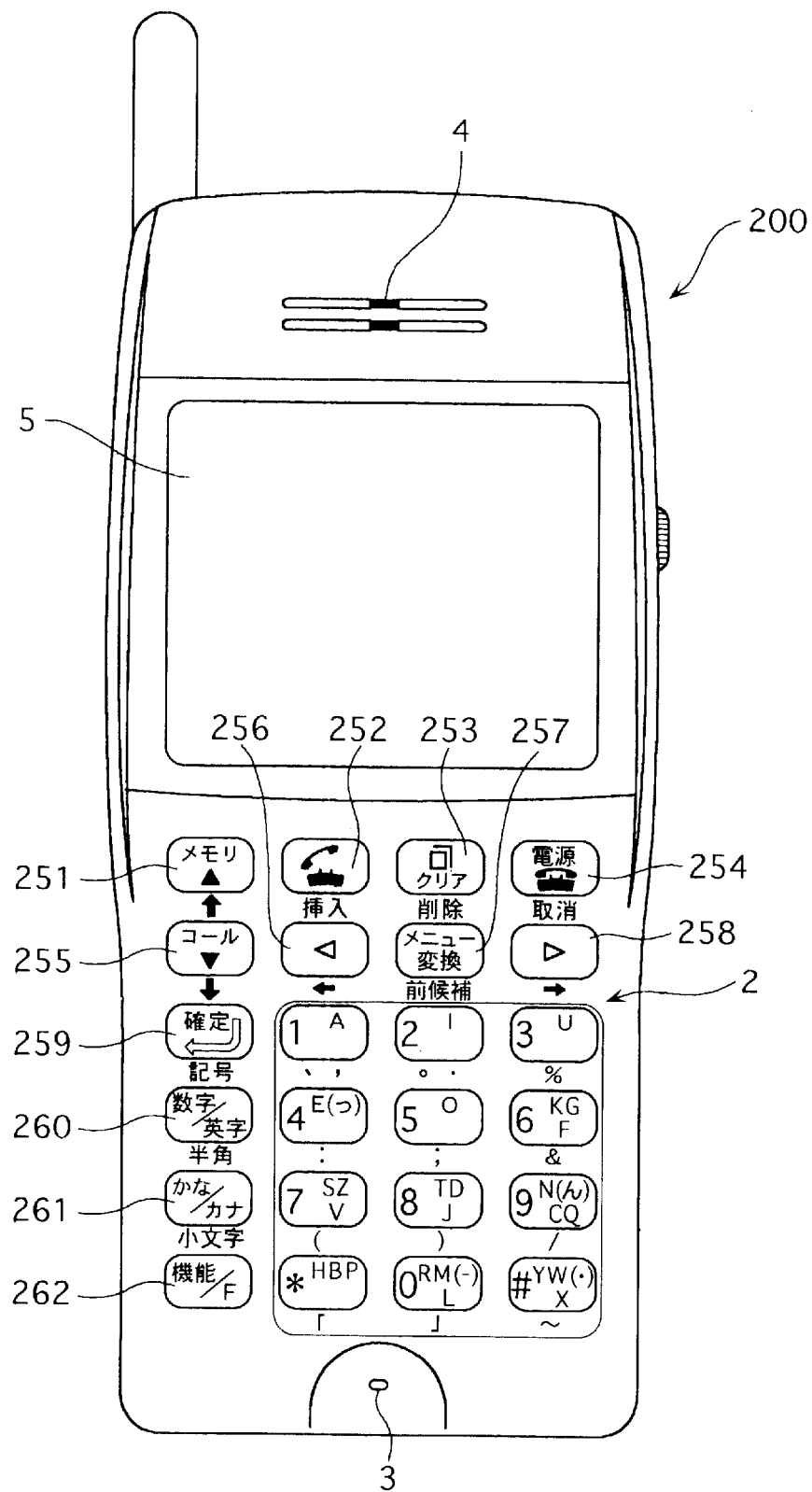
FIG. 13 is a front view of a portable telephone adapted for the keyboard input apparatus of a sixth embodiment of the present invention.

On the other hand, various functions used in connection with the telephone are set to the function keys 251 through 262 as well as the function for inputting characters, as shown in FIG. 13.

As regards each of the keys 251 through 259, one pressing operation of each of the keys 251 through 259 executes a function inscribed on the lower side of the keys, whereas two pressing operations execute a function inscribed on the upper side of the keys.

In other words, a key advancing function (cursor key) is set to C the keys 251, 255, 256 and 258.

A function for displaying various menus and conversion function for changing inputted Japanese into Chinese characters and so on, are set to the key 257. A return key and a confirming function for the conversion key is set to the key 259.

As regards the function keys 260 through 262, one pressing operation on any of the keys 260 through 262 executes a function inscribed on the left side of the keys while two pressing operations execute a function inscribed on the right side of the keys.

That is to say that a switching function for the numeric input mode and English Input Mode is set to the key 260.

Again, switching function for the" Hiragana Input Mode" and "Katakana Input Mode" is set to the key 261.

It must be added that although the keys 260 and 261 are used to confirm a key input in various modes, they may also be used as keys to convert later the inputted keys into Numerals, Alphabet, Hiragana and Katakana.

A function key for extensions and the "F" (function) keys are set to the key 262. More precisely, when any of the keys 251 through 261 is pressed while the key 262 is being held down, functions inscribed on the lower part of each of the keys 251 through 261 will be executed.

More specifically, the following functions are executed when the keys are pressed while the key 262 is being held down: a "Page-up Function" is executed when the key 251 is pressed; an "Insert Mode Function" is selected when the key 252 is pressed; a "Deletion Function is executed when the key 253 is pressed; a "Cancellation Function" is executed when the key 254 is pressed; a "Page-down Function" is executed when the key 255 is pressed; a "Line-head moving Function" is executed when the key 256 is pressed; a "Previous-candidate in Kanji Conversion" is executed when the key 257 is pressed; and a "Line-end moving Function" is executed when the key 258 is pressed.

Moreover, when the key 259 is pressed while the key 262 is being held down, a Symbol input mode is selected, and when the key 260 is pressed simultaneously, the Half-size input mode is set, or executes a function of converting the inputted characters into a half size, and when the key 261 is pressed simultaneously, a Small letter conversion function" is executed.

Again, when any of the keys 221 through 232 is pressed while the key 262 is being held down, symbols inscribed on the lower side of each of the keys 221 through 232 will be inputted. More precisely, when the key 221 is pressed once while the key 262 is being held down, the Japanese comma " ﹑ " is inputted, while the Alphabetical comma "," is inputted when the key is pressed twice. Similarly, when other keys 222 through 232 and the key 262 are pressed simultaneously, the following symbols are inputted; "○", ".", "%", ";", "&", "(",")", "/", "[","]" and "~".

Further, when the numerals keys from "1" through "99" are pressed after pressing the key 262 twice, functions set to "F01" through "F99" are executed.

Figure 15:
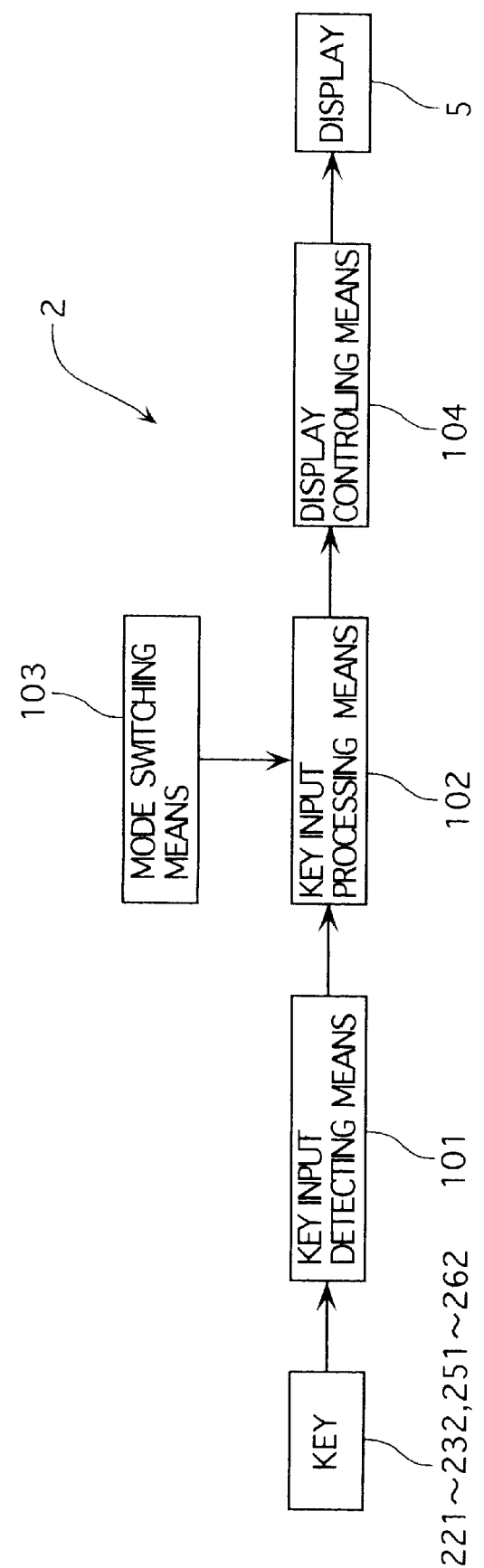
FIG. 15 is a block diagram showing an interior composition of the keyboard input apparatus of the foregoing sixth embodiment.

Next will be described an input processing function of the keyboard input apparatus 2 with the foregoing key arrangement with reference to a block diagram of FIG. 15.

First, whether any of the keys 221 through 232, 251 through 262 has been pressed or not is detected by a detecting means 101. For instance, an input can be checked by executing a timer interruption at a certain cycle (for example at 1–10 m/s) and examine, for instance the I/O port allotted for each of the keys 221 through 232 and 251 through 262.

When it is judged that an input has been invalid, timer interruption is to be repeated at a certain cycle and an input is to be awaited. On the other hand, if a key input is judged to be valid, input processing will be carried out by the key input processing means 102.

In the event the mode selection operation has been executed by pressing the keys 260 and 261, the mode switching means 103 will be set in operation and the input mode of the key input processing means 102 will be selected and set accordingly.

The input processing means 102 processes so that the prescribed numerals and characters are outputted according to the input modes set and keys inputted. The outputted numerals and characters are displayed on a liquid crystal display 5 via display control means 104.

Next will be described in detail the output processing of the numerals and characters by the key input processing means 102.

First, in the event that the input mode is set in the numeric input mode, the key input processing means 102 outputs the numerals set to each of the keys 221 through 232 when one of the keys 221 through 232 is pressed. Consequently, when a telephone is ready for transmission, the telephone can be used by inputting a telephone number, and when the telephone is ready for an input of a telephone number through the telephone book ,the telephone number can be inputted and registered.

Again, in the case where the Japanese input mode is set, characters(Katakana) will be outputted corresponding to the manipulation of the keys and displayed on the liquid display 5 as shown in FIG. 16.

More precisely, when the keys 221 through 225 are pressed once, characters "ア" through "オ" are outputted. Now, when the vowel keys 221 through 225 are pressed after pressing the consonant Keys 226 through 232, Voiceless sounds "カ" through "ワ" will be outputted. In other words, by pressing the key 226 once the key "K" is selected and when the key 221 is pressed in succession the key "A" is selected, giving "K plus A", and outputs the character " カ "/KA. Similarly, the character " キ "/KI/ is outputted when the keys 226 and 222 are pressed in succession.

Furthermore, when the key 232 is pressed twice, the character "W" is selected and when the key 221 is pressed the character "A" is selected, giving "W plus A", and outputting " ワ "/WA/.

The same goes true with the other Voiceless sounds: characters in the " カ行 "/KA Group/ through "ワ行"/WA Group/ are outputted when the vowel keys 221 through 225 are pressed after selecting a first or a second character by pressing once or twice the keys 226 through 232.

Further, the voiced sounds of "ガ行"/GA group/, "ザ行"/ZA group, " ダ行 "/DA group and " バ行 "/BA group/ are outputted when the vowel keys 221 through 225 are pressed after selecting the characters "G", "Z", "D" and "B" by pressing twice the keys 226 through 228 and 230.

Further, characters "パ"PA/, "ピ"/PI/, " プ "/PU/, " ペ "/PE/ and "ポ"/PO/ are outputted when the vowels keys 221 through 225 are pressed after selecting the third character key "P" by pressing the key 230 three times.

When the key 224 is pressed twice, a second character key, the long sound vowel key "ッ"/t/ is outputted and when the key 229 is pressed twice a second character key, the Nasal sound "ン" is outputted.

Moreover, Twisted sounds can be outputted by pressing the character "Y" of the key 232 between a consonant and a vowel. For instance, when the keys 226, 232 and 221 are pressed once in this order it becomes "K plus Y plus A", outputting " キャ "/KYA/. Similarly, when the keys 232 and 225 are pressed once in this order after pressing the key 226 twice, it becomes "G plus Y plus 0", outputting " ギョ "/GYO/.

Likewise, when the key 221 is pressed once while the key 262 is being held down, a Japanese "comma is outputted and when the key is pressed twice, an Alphabetical comma "," is outputted. Similarly, when any of the keys 222 through 232 is pressed together with the key 262, the symbols " ○ ", "~" and so on are outputted.

Further, when the numerals "01" through "99" are inputted by the keys 221 through 232 after pressing the key 262 twice, functions as set in "F01" through "F99" are executed, as shown in FIG. 18, Now, when inputting the Japanese Syllabary in Katakana with a conventional portable telephone, each character has to be confirmed by pressing the cursor key to advance a character, the present embodiment, however, adopts the Romanized character input method where the keys are pressed basically in the order of "a consonant plus a vowel", characters, therefore, can be confirmed the moment any of the vowel keys 221 through 225 is pressed once (with the keys 224 and 229, after two key pressing operations), making a special key advancing process unnecessary.

Further, in this embodiment an example of Katakana input has been shown to demonstrate the Japanese input method, but ordinary Japanese input with a mixture of Hiragana and Kanji is just as well possible by executing the Kanji conversion function by operating the key 257 after inputting the characters by selecting the Hiragana input mode by pressing the key 261.

On the other hand, when set in the English input mode, characters (Alphabet) are outputted corresponding to the key input manipulation and exhibited on the liquid crystal display 5, as shown in Diagram 19.

In other words, when the keys 221 through 225 are pressed once, characters "A" through "O are outputted.

When the keys 226 through 232 are pressed once, first character keys, "K", "S", "T", "N", "H", "R" and "Y" are outputted.

When the keys 226 through 232 are pressed twice, the characters "G", "Z", "D", "C", "B", "M" and "W" are outputted.

Furthermore, when the keys 226 through 232 are pressed three times, the characters "F", "V", "J", "Q", "L" and "X" are outputted.

In order to input small letters of the Alphabet, the key 262 may be pressed together with the key 261 where a Small letter conversion function is set, after pressing a key for inputting the Alphabet. The keys 261 and 262 may be pressed beforehand to select the Small letter input mode.

As regards the characters of the Alphabet, since a certain rule such as "a consonant plus a vowel" does not exist as in the Romanized character input method, it is not possible to distinguish, for example, whether the key 226 has been pressed once and then two times to input the characters "K" and "G", or whether it has been pressed three times to input the character "F". For this reason, it has been set so that each character can be confirmed by either pressing the cursor moving key 258 or inputting another key such as the Entry key 259.

For instance, when the characters "K" and "G" are to be inputted in succession, the key 258 may be pressed after pressing once the key 226 to confirm the character "K", and then the key 258 may be pressed after pressing twice the key 226 to confirm the character "G".

Moreover, when characters set to different keys are to be inputted in succession, the characters are arranged so that they do not have to be confirmed by pressing the key 258. In other words, when the characters "K" and "S" are to be inputted in succession, the key 227 may be pressed after pressing once the key 226.

Also in the present embodiment the operational effects 1) through 20), and 22) through 24) of the foregoing embodiments can be attained.

26) Moreover, as regards the keys 226 through 232 where the consonants are set, characters of the Alphabet, also used for the Romanized Japanese Character input mode, are inscribed on the upper part of each of the keys 226 through 232, and characters of the Alphabet which are used only for the English input are inscribed on the lower side of each of the keys 226 through 232, enabling the same arrangement for the Alphabet used commonly for both Japanese and English, thereby facilitating learning of the key positions. For this reason, particularly when the Japanese input mode and English input mode are to be used simultaneously, it is easy to remember the key arrangement and key input operation can be even more improved.

In addition, since characters of the Alphabet used only for inputting English are inscribed on the lower part of the keys 226 through 232, it is easy to differentiate the characters used for the Japanese input and the English input, improving the manipulation efficiency even more.

Next will be described a seventh embodiment of the present invention with reference to FIG. 20 through FIG. 24. The present embodiment, similar to the foregoing first embodiment, relates to a key input apparatus 2 of the portable telephone 1 with the only exception that character arrangement of each of the main keys 21 through 32 is different.

More specifically, to each of the keys 21 through 32 are set numerals for operating a phone in the order starting from top left: the numeral "1" is set to the key 21; the numeral "2" to the key 22; the numeral "3" to the key 23; the numeral "4" to the key 24; the numeral "5" to the key 25; the numeral "6" to the key 26; the numeral "7" to the key 27; the numeral "8" to the key 28; the numeral "9" to the key 29; the symbol "*" to the key 30; the numeral "0" to the key 31; and the symbol "#" to the key 32.

On each of the keys 21 through 25 are set as first character keys the characters "A", "I", "U", "E" and "O", respectively, for expressing the vowels.

On the other hand, character keys expressing the Japanese consonants, "K", "S", "T", "N", "H", "M" and "Y", are set as first character keys to each of the keys 26 through 32. This character arrangement takes into consideration that the consonants of the "か行"/KA Group/, "さ行"/SA Group/, "た行"/TA Group/, "な行"/NA Group/, "は行"/HA Group/, "ま行"/MA Group/ and "や行"/Ya Group/ can be laid approximately in accordance with the Japanese Syllabary arrangement.

Further, consonant keys "R" and "W" are set as second character keys to the keys 31 and 32. This arrangement takes into consideration that the remaining "ら行"/RA Group/, and "わ行"/WA Group/ can be lined up together.

Further, the characters "G", "Z", "D", "ん" and "B" are arranged on each of the keys 26 through 30 as second character keys. More specifically, the consonants "G", "Z", "D" and "B" for inputting the Voiced sounds of the "が行"/GA Group/, "ザ行"/ZA Group/, "だ行"/DA Group/ and "ば行"/Ba Group/ are arranged in correspondence with the consonants "K", "S", "T" and "H" for inputting the Voiceless sounds of the "か行"/KA Group/, "さ行"/SA Group/, "た行"/TA Group/, and "は行"/HA Group.

Further, since the character "N", which is used to input the "な行/NA Group/", is used in the Romanized character input mode for the Nasal sound "ん", the key 29, where the character "N" is set, is also used to input the character "ん" as a second character key.

Further, the character "P" for inputting the "ば行/PA Group/" is set to the key 30 as a third character code. Moreover, the long sound vowel key "つ"/t/ is set as a third character code to the key 32.

Figure 21:
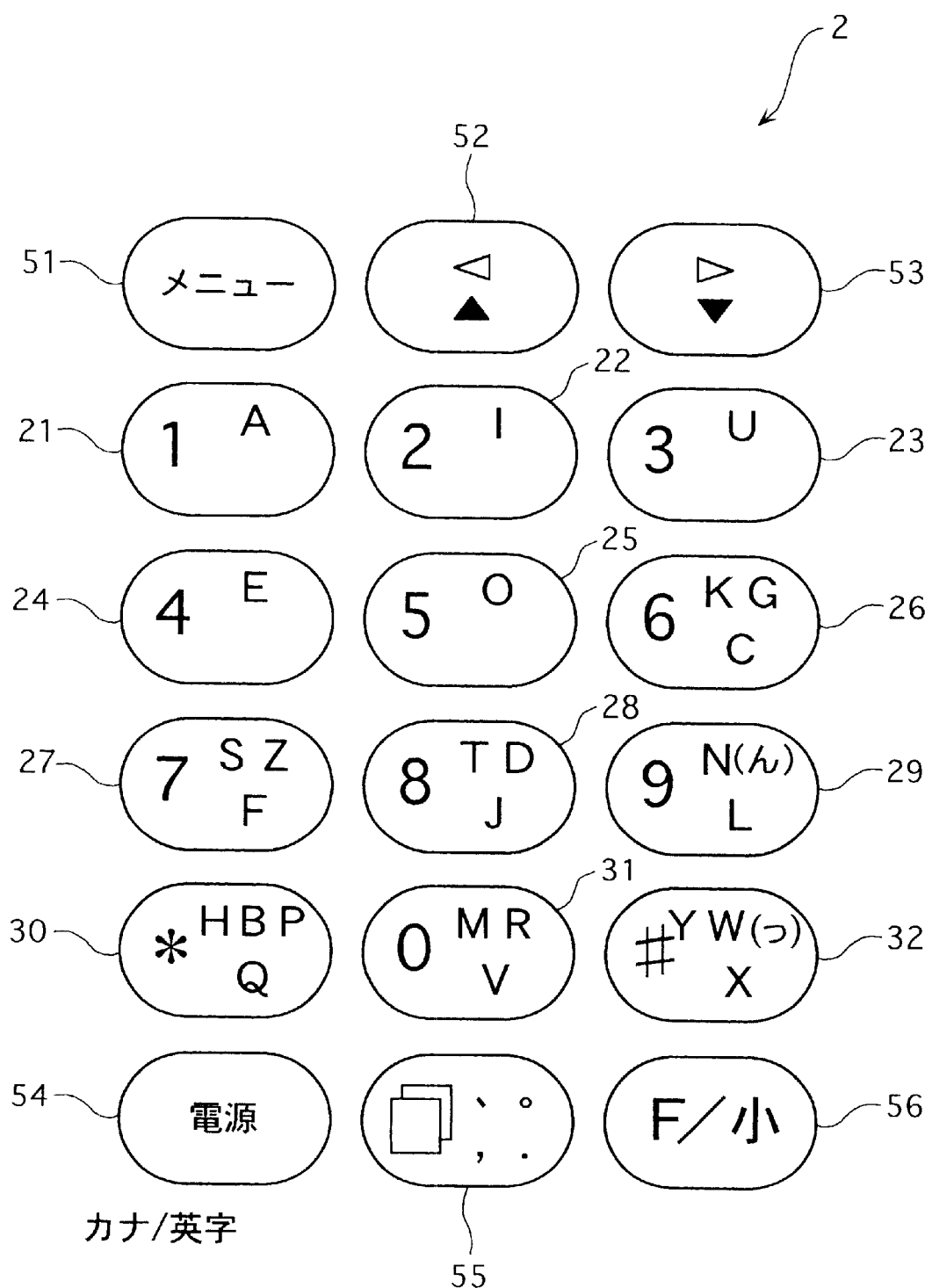
FIG. 21 is a plan view of the key layout of the keyboard input apparatus of the foregoing seventh embodiment.

These characters are inscribed on the right upper side of the keys 21 through 32,respectively, as shown in FIG. 21

Further, on the right lower side of the keys 21 through 32 are inscribed characters used exclusively for the English input and are respectively set as third character keys (partially as fourth character keys).

In other words, the characters "C", "F", "J", "L" and "V" are set to the keys 26 through 29 and 31 as third character keys. Again, the characters "Q" and "X" are set to the keys 30 and 32 as fourth character keys.

On the other hand, the function keys 51 through 56 are identical to the foregoing first embodiment.

Similar to the foregoing first embodiment, it is possible with the present embodiment, to input a character by pressing any of the keys 21 through 32 a necessary number of times. When the vowel keys 21 through 25 are pressed once in the Japanese input mode, the characters "ア" through "オ" are outputted as shown in FIG. 22. Moreover, each character of the "カ行"/KA Group through "わ行"/WA Group/ can be outputted when the vowel keys 21 through 25 are pressed after selecting the first or second character keys by pressing once or twice the consonant keys 23 through 32.

Moreover, Voiced sounds of the "ガ行"/Ga Group/, "ザ行"/Za Group, "だ行"/Da Group /and "ば行"/BA Group/ can be outputted by pressing the keys 21 through 25, after selecting the characters "G", "Z", "D" and "B" by pressing twice the keys 26 through 28 and 30.

Further, characters "パ"/PA/, "ピ"/PI, "プ"/PU/, "ペ"/PE/, and "ポ"/PO can be outputted by pressing the vowel keys 21 through 25, after selecting the third character key "P" by pressing the key 30 three times.

When the key 32 is pressed three times a third character key ,the long sound vowel key "っ"/t/ is outputted, and when the key 29 is pressed twice, a second character key, the Nasal sound "ん" is outputted. Further, when the character "Y" of the key 32 is pressed between a consonant and a vowel, the Twisted sound is outputted.

Moreover, when the key 55 is pressed once, a Japanese comma " 、 " is outputted and when pressed twice, a Japanese period " 。 " is outputted.

Figure 20:
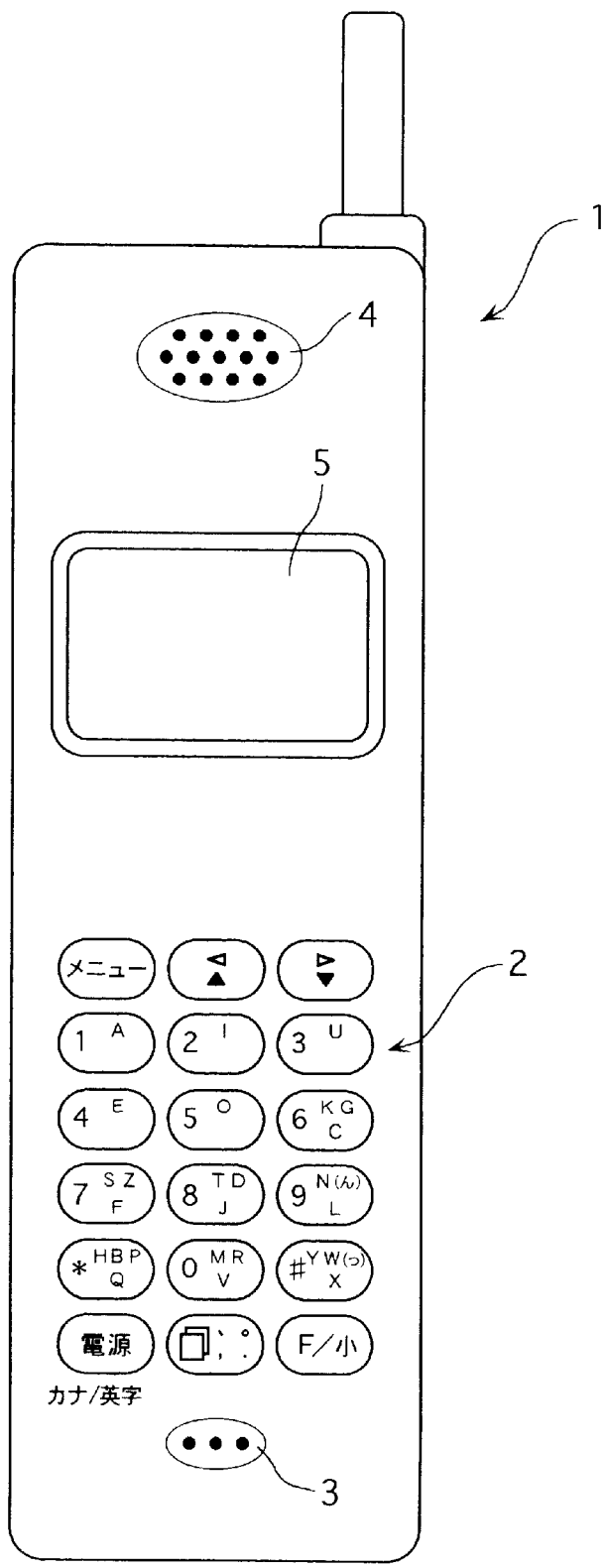
FIG. 20 is a front view of a portable telephone adapted for the keyboard input apparatus of a seventh embodiment of the present invention.

On the other hand, when set in the English input mode, characters (the Alphabet) corresponding to the input manipulation are outputted and exhibited on a liquid crystal display 5, as shown in FIGS. 23 20 and 24.

In other words, when the keys 21 through 25 are pressed once, characters "A" through "O" are outputted and when the keys 26 through 32 are pressed once, the first character keys, "K", "S", "T", "N", "H", "M" and "Y" are outputted.

Moreover, when the keys 26 through 32 are pressed twice, characters "G", "Z", "D", "L", "B", "R", and "W" are outputted. Though the character "L" is set as a third character key to the key 29, character "L" is arranged to be outputted when the key 29 is pressed twice in the English input mode since the character "ん" of the second character key is used only for inputting Japanese.

Furthermore, when the keys 26 through 28,and keys 30 through 32 are pressed three times, characters "C", "F", "J", "P", "V" and "X" are outputted. The character "X" of the key 32 is a fourth character key, but since the third character key "っ"/t/ is used only for inputting Japanese, the character "X" is arranged to be outputted in the English input mode. When the key 30 is pressed four times, the character "Q" is outputted.

Moreover, in order to input the Alphabet in small letters, the key 56 with the Small letter conversion function may be pressed after pressing the keys for inputting the Alphabet, as shown in FIG. 24. It can also be set such that small letters are inputted by the normal manipulation by the menu 51 and they are converted into capital letters when the key 56 is pressed.

In the present embodiment the same operational effects can also be attained as 1) through 20) and 22) through 26) of each of the foregoing embodiment.

Next will be explained an eighth embodiment of the present invention with reference to the drawings. The present embodiment is employed as a keyboard input apparatus 400 for inputting characters and the like on a television receiver set (hereinafter referred to as TV receiver set) or on displays of PCs (personal computers) and so on.

Figure 25:
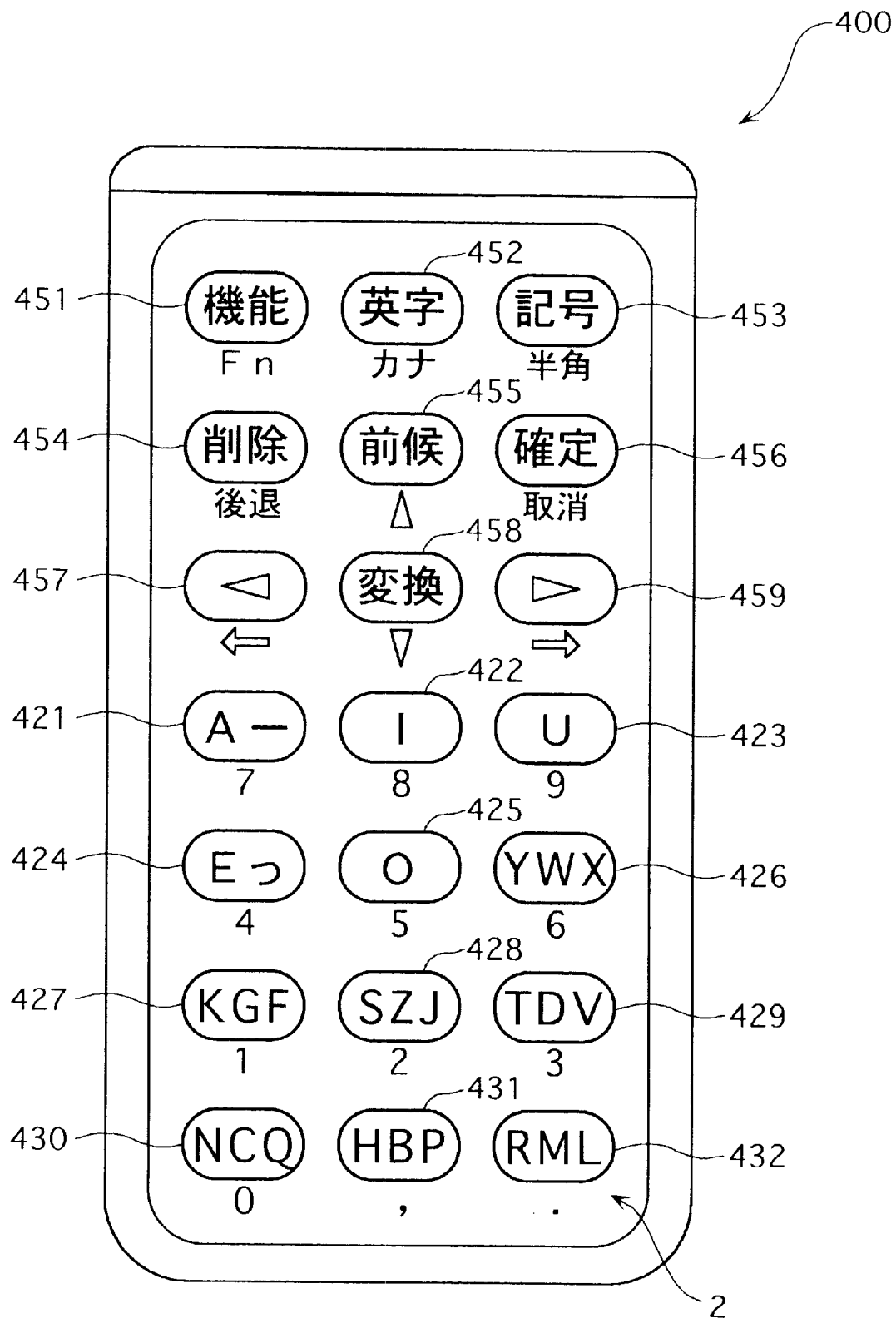
FIG. 25 is a front view of the keyboard input apparatus of an eighth embodiment of the present invention.

FIG. 25 shows a keyboard input section 2 where a plurality of keys are set in the keyboard input apparatus 400 of the present embodiment.

The keyboard inputting section 2 comprises 21 keys in total arranged in a matrix array of 7 horizontal rows and 3 vertical columns and the keys 421 through 432 totaling 12 keys are arranged in the lower side thereof in a matrix of 4 horizontal rows and 3 vertical columns, constituting main keys for inputting numerals and characters. The remaining 9 keys constitute function keys 451 through 459.

Characters and various functions are set to the main keys 421 through 432 and Function keys 451 through 459.

More precisely, on the key tops of the main keys 421 through 432 are set character keys such as the Alphabet used for the English and Japanese Input by the Romanized character input method.

The character key arrangement of the foregoing main keys 421 through 432 is such that the vowels are arranged in the upper rows and underneath are arranged the consonant keys, which are used in combination with the aforementioned vowels, to input the " か行/KA Group/" through "わ行/WA Group/" in the Romanized character input method. In other words, the character arrangement of the present embodiment takes into consideration, similar to the first embodiment, the facility of inputting Japanese with the Romanized character input method.

More specifically, to each key 421 through 425 are arranged the characters "A", "I", "U", "E", and "O" expressing the vowels as first character keys.

This character arrangement takes into consideration the facility of learning such that the characters "A", "I", "U", "E" and "O" are positioned in the order of left to right and from the first to the second row.

Alternatively, consonant keys "K", "S", "T", "N", "H" and "R" expressing the Japanese consonants are set as first character keys on each of the keys 427 through 432 and the consonant key "Y" is set to the key 426. This character arrangement takes into consideration that the consonants of the " か行"/KA Group/, " さ行"/SA Group/, " た行"/TA Group/, "な行"/NA Group/, " は行"/HA Group/, "ら行"/RA Group/ and " や行"/Ya Group/ can be laid approximately in accordance with the Japanese Syllabary arrangement.

Further, consonant keys "M" and "W" are set as second character keys to the keys 432, and 426. This arrangement takes into consideration that the remaining " ま行"/M Group/, and "わ行"/WA Group/ can be lined up together.

Further, the characters "G", "Z", "D" and "B" are set to each of the keys 427 through 429 and 431 as second character keys. More specifically, the consonants "G", "Z", "D" and "B" for inputting Voiced sounds of the "が行"/GA Group/, " ザ行"/ZA Group/, " だ行"/DA Group/ and "ば行"/Ba Group/ are arranged in correspondence with the consonants "K", "S", "T" and "H" for inputting Voiceless sounds of the " か行"/KA Group/, " さ行"/SA Group/, " さ行"/TA Group/, and " は行"/HA Group, so that Voiced sounds and Voiceless sounds can be arranged in correspondence.

Further, the character "P" for inputting the " ば行/PA Group/" is set as a third character key to the key 431 where the characters "H" and "B" are set for inputting the " は行/HA Group/" and "ば行/Ba Group/", which makes it easy to remember the inputting procedure of the "PA Group" and thereby improving the manipulation efficiency.

The key 430 which is used to set the character "N" for inputting the "な行"/NA Group/" is also utilized in the Romanized character input method to input the Nasal sound symbol "ん".

The vowel keys 421 and 424, where the letters "A" and "E" are set, are designated as the long sound vowel key and double consonant vowel key where the long vowel symbol "—" and the long sound vowel key "つ"/t/ are respectively set as second character keys.

Moreover characters "X", "F", "J", and "V" are set to the keys 426 through 429 as third character keys.

Further, the character "C" is set as a second character key in the English input mode to the key 430 and the character "Q" as a third character key.

Further, the character "L" is set as a third character key to the key 432.

Consequently, as regards the 26 characters of the Alphabet, the vowels "A", "I", "U", "E" and "O" are set independently to the 5 keys 421 through 425 of the 12 main keys 421 through 432, and the remaining 21 characters are set to the other keys 426 through 432 in groups of three, respectively. More specifically, the characters "Y W X" are set to the key 426; the characters "KGF" to the key 427; the characters "SZJ" to the key 428; the characters "TDV" to the key 429; the characters "NCQ" to the key 430; the characters "HBP" to the key 431; and the characters "RML" to the key 432, respectively.

On the other hand, character input functions are arranged on the function keys 451 through 459, as shown in FIG. 25.

A function key for extension is arranged on the key 451. More specifically, when any of the keys 452 through 459 is pressed after pressing the key 451, functions inscribed on the lower side of the keys 452 through 459 are executed.

It should be noted that when various function modes are inputted by pressing one of the keys 452 through 459 after the function key 451 has been pressed, the bit (input state) of the Function Key 451 will be released and sets the various function modes inputted.

Further, when any of the keys 421 through 432 is pressed after pressing the key 451, numerals and symbols inscribed on the lower side of each of the keys 421 through 432 are inputted. In other words, the numeral "7" is inputted when the key 421 is pressed after pressing the key 451. Similarly, when each of the keys 422 through 432 is pressed after pressing the key 451 each numeral and symbol, namely, "8", "9", "4", "5", "6", "1", "2", "3", "0", comma "," and period "." are inputted.

Now, when numerals are inputted by pressing the keys 421 through 432 after having pressed the function key 451, the Numeral input mode maintains its state till the function key 451 is pressed once again.

When the key 451 is pressed twice, FN (Function key) mode is set and F01 through F12 can be inputted as in personal computers. In other words, when numerals "01" through "12" are inputted by the keys 421 through 432 after pressing twice the key 451, functions set to the "F01" through "F12" are executed and then returns to its initial state (Japanese Hiragana input mode). In this case, only the input of the numerals "01" through "12" of the Numeric keys become valid and when other numerals or a key other than a numeric key is inputted it becomes invalid and the initial state is resumed.

A switching function for the input mode is set to the keys 452 and 453.

In other words, when the key 452 is pressed once, switching function for English capital letter input mode is executed, and when pressed twice, switching function for English small letter input mode is executed and when pressed once again, the Japanese input mode of the initial condition is resumed.

Further, when the English character key 452 is pressed after pressing the function key 451, the Katakana input mode is selected enabling Katakana to be inputted. In this case, the mode of the function key is released, as explained above.

The release of the Katakana input mode is executed when the function key 451 and the English character key 452 are pressed once again.

A switching function for the Symbol input mode is set to the key 453. When the Symbol key 453 is pressed once a list of symbols appear on the display and input mode will be set. When the key 453 is pressed in succession the list will be advanced to the next and when the precedent candidate key 455 is pressed it returns to the previous list.

Moreover, numbers corresponding to each of the symbols are displayed in the symbol list displayed on the screen and the corresponding symbols can be selected by inputting the numbers on the keys 421 through 432. When keys other than the numeric keys 421 through 432 are inputted it becomes invalid and the initial state (Hiragana input mode) is resumed.

When now the symbol key 453 is pressed again after selecting a symbol the symbol input mode is released.

On the other hand, when the Symbol key 453 is pressed after pressing the function key 451, it will be switched to the Half-size Input Mode and half-sized characters can be inputted. The Half-size input mode can be released by pressing the function key 451 and the Symbol key 453 once again.

A deletion function is set to the key 454 and by each pressing operation characters, numerals and symbols displayed in the position of the cursor (on the right side of the cursor if the cursor is between two characters in the insert mode) are deleted one by one and succeeding characters and the like are shifted one by one to the left. When the deletion key 454 is pressed continuously, the deletion function continues to work in succession.

Further, when the Deletion key 454 is pressed after pressing the function key 451 a reverse function is executed and characters, symbols and the like on the left side of the position of the cursor are deleted one by one and the position of the cursor moves to the left. In this case, continuous reverse (deletion) is executed when the key 454 is pressed in succession. The release of the Reverse mode is executed when the function key 451 and the deletion key 454 are pressed once again.

The key 455 is provided with a function of going back to and selecting the previously converted character which has been converted as a candidate character during the conversion process executed by the Conversion key 458, and each pressing operation retreats the characters proposed in the process of converting to Kanji and Katakana and so on, and display them on the screen, respectively.

Moreover, when the previous candidate key 455 is pressed after pressing the key 451, an up-shift mode is set whereby the position of the cursor presently set is moved to the same position of the precedent line every time the key 455 is operated. Continuous moving is made therefore possible by a successive pressing operation of the key 455. The release of the up-shift mode is executed when the function key 451 and the previous candidate key 455 are pressed once again.

A confirming function for conversion is set to the key 456 which is utilized when a candidate character converted by the conversion key 458 is to be confirmed, or when characters are to be confirmed without the conversion procedure, for instance, when English characters are to be inputted. English characters can be inputted independently by pressing the Confirmation key 456 between characters set on the same key. Thus, one pressing operation of the key 456 will confirm the key inputted and advances the cursor.

Further, a new line will be fed when the key 456 is pressed after an input has been confirmed by pressing the key 456.

Further, when the confirmation key 456 is pressed after pressing the function key 451, a cancellation function is executed and the inputted characters are deleted up to the previously confirmed character (all unconfirmed characters are deleted). Now when the key 451 and the confirmation key 456 are pressed after pressing the conversion key 458, the initial state of input is resumed (the state of Hiragana before the preceding Kanji and Katakana were confirmed). At the same time the function of the function key 451 is released.

Forward and backward keys are set to the keys 457 and 459 and when each of the keys 457 and 459 is pressed once, the cursor moves to the left or right in the same row character by character and when the keys are pressed in succession the cursor moves continuously.

Moreover, when the key 457 is pressed after pressing the function key 451, "line-head moving function" is executed and the cursor is moved to the left end of the line. On the other hand, when the key 459 is pressed after pressing the function key 451, "line-end moving function" is executed and the cursor moves to the right end of the line. When the line-head moving function or the line-end moving function is executed the function of the function key 451 is also released.

A conversion function for converting inputted Japanese Syllabary into Kanji and the like is set to the Conversion key 458 and when pressed once displays a first candidate character for the inputted characters. When the key 458 is pressed again a next candidate character appears. When the key 458 is pressed further and all the candidate characters have been displayed, the initial input state will be resumed.

When the key 458 is pressed after a character has been confirmed, or at the time of inputting numerals or English characters, a space is inputted.

When now the conversion key 458 is pressed after pressing the function key 451, a function for downward moving function is executed and the cursor position presently set moves to the same position one line below with every pressing operation of the key 451. When the key 458 is pressed in succession a continuous relocation is made possible. Moreover, release of the downward moving mode is executed by pressing once again the function key 451 and the Conversion key 458.

Figure 26:
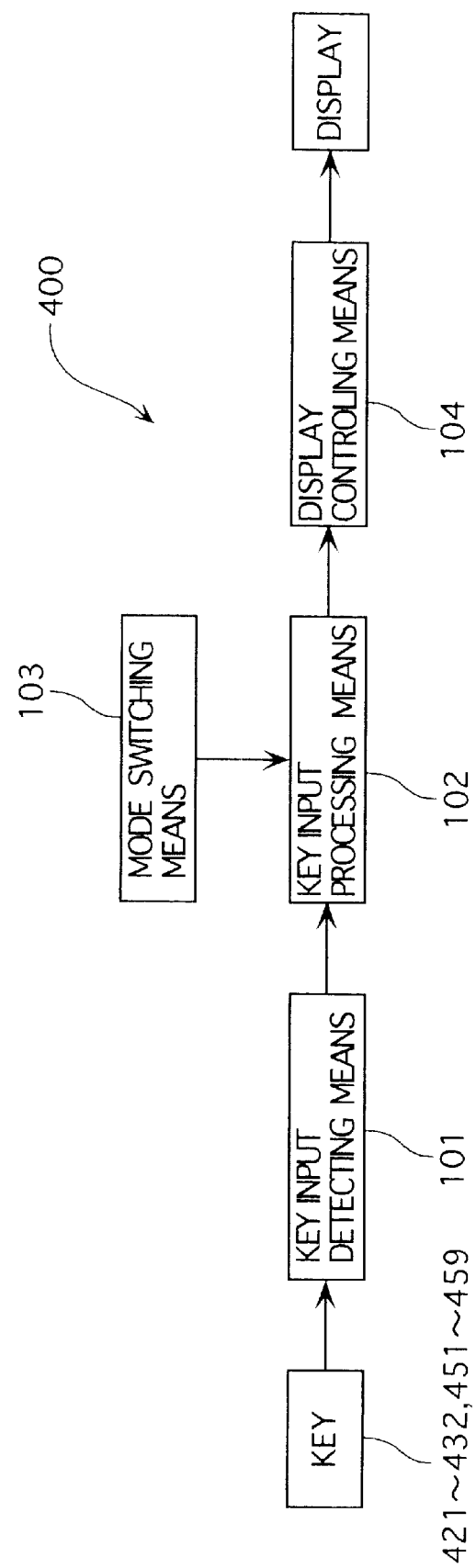
FIG. 26 is a block diagram showing an input process of the keyboard input apparatus of the foregoing eighth embodiment.

Next will be described an input processing function of the keyboard input apparatus 400 with the above described key arrangement with reference to the block diagram, shown in FIG. 26.

First, a key input detecting means 101 detects whether the keys 421 through 432 and keys 451 through 459 have been inputted or not. For instance, an input can be checked by executing a timer interruption at a certain cycle (for example at 1–10 m/s) and examine, for instance, the I/O port allotted for each of the keys 421 through 432 and 451 through 459.

When it is judged that an input is invalid, the timer interruption is to be repeated at a certain cycle and an input is to be awaited. On the other hand, if a key input is judged to be valid, input processing is be executed by the key input processing means 102.

In the event the mode conversion operation has been executed by pressing the keys 452 and 453 after the function key 451, the mode conversion means 103 will be set in operation and the input mode of the key input processing means 102 will be changed and set accordingly.

The input processing means 102 processes so that the prescribed numerals, characters and the like are outputted according to the input modes set and the keys inputted. The outputted numerals and characters are exhibited on a TV display and the like, not shown, via display control means 104.

Next will be described the output processing of numerals and characters by the key input processing means 102.

When set in the Japanese input mode, characters (Hiragana) are outputted and displayed corresponding to the manipulation of the keys on a TV display and the like, as shown in FIG. 27, First explained is an input processing of the Japanese input mode of vowel keys including the vowel keys 422,423 and 425 of the 5 vowel keys 421 through 425, where a long vowel symbol or a long sound vowel key is not set.

When the foregoing vowel keys 422, 423 and 425 are pressed once independently after pressing a key other than a character key, the vowels "い"/I/, "う"/U/ and "お"/O/ are outputted and when pressed twice in succession the same vowels are outputted twice and when pressed three times in succession, the initial state is resumed when the key was pressed once.

When any of the vowel keys 422, 423 and 425 is pressed after pressing other vowel keys 421 through 425, the vowels set to each of the vowel keys 421 through 425 are outputted in the order of input. For instance, when the key 422 is pressed once after pressing the key 421, the vowels "A" set to the key 421 and the vowel "I" set to the key 422 are outputted in the order of "A plus I" giving the characters "あい"/AI/, and when the key 422 is pressed twice after pressing the key 421 the vowel "A" set to the key 421 and the vowel "I" set to the key 422 are outputted in the order of "A plus I plus I", giving the characters "あいい"/AII/. Moreover, when the key 422 is pressed three times in succession after pressing the key 421, the initial state of "A plus I" is resumed when the key 422 was pressed once. The same goes true for the keys 423 and 425.

When any of the vowel keys 422, 423 and 425 is pressed once after pressing other consonant keys 426 through 432, "a consonant plus a vowel" are inputted, and when the vowel keys 422, 423 and 425 are pressed twice "a consonant plus a vowel plus a vowel" are inputted.

For instance when the key 422 is pressed once after selecting the character "K" by pressing once the key 427, characters "K plus I" are inputted, outputting the character "き/KI".

Further when the vowel key 422 is pressed twice in succession after pressing once the key 427, "K plus I plus I" are inputted and the characters "きい" are outputted. Similarly, when the keys 423 and 425 are pressed twice in succession after pressing the key 427, characters "くう/KUU" and "こお/KOO" are outputted.

Also in the event any of the vowel keys 422, 423 and 425 is pressed after pressing the consonant keys 426 through 432, the initial state of "a consonant plus a vowel" is resumed when the vowel key was pressed once.

Next will be described input processing means including the long sound vowel key 421 and the double consonant vowel key 424 respectively.

FIG. 28 shows outputted characters corresponding to the key inputs including the Long Sound vowel key 421.

When the key 421 is pressed once independently after pressing a key other than a character key, the vowel "A" set to the key 421 is inputted and the character "あ"/A/ is outputted.

On the other hand, when the key 421 is pressed twice in succession a second character key, the long vowel symbol "—" is outputted. Again, when the key 421 is pressed three times in succession the vowel A and the long vowel symbol "—" set to the key 421 are inputted in order of "A plus the long vowel symbol, —" and the characters "あ" are outputted.

Further, when the key 421 is pressed four times in succession, the state is resumed when the key was pressed once.

Moreover, also when the key 421 is pressed one to three times after pressing another vowel keys 422 through 425, the character "あ"/A/, the long vowel symbol "—" and "あ plus the long sound symbol —" are inputted following the other vowels, similar to the case where the key 421 is pressed independently.

When any of the vowel keys 422 through 425, for instance the key 421, is pressed once after pressing the key 422, the vowel "I" set to the key 422 and the vowel "A" set to the key 421 are inputted in the order of "I plus A" and the characters "いあ"/IA/ are outputted.

Further, when the key 421 is pressed twice in succession after pressing the key 422, the vowel "I" and the long vowel symbol "—" set to the key 422 are inputted in the order of "I plus —", outputting the character " い—"/I—/.

Moreover, when the key 421 is pressed three times in succession after pressing the key 422, the vowel "I" set to the key 422, and the vowel "A" and the long vowel symbol "—" set to the key 421, are inputted in the order of "I plus A plus —", outputting "あ"/IA—/.

Further, when the key 421 is pressed four times in succession after pressing the key 422, the state of inputting "I plus A" is resumed when the key was pressed once, outputting the characters "いあ"/IA/.

On the other hand, when the key 421 is pressed one to three times after pressing the consonant keys 426 through 432 in the Japanese Input mode, inputted characters are processed basically as "a consonant plus a vowel" combination by the Romanized character input method.

In other words, when the key 421 is pressed once after pressing the consonant keys 426 through 432, "a consonant plus A" are inputted and the characters in the row of "あ"/A/ of the Japanese Syllabary are outputted. When the key 421 is pressed twice, "a consonant plus A plus A" are inputted and the characters in the row of "あ"/A/ and the character "あ"/A/ are outputted. Further ,when the key 421 is pressed three times in succession, "a consonant plus A plus tee long vowel symbol —" are inputted and the characters in the row of "あ" plus the long vowel symbol "—" are outputted.

For instance when the key 421 is pressed once after inputting the consonant "W" by pressing twice the key 426, "W plus A" are inputted and the character "わ"/WA is outputted.

Further, when the key 421 is pressed twice in succession after inputting the consonant "W", "W plus A plus A" are inputted, outputting "わあ"/WAA/.

When the key 421 is pressed three times in succession after inputting the consonant "W", "W plus A plus —" are inputted, outputting "わ—"/WA —/.

If the key 421 is pressed four times in succession, after inputting a consonant, the state of the key 421 is resumed, when the key was pressed once and "a consonant plus A" are inputted.

FIG. 29 shows characters outputted in correspondence with the key inputs, including the double consonant vowel key 424.

When the key 424 is pressed once independently after pressing a key other than a character key, the vowel "E" set on the key 424 is inputted and the character " え" is outputted.

On the other hand ,when the key 424 is pressed twice in succession, a second character key, the long sound vowel key "っ"/t/, is outputted. When now the key 424 is pressed three times in succession, the vowel "E" and the double consonant "っ"/t/ are inputted in the order of "E plus っ/t/", outputting " えっ"/E っ/t/.

Further, when the key 424 is pressed four times in succession, the condition is resumed when the key 424 was pressed once.

Moreover, when the key 424 is pressed one to three times after pressing another vowel keys 421 through 423 and 425, the characters " え", "the long sound vowel key っ/t/" and " え plus っ" are inputted following other vowels, similar to the case where the key 424 is pressed independently.

In other words, when the key 424 is pressed once after pressing the vowel keys 421 through 423 and 425, for instance the key 423, the vowel "U" set to the key 423 and the vowel "E" set to the key 424 are inputted in the order of "U plus E", outputting "うえ/UE/".

Further, when the key 424 is pressed twice in succession after pressing the key 423, the vowel "U" and the long sound vowel key "っ"/t/ set to the key 423 are inputted in the order of "U plus っ", outputting "うっ"/U っ/.

Moreover, when the key 424 is pressed three times in succession after pressing the key 423, the vowel "U" set on the key 423, and the vowel "E" and the long sound vowel key "っ"/t/ set on the key 424, are inputted in the order of "U plus E plus っ", outputting "うえっ"/UE っ/.

Further, when the key 424 is pressed four times in succession after pressing the key 423, the state is resumed when the key was pressed once, and "U plus E" are inputted.

On the other hand, when the key 424 is pressed one to four times after pressing the consonant keys 426 through 432 in the Japanese input mode, inputted characters are processed basically as "a consonant plus a vowel" combination by the Romanized character input method.

In other words, when the key 424 is pressed once after pressing the consonant keys 426 through 432, "a consonant plus E" is inputted and the characters in the row of " え" are outputted. When the key 424 is pressed twice in succession, "a consonant plus E plus E" are inputted and a character in the row of " え" and the character " え" are outputted. Further, when the key 421 is pressed three times, "a consonant plus E plus a long sound vowel key っ/t/" are inputted and a character in the row of " え" plus the long sound vowel key Neo "っ"/t/ are outputted.

For instance when the key 424 is pressed once after inputting the consonant "N" by pressing once the key 430, "N plus E" are inputted, outputting character "ね"/NE/.

Further, when the key 424 is pressed twice in succession after inputting the consonant "N", "N plus E plus E" are inputted, outputting "ねえ"/NEE/.

Moreover, when the key 424 is pressed three times in succession after inputting the consonant "N", "N plus E plus つ" are inputted, outputting "つ"/NE つ/.

Furthermore, when the key 424 is pressed four times in succession after inputting the consonant "N", "N plus E plus E plus つ" are inputted, outputting " ねえっ"/NEE つ/.

Furthermore, when the key 424 is pressed five times in succession after inputting a consonant, the state of "a consonant plus E" is resumed when the key 424 was pressed once.

As described earlier, the first to the third characters set on each of the consonant keys 426 through 432 can be selected by a number of pressing operations on each of the keys 426 through 432. More precisely, when each of the keys 426 through 432 is pressed once, the first character keys, "W", "K", "S", "T", "N", "H" and "R" are inputted, and when pressed twice, the second character key, "W", "G", "Z", "D", "C", "B" and "M" are inputted, and when the key is pressed three times, the third character key, the third character keys, "X", "F", "J", "V", "Q", "P", and "L" are inputted.

Thus, any character of the "か行/KA Group" through "/WA Group" can be outputted by pressing the vowels on the keys 421 through 425 after selecting the first or the second character key by pressing once or twice the keys 426 through 432.

Again, when the vowel keys 421 through 425 are pressed after selecting the characters "G", "Z", "D", and "B" by pressing twice the keys 427 through 429 and 431, various voiced sounds of the "が行/GA Group", "ザ行/ZA Group", "/DA Group" and "ば行/BA Group" can be outputted.

Again, when the vowel keys 421 through 425 are pressed after selecting the third character key "P" by pressing the key 431 three times, characters of "ば/PA", "び/PI", "/PU" and "ペ/PE" and "ぼ/PO can be outputted.

When the keys 426 through 432 are pressed four times in succession, the state is resumed when the keys 426 through 432 are pressed once.

By inputting the character "Y" of the key 426 between a consonant and a vowel, a Twisted sound can be outputted. For instance, pressing the keys 427, 426 and 421 once in turn gives "K plus Y plus A", outputting " キャ/KYA. Further, when the key 426 and 425 are pressed once in turn after pressing the key 427 gives "G plus Y plus O", outputting " //GYO".

Moreover, when the consonant key 430, where the character "N" is set, is pressed once in the Japanese input mode, the character "N" is outputted, and when the key 430 is pressed twice in succession ,the character "ん" is outputted and when the key 430 is pressed three times in succession, characters "ん" and "N" are outputted in the order of " plus N". Now, when the key 430 is pressed four times in succession, the state is resumed when the key 430 was pressed once.

It must however be noted that the character "N" is basically inputted when the key 430 is pressed once, but the character "ん" is outputted, when a key other than a vowel is inputted after the key 430

As has been explained, the characters "C" and "Q", which are the second or the third character keys of the key 430, are set such that they cannot be used in the Japanese Input mode. Therefore, as regards the characters "ちゃ"/TYA, "  "/TYU/ and "ちょ"/TYO ,the keys 429, 426 and 421 are pressed once in the order of "T plus Y plus A" to output "  "/TYA/, and the keys 429, 426 and 423 are pressed once in the order "T plus Y plus U" to output "ちゅ"/TYU/, and the keys 429, 426 and 425 are pressed once in the order of "T plus Y plus O" to output "ちょ"/TYO/.

By pressing the vowels keys 421 through 425 after selecting the character "X" or "L" by pressing three times the key 426 or the key 432, small characters "あ"/A/, " "/I/, "う"/U/, "え"/E/ " お"/O/ are outputted.

Similarly, when the characters "XTU" or "LTU" are inputted by pressing the keys 429 and 423 after selecting the characters "X" of "L" by pressing the key 426 or 432 three times, the long sound vowel key "つ"/t/ is outputted; when the keys 426 and 421 are pressed in turn to input the characters "XYA" or "LYA", the small character "や" is outputted; when the characters "XYU" or "LYU" are inputted by pressing the keys 426 or 423, the small character "ゆ" is outputted; when the characters "XYO" or "LYO" are inputted by pressing the keys 426 and 425 in turn, the small character "よ" is outputted; and when the characters "XWA" or "LWA" are inputted by pressing the key 426 twice and the key 421 in succession the small character " わ" is outputted.

In the Japanese input mode also, when the keys 421 through 430 are pressed after pressing the function keys 451, numerals "0" through "9" are outputted, and when the key 431 is pressed, a comma "," is outputted, and when the key 432 is pressed a period "." is outputted, as shown in FIG. 30

Moreover, when the numerals "01" through "12" are inputted by pressing the keys 421 through 432 after pressing twice the function key 451, the functions set to the keys "F01" through "F12" are executed, as shown in FIG. 31

Although, in a conventional portable telephone, characters are confirmed character by character by pressing the cursor key to move the cursor forward when inputting Hiraganas in the Japanese Syllabary character arrangement, the present embodiment employs the Romanized character input method where keys are basically inputted in the order of "a consonant plus a vowel", where the characters can be confirmed the moment the vowel keys 421 through 425 are pressed (or when the keys 421, 424 and 430 are pressed twice), making the cursor moving operation unnecessary.

Although the present embodiment illustrates a case in which Hiragana is used to input Japanese, Katakana can also be used for inputting Japanese by pressing the key 452 after the key 451 to switch over into the Katakana Input mode. It should be noted that the output processing and the like of various settings and functions of the keyboard input apparatus 400 with the Katakana input mode are identical to those of the Hiragana input mode.

On the other hand, characters (Alphabet) corresponding to the key input manipulation are outputted and exhibited on the display when set in the English capital letter input mode, as shown in FIG. 32.

More precisely, when each of the keys 421 through 425 is pressed once, characters "A" through "O" are outputted, and when pressed twice in succession, the same character is outputted twice, and when pressed three times in succession, the same state is resumed when the key was pressed once.

Further, when each of the keys 426 through 432 is pressed once, first character keys, "Y", "K", "S", "T", "N", "H", and "R" are outputted; when each of the keys 426 through 432 is pressed twice in succession, second character keys, "W", "G", "Z", "D", "C", "B" and "M" are outputted; and when each of the keys "426 through 432 is pressed three times in succession, third character keys, "X", "F", "J", "V", "Q", "P" and "L" are outputted. Further, when each of the keys 426 through 432 is pressed four times in succession, the original state is resumed when the key was pressed once.

In order to input small letters of the Alphabet, the key 452 is pressed twice to set it into the English Small letter input mode.

Since a certain rule such as "a consonant plus a vowel" does not exist in the Alphabet as in the Romanized character input method, it is not possible to distinguish an input where, for instance, the key 427 is pressed once and then twice to input the characters "K" and "G", and where the key 427 is pressed three times to input the character "F". For this reason, when consonants of the same key are to be inputted in succession, characters have to be inputted and confirmed character by character by pressing the Confirmation key 456.

For instance, when the characters "K" and "G" are to be inputted in succession, the character "K" is confirmed by pressing the key 456 after pressing once the key 427, and then the character "G" is confirmed by pressing the key 456 after pressing twice the key 427.

Moreover, when characters set on different keys are to be inputted in succession, the key 456 needs not be pressed to confirm the character. More precisely, in order to input the characters "K" and "S" in succession, the key 428 may be pressed after pressing the key 427

Also in this embodiment, the same operational effects 1) through 19) of the foregoing first embodiment can be attained.

27) Further, a second character key to input the long vowel symbol "—" is set to the vowel key 421, one of the 5 vowel keys of the keys 421 through 425 where the vowels are set, and a second character key for inputting the long sound vowel key "っ"/t/ is set to the key 424, and when the keys 421 and 424 are pressed twice in succession, the long vowel symbol "—" and the double consonant "っ"/t/ can be outputted by the key input processing means 102, hence the long vowel symbol "—" and the long sound vowel key "っ" which are frequently used in Japanese can be inputted with ease whereby character input efficiency can be improved.

Similarly, when the keys 421 and 424 are pressed three times in succession, a vowel and the long vowel symbol "—", or a vowel and the long sound vowel key "っ"/t/ can be easily inputted by the key input processing means 102 in the Japanese language frequently used order of a vowel plus the long vowel symbol "—" and "a vowel plus the long sound vowel key", thereby improving further the input efficiency.

28) When the key 421 is pressed two or three times after pressing any of the four vowel keys 422 through 425 other than the key 421, characters including the Long sound "—" can be outputted with ease, thereby improving the character input efficiency.

Similarly, when the key 424 is pressed two or three times after pressing any of the four vowel keys 421 through 423 and 425 other than the key 424, characters including the long sound vowel key "っ/t/" can be outputted with ease, improving thereby the character input efficiency.

29) When the keys 421 and 424 are pressed three or four times after pressing the consonant keys 426 through 432, the long vowel symbol "—" and the long sound vowel key "っ"/t/ can be inputted following the characters inputted by the "a consonant plus a vowel" combination of the Romanized character input method, enabling to input with ease characters including the long vowel symbol and long sound vowel key, improving thereby character input efficiency also from this point of view.

Taking particularly into consideration the characteristics of the Romanized character input method of the Japanese where the long vowel symbol "—" or the long sound vowel key "っ" never succeed a consonant but a vowel, the long vowel symbol "—" or the long sound vowel key "っ" are arranged to be inputted when the keys 421 and 424 are pressed twice in succession either after a vowel or independently. On the other hand when the keys 421 and 424 are pressed twice in succession after a consonant, it is arranged so that "a consonant plus a vowel plus a vowel" are outputted, and when the keys 421 and 424 are pressed three times in succession, "a consonant plus a vowel plus the long vowel symbol", or "a consonant plus a vowel plus the long sound vowel key" are inputted, taking a full advantage of the characteristics of the Romanized character input method, thereby improving character input efficiency when Japanese is to be inputted.

30) When the Double Sound vowel key 424 is pressed four times after pressing the consonant keys 426 through 432, "a consonant plus a vowel plus a vowel plus the long sound vowel key" are inputted instead of resuming the initial state, so that input of characters with the long sound vowel key can be facilitated, compared with a case where Japanese is inputted by the Romanized character input method, for instance, by inputting "a consonant plus a vowel plus a vowel" and the long sound vowel key "っ"/t/ has to be added afterwards. The manipulation is improved also from this point of view.

31) When Japanese is to be inputted with the Romanized character input method, the vowels "A" and "E" are less likely to be inputted in succession like "A plus A" or "E plus E", compared with other vowels "I", "U", and "O". This point is taken into consideration and the long vowel symbol "—" and the long sound vowel key "っ"/t/ are set as second character keys to the keys 421 and 424 where the characters "A" and "E" are set. By this arrangement inputting of Double vowels, such as, "II", "UU", and "OO" can be executed easily and character input efficiency can be even more improved.

32) When Japanese is to be inputted with the Romanized character input method, the input manipulation and the like can be improved and character input efficiency enhanced by using the consonant key 430 set for the character "N" for inputting the Nasal sound "ん". In particular, since the characters "N plus ん" are never outputted in this order in the Romanized character input method, it is so arranged that "ん plus N" will be outputted, when the key is pressed three times, making it easier to input characters with the Nasal sound, thereby improving also the character input efficiency.

33) Since the function keys 451 through 459 are arranged together in the upper part of the keyboard input apparatus 400 and the main keys 421 through 432 are arranged in the lower part of the key input apparatus 400, key positions can be easily comprehended.

Figure 33:
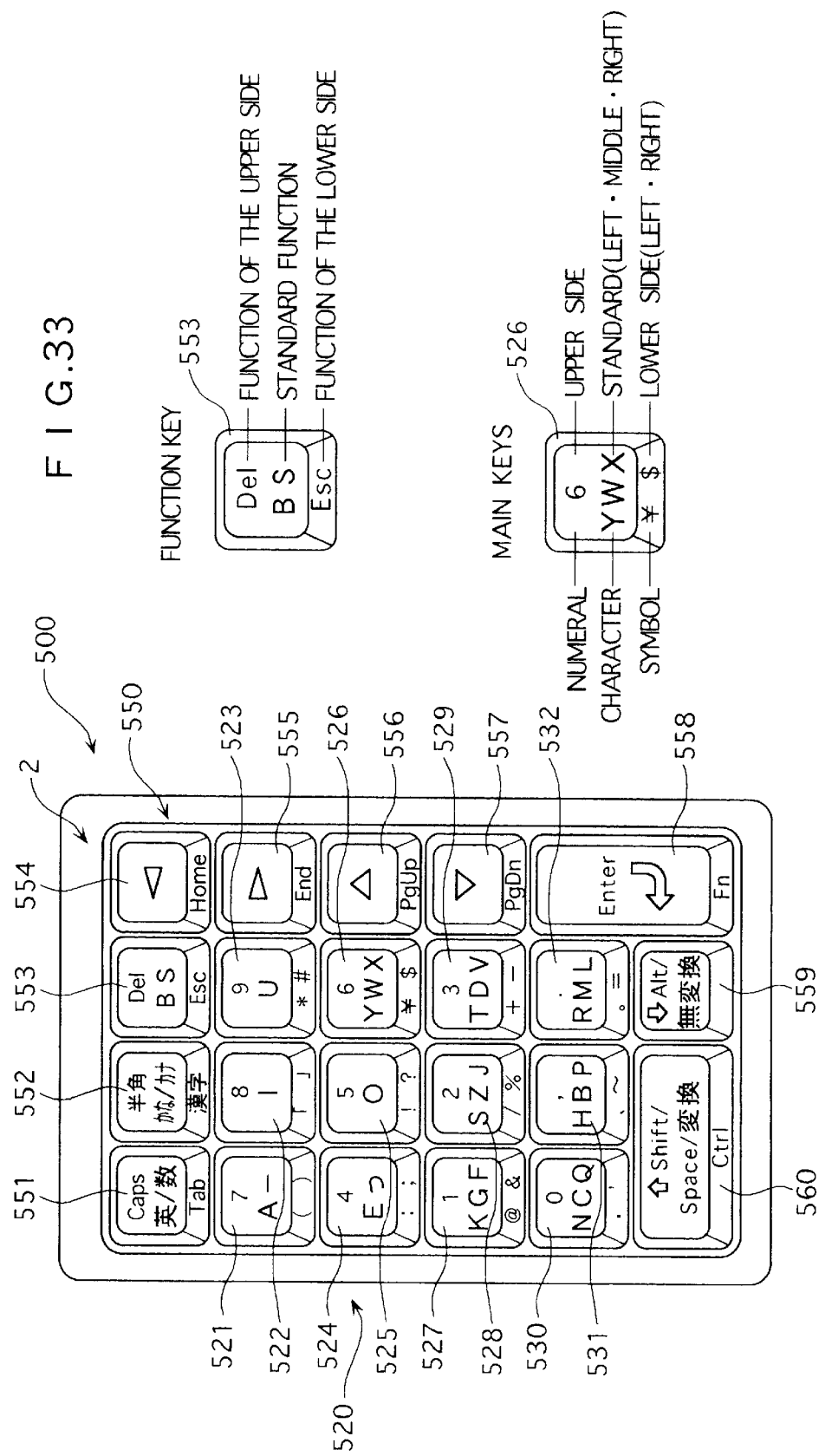
FIG. 33 is a plan view of the main part of the key input apparatus of the ninth embodiment of the present invention.

Next will be described a ninth embodiment of the present embodiment. As is shown in FIG. 33, the keyboard input apparatus of the present embodiment is configured in a ten digit key arrangement. It must be noted that where the comprising parts of the present embodiment are identical or correspond to the foregoing eighth embodiments, same symbols are given and explanations are either eliminated or abbreviated.

The keyboard input apparatus 500 is used as a substitution for a keyboard connected to the body of a personal computer and is used to input characters and the like and, as in the foregoing eighth embodiments, is provided with a key input detecting means, not shown, and a key input processing means for outputting the character keys to the personal computer corresponding to the inputs.

The key input section 2 of the keyboard input apparatus 500 is provided with in total of 12 main keys 521 through 532 , arranged in a matrix array of 4 horizontal rows and 3 vertical columns in the main key area 520, situated approximately in the middle of the keyboard input apparatus 500, and the 10 function keys 551 through 560 are arranged in the function key area 550 surrounding the main key area in the form of the letter C.

Characters and functions are set to the main keys 521 through 532 and the function keys 551 through 560.

The character key arrangement of the foregoing main keys 521 through 532 is almost identical to the foregoing eighth embodiment and the vowels are set to the keys 521 through 525 of the upper row and the consonants are set below in the keys 526 through 532 which are used to input the "か行/KA Group/" through "わ行"/WA Group/" in combination with the aforementioned vowels with the Romanized character input method.

More specifically, to each of the keys 521 through 525 are arranged as first character keys the characters "A", "I", "U", "E", and "O" expressing the vowels Alternatively, the consonant keys "K", "S", "T", "N", "H" and "R" expressing the Japanese consonants are set as first character keys to each of the keys 527 through 532, respectively, and the consonant key "Y" is set to the key 526. Further, consonant keys "M" and "W" are set as second character keys to the keys 532 and 526.

The characters "G", "Z", "D" and "B" are set to each of the keys 527 through 529 and 531 as second character keys. Moreover the character "P" for inputting the "ぱ行/PA Group/ is set to the key 531 where the characters "H" and "B" for inputting the "は行/HA Group/ and the "ば行/BA Group are set.

The key 530, set with the character "N" for inputting the "な行/NA Group/" is also utilized in the Romanized character input method to input the Nasal sound "ん".

The long vowel symbol "—" and the long sound vowel key "つ"/t/ are set as second character keys to the vowel keys 521 and 524 where the characters "A" and "E" are set, The characters "X", "F", "J", and "V" are set to the keys 526 through 529 as third character keys, respectively. The character "C" is set as a second character key to the key 530 and the character "Q" as a third character key in the English input mode. The character "L" is set as a third character key to the key 532.

Consequently, as regards the 26 characters of the Alphabet, the vowels "A", "I", "U", "E" and "O" are set independently to the 5 keys 521 through 525 of the 12 main keys 521 through 532, and the remaining 21 characters are set to the other keys 526 through 532 in groups of three respectively. More specifically, the characters "Y, W, X" are set to the key 526; the characters "K,G,F" to the key 527; the characters "S, Z, J" to the key 528; the characters "T, D, V" to the key 529; the characters "N,C, Q" to the key 530; the characters "H, B, P" to the key 531; and the characters "R, M, L" to the key 532.

Numerals "7", "8", "9", "4", "5", "6", "1", "2", "3", "0", and a comma ",", a period "." are inscribed on the upper side of the key top of each of the main keys 521 through 532 which are inputted when each of the keys 521 through 532 is pressed in the numeric input mode described later.

Moreover, various symbols are set on the lower side of the key tops of the main keys 521 through 532 which are to be inputted in the Symbol input mode.

More specifically, on the lower left side of the key tops of the main keys 521 through 532 are set respectively symbols including "(", "[", "*", ":", "!", "¥", "@", "/", "plus", "•", "、", and " 。" On the lower right side of the key tops 521 through 532 are set respectively symbols such as ")", "]", "#", ";", "?", "$", "&", "%", "—", """, "~" and "=".

On the other hand, various functions used for selecting the input modes or character input modes are set to the function keys 551 through 560, as shown in FIG. 33.

Figure 34:
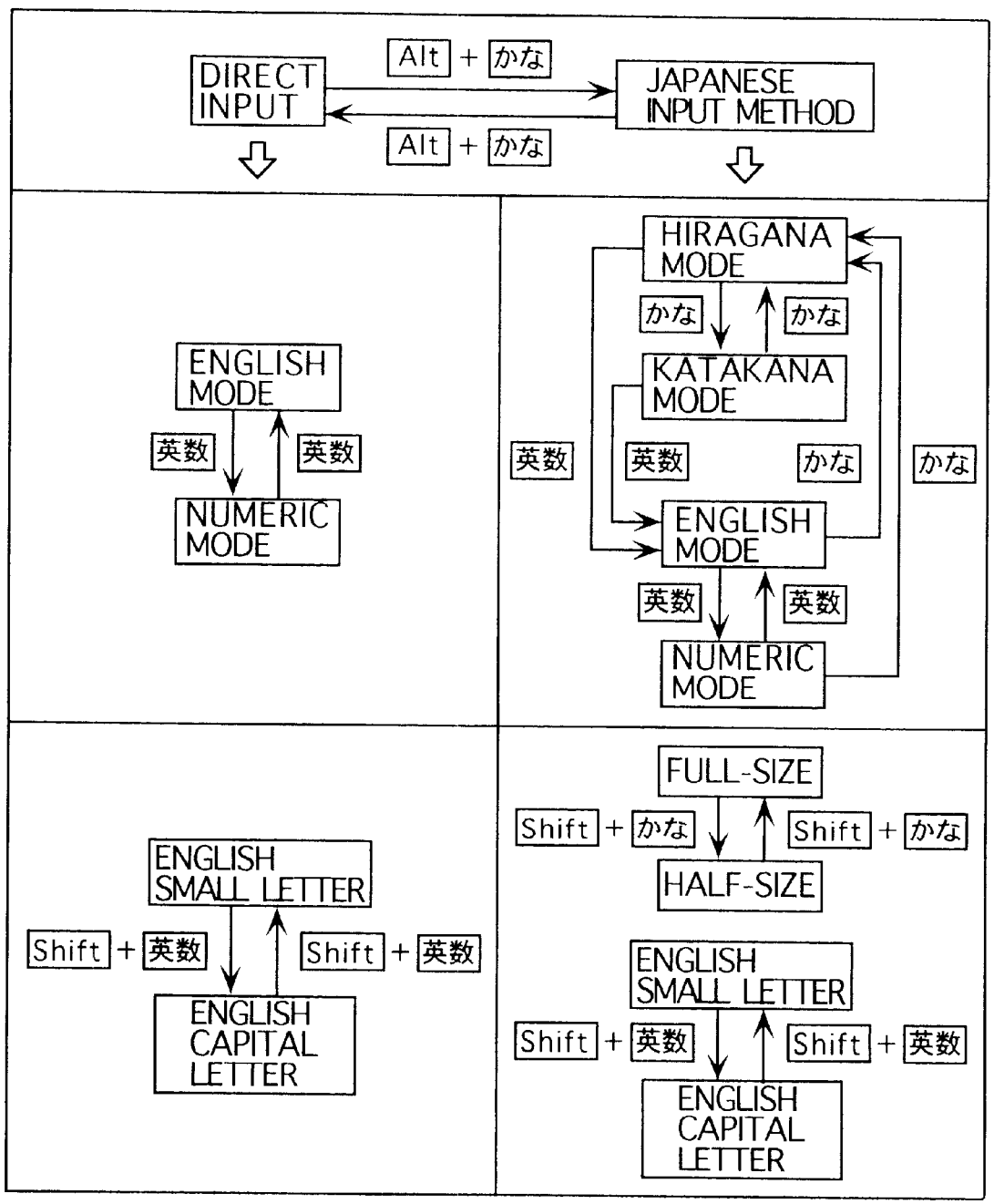
FIG. 34 is a drawing showing a switching manipulation of input modes of the ninth embodiment.

The input modes can be roughly divided into two methods, as shown in FIG. 34, namely a "direct input method" where characters of the Alphabet and numerals are inputted directly by pressing the main keys 521 through 532, and a "Japanese input method" for inputting Hiragana, Katakana and; Kanji.

The selection of the two input methods is executed by pressing the function key 552(Kana key) with the function key 559 (Alt key) held down. The Alt key 559 executes the function of inputting symbols or executing various functions inscribed on the lower side of the key tops of each key when pressed together with any of the keys 521 through 532 and keys 551 through 558. Therefore, Chinese characters "漢字"/Kanji/ expressing the switching function between the direct input mode and Japanese input mode is inscribed on the lower side of the key top of the key 552 and the input modes can be changed as described above by pressing the key 552 and the Alt Key 559 simultaneously.

Direct input method consists of "English input mode" for inputting the Alphabet and "numeric input mode" for inputting numerals, and these modes can be switched over by emery pressing operation of the function key 551. Accordingly a symbol "英／数"(English/Numeric) are inscribed on the key top of the function key 551.

Further, switching of English small letters and capital letters is executed by pressing the English/Numeric Key 551 with the function key 560 (Shift key) held down. The Shift key 560, contrary to the Alt key 559, inputs numerals and executes various functions inscribed on the upper side of each key top when pressed simultaneously with any of the keys 521 through 532 and keys 551 through 558. Therefore, characters "Caps (Caps Lock)", expressing the switching function of English small letters and capital letters are inscribed on the upper side of the key top of the key 551, so that it can be easily seen that the switching over of the above mentioned input modes can be accomplished by pressing simultaneously the key 551 and the Shift key 560 together.

Input mode of the Japanese input method consists of "Hiragana Input Mode", "Katakana Input Mode", "English Input Mode" and "Numeric Input Mode". The switching operation of each mode can be executed in the following manner, as illustrated in FIG. 34.

Switching over from other modes into the Hiragana input mode is executed out by pressing the Kana key 552. The switching between the Hiragana input mode and Katakana input mode is also executed by pressing the Kana key 552.

Switching over from other modes into the English input mode is executed out by pressing the English/Numeric key 551. The switching between the English input mode and the numeric input mode is also executed by pressing the English/Numeric key 551.

Switching between the English small letters and English capital letters is executed out by pressing the English/Numeric key 551 with the Shift key 560 held down.

Further, the switching between the Full-size and Half-size is executed out by pressing the Kana Key 552 with the Shift key 560 held down. Characters "半角"/Half-size" are therefore inscribed on the upper side of the key top of the key 560.

Figure 35:
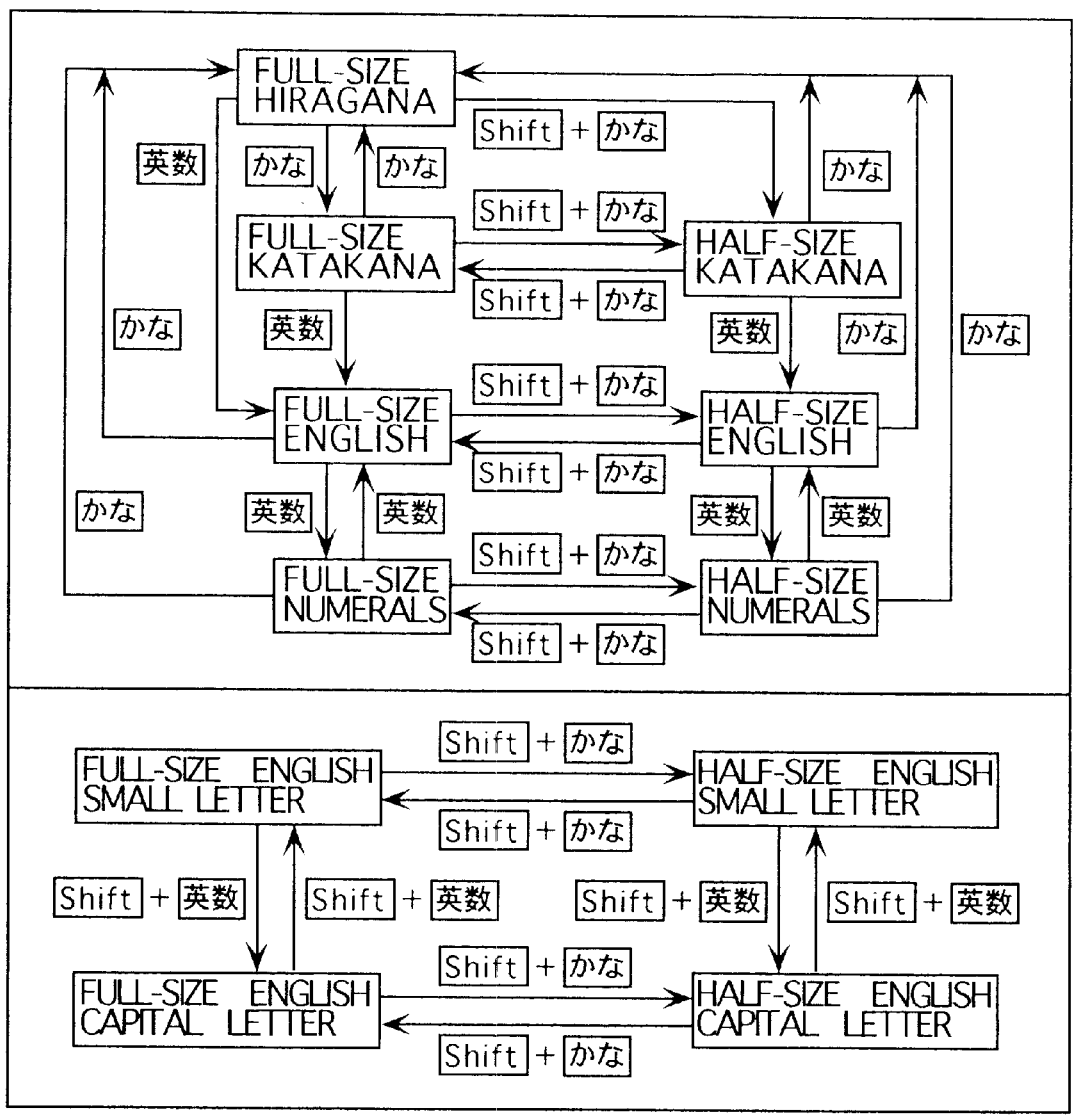
FIG. 35 is a diagram showing a switching manipulation of input modes including Full-size and Half-size Modes of the ninth embodiment.

Switching of various input modes, including Full-size/Half-size Modes, Capital letter/Small letter modes in the Japanese input method can be summarized as shown in FIG. 35.

The inputs executed by pressing each of the function keys 551 through 560, including the functions of the above mentioned function keys, are made to correspond to the inputs of various function keys set on a usual keyboard, as shown in FIG. 36.

For instance, the function key 553 (BS key) is utilized to input "Back Space", "Del" and "Esc" functions. Further, the function keys 554 through 557 perform the functions to move the cursor, as well as execute "Home", "End", "Page Up" and "Page Down" functions. The function key 558 functions as an "Enter Key".

Input of characters, numerals and symbols with the present keyboard input apparatus is executed as follows:

Hiragana Input Mode/Katakana Input Mode
(Japanese Input Method)

When the main keys 521 through 532 are pressed in the Hiragana input mode, Hiragana is outputted by the Romanized character input method. More specifically, vowels are inputted when the vowel keys 521 through 525 are pressed once, and Hiragana is inputted by the Romanized character input method when the consonant keys 526 through 532 and the vowel keys 521 through 525 are pressed, resulting in a combination of "a consonant plus a vowel".

To each of the consonant keys 526 through 532 is set as a first character to a third character key three consonants, and the characters can be selected and inputted as in the foregoing eighth embodiment, by pressing once to three times each of the keys 526 through 532. More specifically, the characters inscribed on the left side of the key tops are inputted when the keys are pressed once, the characters inscribed in the middle are inputted when the keys are pressed twice and the characters on the right side ate inputted when the keys are pressed three times, respectively, as shown in FIGS. 37 and 38,.

When the main keys 521 through 532 are pressed in the Katakana input mode, Katakana is inputted by the Romanized character input method as in the Hiragana input mode.

When the vowels keys 521 through 525 are pressed in the Hiragana or Katakana input mode, the vowels are inputted, but when the Long Sound vowel key 521 and double consonant vowel key 524 are pressed more than twice, the long vowel symbol "—" or the long sound vowel key are inputted in accordance with the situations, as shown in FIG. 39.

More specifically, the long vowel symbol "—" is inputted when the long sound vowel key 521 is pressed twice after another vowel. On the other hand, the characters "AA" are inputted when the long sound vowel key 521 is pressed twice either by itself or after a consonant key. Further, "the vowel plus the long vowel symbol —", namely, "A —" are inputted when the long sound vowel key 521 is pressed three times in succession regardless of whether there is no character precedent or succeeds a vowel or a consonant.

On the other hand, the long sound vowel key "つ"/t/ is inputted when the double consonant vowel key is pressed twice following another vowel. Again, the characters "EE" are inputted when the double consonant vowel key 524 is pressed twice by itself or following a consonant. Further, "the vowel plus the long sound vowel key", namely, "E つ" are inputted when the double consonant vowel key 524 is pressed three times in succession regardless of whether there is no character precedent or succeeds a vowel or consonant.

It should be noted that when each of the keys 521 and 524 is pressed four times, the state is resumed when the key was pressed once, and input processing is carried out hereafter in repetition for one to three pressing operations corresponding to the number of key pressing operations.

When the consonant key 530 set with the character "N" is pressed, the character "N" is inputted similar to the foregoing eighth embodiment; when pressed twice, the character "ん" is inputted; and when pressed three times the characters "ん" and "N" are inputted in the order of "ん plus N", as shown in FIG. 38. When the key 530 is pressed four times in succession, the state is resumed when the key 530 was pressed once. It must be noted that the character "N" is basically inputted when the key 530 is pressed once, but when a key other than a vowel is inputted after the key 530, the character "ん" is inputted.

When the consonant key 526 set with the character "Y", is pressed three times, the character "X" is inputted, but when "a vowel", "つ(TU)" and the like are inputted in succession, the key "X" functions as a Small letter input key, similar to the foregoing eighth embodiment, and the vowels (あいうえおつ) /AIUEO/ and the long sound vowel key つ/t/ are inputted in small letters.

Similarly, when the consonant key 532 set with the character "R" is pressed three times, the character "L" is inputted, but when "a vowel", "つ/TU/", "や/YA", "ゆ/YU" and "よ/YO" are inputted in succession, the key "L" functions as the Small letter input function key, similar to the foregoing eighth embodiment, and the vowels "あいうえお"/A, I, U, E, O/, the double consonant "つ"/t/) and "やゆよ/YA, YU, YO/ are inputted in small letters.

English Input Mode (common to both Direct Input Method and Japanese Input Method)

When the main keys 521 through 532 are pressed in the English input mode (common to both the direct input method and Japanese input method), the characters of the Alphabet are inputted as shown in FIGS. 40 and 41. The Alphabet is inputted character by character by each pressing operation of the vowel keys 521 through 525. On the other hand, when each of the keys 526 through 532 is pressed once, the character on the left side of the key top is inputted, when pressed twice, the character in the middle is inputted and when pressed three times the character on the right side is inputted, respectively.

When a consonant, set on the same key, is to be inputted in succession, the input operation should be interrupted by pressing the function key (cursor moving key "→") 555 between the characters. The cursor moving key 555 possesses a repeat function as well.

More specifically, when the same characters are to be repeated as in the case with the word "ALL", the first character (L) should be confirmed by the cursor moving key 555 and a further pressing of the cursor moving key 555 inputs the same character already confirmed. The input manipulation can be simplified when the same character is inputted in succession.

Further, English capital letters and small letters can be inputted by engaging the input mode in advance, but this leads to complications when capital letters and small letters exist in a mixed form, as is usually the case. For this reason, in the English input mode of the present embodiment, capital letters and small letters can be inputted by pressing the main keys 521 through 532 with the Shift key 560 held down.

Numeric Input Mode (common to both the Direct Input Method and Japanese Input Method)

When the main keys 521 through 532 are pressed in the numeric input mode (common to both the Direct input method and Japanese input method) numerals and symbols, including a comma ",", and a period ".", inscribed on the upper side of each of the keys 521 through 532 are inputted, as shown in FIGS. 40 and 41. When the keys are pressed a plural number of times, numerals corresponding to the number of pressing operations are inputted.

Numerals are also frequently used in a Japanese text, and change of the input modes would make manipulation cumbersome. Therefore, in the Japanese input mode, numerals and symbols such as ",", and ".", inscribed on the upper side of the main keys 521 through 532, can be inputted by pressing the main keys 521 through 532 with the Shift key 560 held down.

Inputting of Symbols

Symbols inscribed on the lower left side of each of the keys 521 through 532 can be inputted, as shown in FIGS. 37, 38, 40 and 41, by pressing the main keys 521 through 532 with the "Alt key" 559 held down for both the direct input method or Japanese input method.

Further, the symbols inscribed on the lower right side of each key 521 through 532 can be inputted by pressing the main key 521 through 532 twice with the Alt key 559 held down.

It must be pointed out that the symbol with a mark "*" is not identical to the symbol inscribed on the keyboard input apparatus 500 in FIGS. 40 and 41. This is due to the fact that the symbols (such as the bracket symbol [ ]) which can be inputted with the Japanese full-sized characters are inscribed in the keyboard input apparatus 500, whereas corresponding symbols do not often exist in the half-sized English characters and numerals in which case a different symbol can be inputted instead.

Input processing of each of the above mentioned modes, namely; when the main keys 521 through 532 are pressed independently; when pressed together with the Shift key 560; and when pressed together with the Alt key 559, can be summarized as shown in FIG. 42.

Conversion Key/Non-conversion Key/Next Candidate key/Precedent Candidate Key

When the Shift key 560 is pressed and then released in the Japanese input mode before the characters or numerals are confirmed by the function key 558, the Kanji conversion function is set to work and inputted characters and numerals are converted into the corresponding Chinese characters and numerals.

When the Alt key 559 is pressed and then released independently before the characters and numerals are confirmed, the non-conversion function is set to work and the inputted characters and numerals are inputted in their original forms.

The next candidate character can be selected either by the Shift key 560 or "Downward-Arrow Key"(Function key 557) and the precedent candidate character can be selected by the "Upward-Arrow Key"(Function key 556) and confirmed by the Return Key 558.

Since numbers are affixed to the conversion candidates, characters can also be confirmed by pressing the numbers of the main keys 521 through 532 with the Shift key 560 held down.

The Shift key 560 can, as mentioned above, not only input the numerals and functions inscribed on the upper side of the key tops by pressing it with another key, can but also perform conversion functions when pressed independently before the characters have been confirmed and is also provided with a function to input a space.

More specifically, when the key 560 is pressed and then released in the normal state without any unconfirmed characters, a space will be inputted. A continuous spacing can be obtained by holding down the Shift key 560 for a certain length of time (approximately 2 seconds)

In other words, when another key is pressed within a certain length of time after the Shift key 560 has been pressed (approximately 2 seconds), the aforementioned shift function is set to work. On the contrary, if no other key is pressed within a certain time, the conversion function sets to work in case there is any unconfirmed character, and the space input function is set tot work if there is no unconfirmed character.

According to the present embodiment, similar to the operational effects of 27) of the foregoing eighth embodiment, a second character key for inputting the long vowel symbol "—" is set to the vowel key 521 which is one of the 5 vowel keys 521 through 525 where vowels are set, and a second character key for inputting the long sound vowel key "つ"/t/ is set to the key 524, and when the key 521 and 524 are pressed twice in ado succession after another vowel, the long vowel symbol "—" and the long sound vowel key "つ"/t/ can be outputted by means of the key input processing means 102, facilitating the input operation of in the Japanese language frequently used long vowel symbol "—" and the long sound vowel key "つ"/t/, improving thereby the character input efficiency.

Similarly, when the keys 521 and 524 are pressed three times in succession respectively, a vowel and the long vowel symbol "—" or a vowel and the long sound vowel key " "/t/ can be inputted by the key input processing means 102 in the Japanese language frequently used order of "a vowel plus the long vowel symbol" and "a vowel plus the long sound vowel key", improving thereby even more the character input efficiency.

Further, according to the present embodiment, the same operational effects of 1) through 19), 22) through 25), 28), 29), 31) and 32) of the foregoing embodiment can be attained.

34) In addition, the size of the apparatus can be restrained to a ten digit key size with 22 keys, and further it is possible to arrange the keys in a compact way so that various characters and functions needed for the manipulation of a personal computer can be provided in an efficient manner. Therefore it is easily possible to input characters, numerals and symbols with the same finger manipulation and speed of a ten digit key apparatus, and since keys are arranged such that the they are limited in numbers in the horizontal direction, thereby enabling to provide a keyboard input apparatus which can be easily operated by one hand.

35) Moreover, since the keyboard input apparatus occupies only a small area in comparison with an ordinary full-sized keyboard apparatus and is operable with one hand, it is possible to use a mouse and the keyboard input apparatus alternatively with the right hand while working with documents with the left hand. Consequently, according to the keyboard input apparatus 500 of the present embodiment space around the desk-top PC can be rationalized, enabling to provide a pleasant working environment.

The above-mentioned characteristics of the keyboard input apparatus 500 of the present embodiment captures exactly the needs of a general user. More precisely, recent desktops type of personal computers employ widely the GUI (Graphical User Interface) where a mouse selects icons on the display or menu. Characters and numerals are, however, inputted by a keyboard. For this reason, much of the space on the desk is occupied with the keyboard and the mouse, and, in addition, it is necessary to move extensively the hand right and left when operating the keyboard and the mouse. On the other hand, many people employing laptop type of personal computers, place a mouse and a ten-digit keyboard for inputting numerals. The keyboard of a laptop computer is smaller than a full-sized keyboard in comparison, manipulation efficiency for inputting numerals is however sacrificed.

A full-sized keyboard is advantageous, due to its many number of keys, in that short cut functions or special functions (special function keys) of a full keyboard can be adopted and so on, this function, however is not a necessity for an ordinary user. The needs of the majority of users are to procure a space for spreading documents at hand and to execute input operation with an easily operable keyboard and a mouse which do not occupy much space. The keyboard input apparatus 500 of the present embodiment meets such needs to a great extent.

The character arrangement of an ordinary keyboard has simply inherited the irregular layout of a conventional mechanical typewriter. There is therefore no differentiation of vowels and consonants, making it unable to type with both hands alternatively, and when a comparison is made between a full-sized key board for both hands' operations and the key board input apparatus 500 for one hand operation, the both-hand type is not necessarily easier to operate nor is the input speed faster.

On the contrary, as there are people who can operate an electronic calculator or a ten digit key with an extreme rapidity, typing of lesser number of keys utilizing one's dominant hand is a speedy operation even though the number of strokes may become slightly more, and in fact, compared with an ordinary keyboard, the keyboard input apparatus 500 is not inferior regards the character input speed.

36) Moreover, the function key (Shift Key) 560 is not only provided with a shifting function which works when pressed simultaneously with another key but also with a conversion function which converts the Japanese Syllabary into Chinese characters in an unconfirmed state, and a space function which inputs a space when inputted independently are added to it, enabling accordingly to reduce the number of keys thereby improving the manipulation efficiency.

Particularly, since the above mentioned functions automatically switch over and perform the functions corresponding to the conditions in which the Shift key 560 is operated, the operator needs not select each function, and manipulation efficiency can also be improved from this stand point.

It must be noted that the present invention is not only limited to the configuration of the foregoing embodiment, but include all modifications within the limit to attain the object of the present invention.

For instance, the keyboard input apparatus to which the present invention is applicable is not limited to a portable telephones and 200 but can also be applied to a normal table telephone or a fax apparatus. In addition to the telephones it can further be applied to ten digit keyboards connected to wrist watches, desk calculators, electronic notebooks, portable personal computers, PDA(Personal Digital Assistant), ten digit keyboards and so on.

In short, the keyboard input apparatus of the present invention can be applied to various kinds of apparatus in need of character input, particularly suited, however, to the key input apparatus of small-sized information equipment since numerals, Japanese and English characters can be inputted by only 12 to 15 number of keys.

Further, although the keyboard input apparatus 10 and the like of the fourth embodiment is provided with a numeric input mode in addition to the character input mode (Japanese input and English input mode), it may also be modified such that three pressing operations of the keys 81 through 95 (partially four pressing operations on the key 85,and keys 93 through 95) will input numerals and four pressing operations (five pressing operations on some keys) will input symbols so that numerals and symbols can be inputted even when the numeric input mode is not set.

In this event, mode-switching operation becomes unnecessary when numerals and symbols are to be inputted, hence manipulation efficiency can, be improved particularly when 1 to 3 numerals or symbols need to be inputted during the course of inputting characters.

Further, the characters (including numerals and symbols) set to each of the keyboard input apparatus and the actual arrangements thereof are not limited to the described foregoing embodiments, but may be set accordingly in actual practice.

Figure 43:
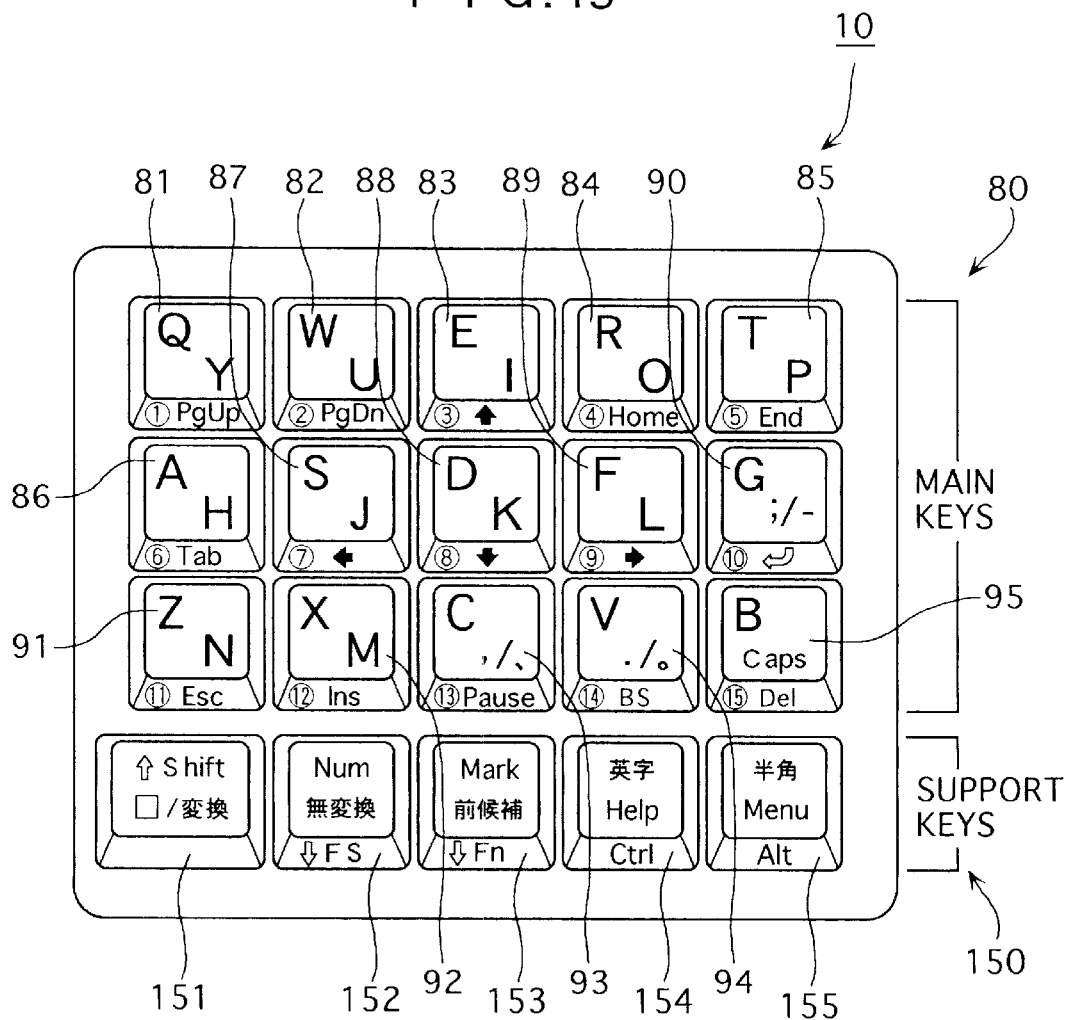
FIG. 43 is a plan view showing a key layout of the keyboard input apparatus of other embodiment of the present invention.

For instance, in the foregoing fourth embodiment the characters of the Alphabet, which are to be set to the main keys 81 through 95 of the keyboard input apparatus 10, are divided and set into the vowel zone and consonant zone but the Alphabet may also be arranged in accordance with the QWERTY arrangement, as shown in FIG. 43.

More specifically, to the keys 81 through 85 of the upper first row of the main key area 80 are set as first character keys from left to right the characters "Q", "W", "E", "R", and "T", and as second character keys the characters "Y", "U", "I", "O" and "P", which correspond to the arrangement of the Alphabet in the top row of an ordinary keyboard with the QWERTY arrangement.

Moreover, to the keys 86 through 90 of the middle first row of the main key area 80 are set as first character keys "A", "S", "D", "F" and "G", and as second character keys the characters "H", "J", "K", "L", semicolon ";" and long vowel symbol "—". Further, to the keys 91 through 95 of the bottom line are set as first character keys "Z", "X", "C", "V" and "B" and as second character keys "N", "M", comma ",", Japanese comma " ヽ ", period ".", Japanese Period " 。 " and a key for inputting "Caps".

Arrangement of the characters in this manner enables to set the keys in the QWERTY key arrangement, which is traditionally extensively used and popularized, to the 15 main keys 81 through 95, making it easy for those accustomed to the QWERTY method to learn the key layout with ease and can be operated at once. Moreover, since in the Japanese language frequently used comma " ヽ ", period " ", Nasal sound " ん ", and the long vowel symbol "—" are also set, manipulation efficiency is improved not only for inputting in English but also for inputting in Japanese.

If the frequency of inputting a symbol is considered to be rare for the keyboard input apparatus 10, the symbol arrangement may be eliminated as shown in FIG. 44. It must be noted that in the present keyboard input apparatus 10 the character and numeric arrangement are the same as in the keyboard input apparatus 10 of FIG. 10.

Moreover, numeric keys may also be omitted and merely character keys may be set to the keys 81 through 95, as shown in FIG. 45

Figure 46:
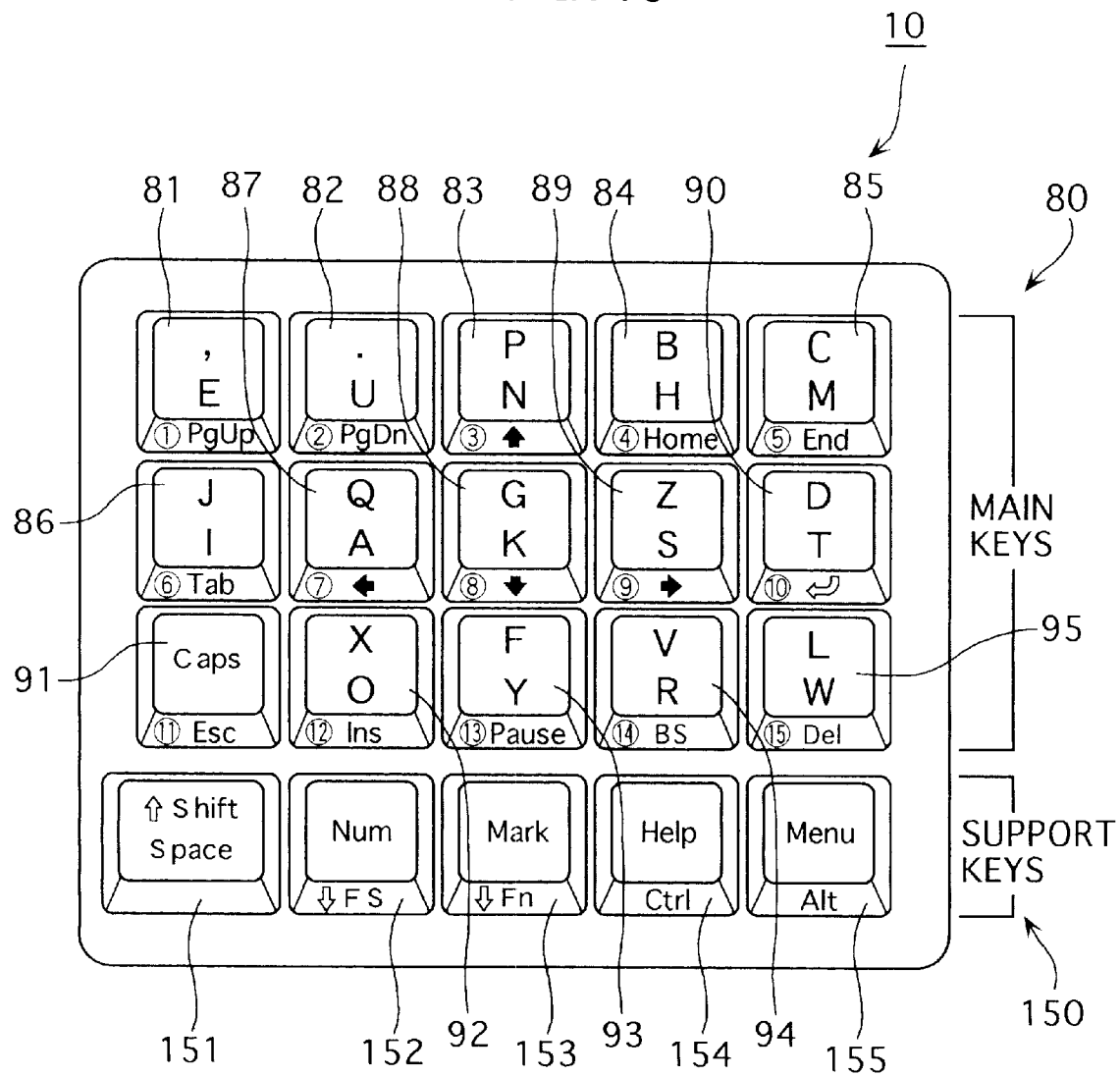
FIG. 46 is a plan view showing a key layout of the keyboard input apparatus of other embodiment of the present invention.

Further, when the keyboard input apparatus 10 is used exclusively for inputting English, characters may be set to suit the English usage, as shown in FIG. 46. More specifically, only the Alphabet "C", "F", "V" and "L" may be set to the key 85, and keys 93 through 95 as second character keys, and "Shift/Space", "Num", "Mark" "Help" and "Menu" keys set to the Support Keys 151 through 155. Other keys are arranged in the same manner as in FIG. 45.

Figure 47:
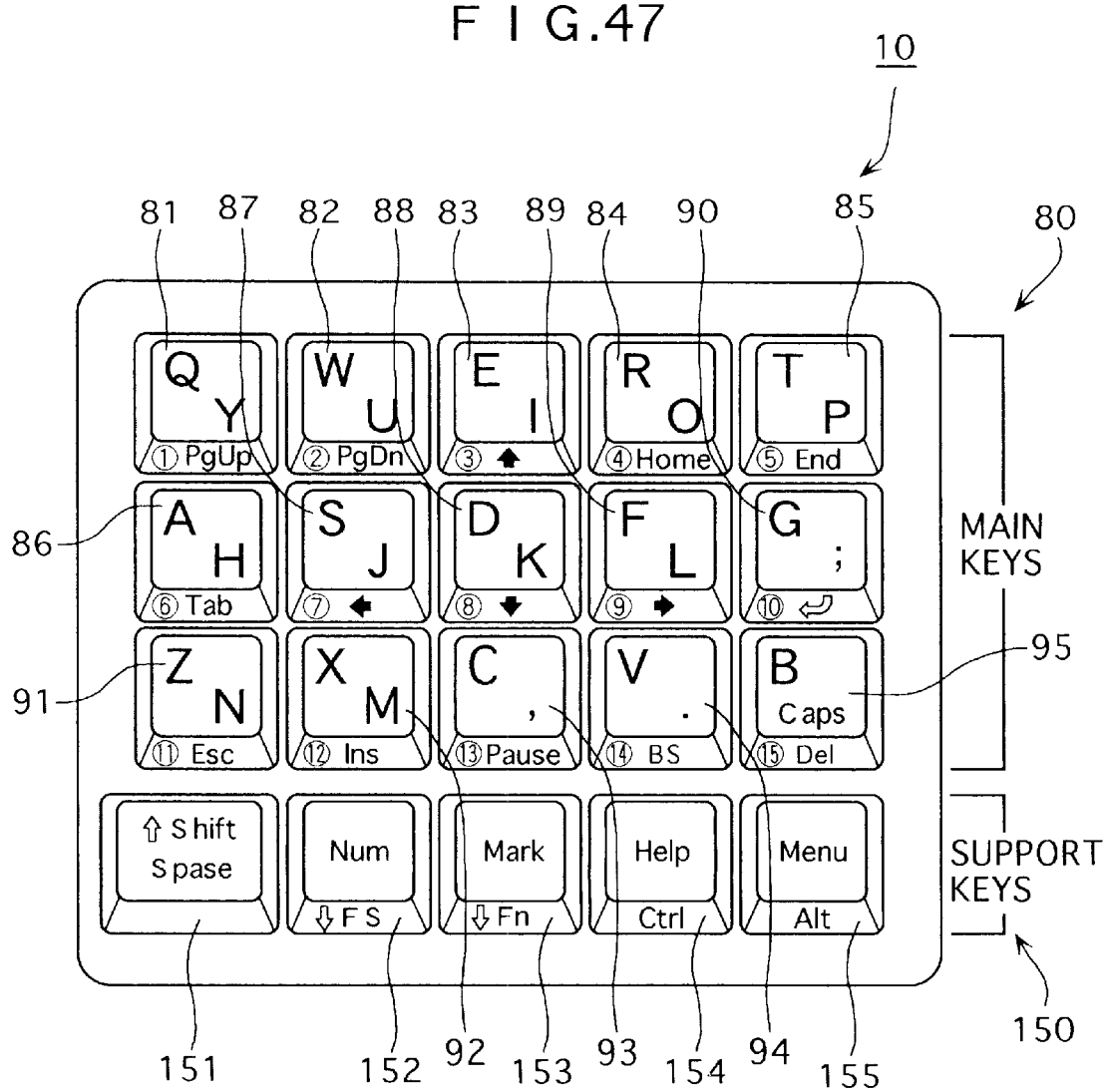
FIG. 47 is a plan view showing a key layout of the keyboard input apparatus of other embodiment of the present invention.

Further, the key input apparatus 10 may be set exclusively for English usage by conforming to the QWERTY arrangement, as shown in FIG. 47. More specifically, except for the keys 90, 93 and 94 to which are set a semicolon ";", comma ",", and period ".", the main keys 81 through 95 may be set with the same keys as in the arrangement of FIG. 43 and the Support Keys 151 through 155 are set identical to FIG. 46.

If the keyboard input apparatus 10 is made exclusively for the English use, the keyboard input apparatus can be made more simply to suit the English character input.

Moreover, the present invention can be adapted not only to the keyboard input apparatus 2 and 10 with 12 to 15 number of the main keys as shown in the foregoing embodiment, but also to a keyboard input apparatus with lesser number of keys or more number of keys. In short, it is widely adaptable to any key input apparatus where a plurality of characters are set to one key.

Further, although Numeric keys are set to the main keys 21 through 32 in the foregoing first embodiment, only characters keys may also be set to the main keys 21 through 32 as shown in FIG. 48, when it is to be used, for instance, as a keyboard input apparatus for other than the portable telephone 1, where inputting of numerals is not needed. Moreover, though not shown, only character keys may also be set to the keys 21 through 35 in the key arrangement of the third embodiment.

Figure 49:
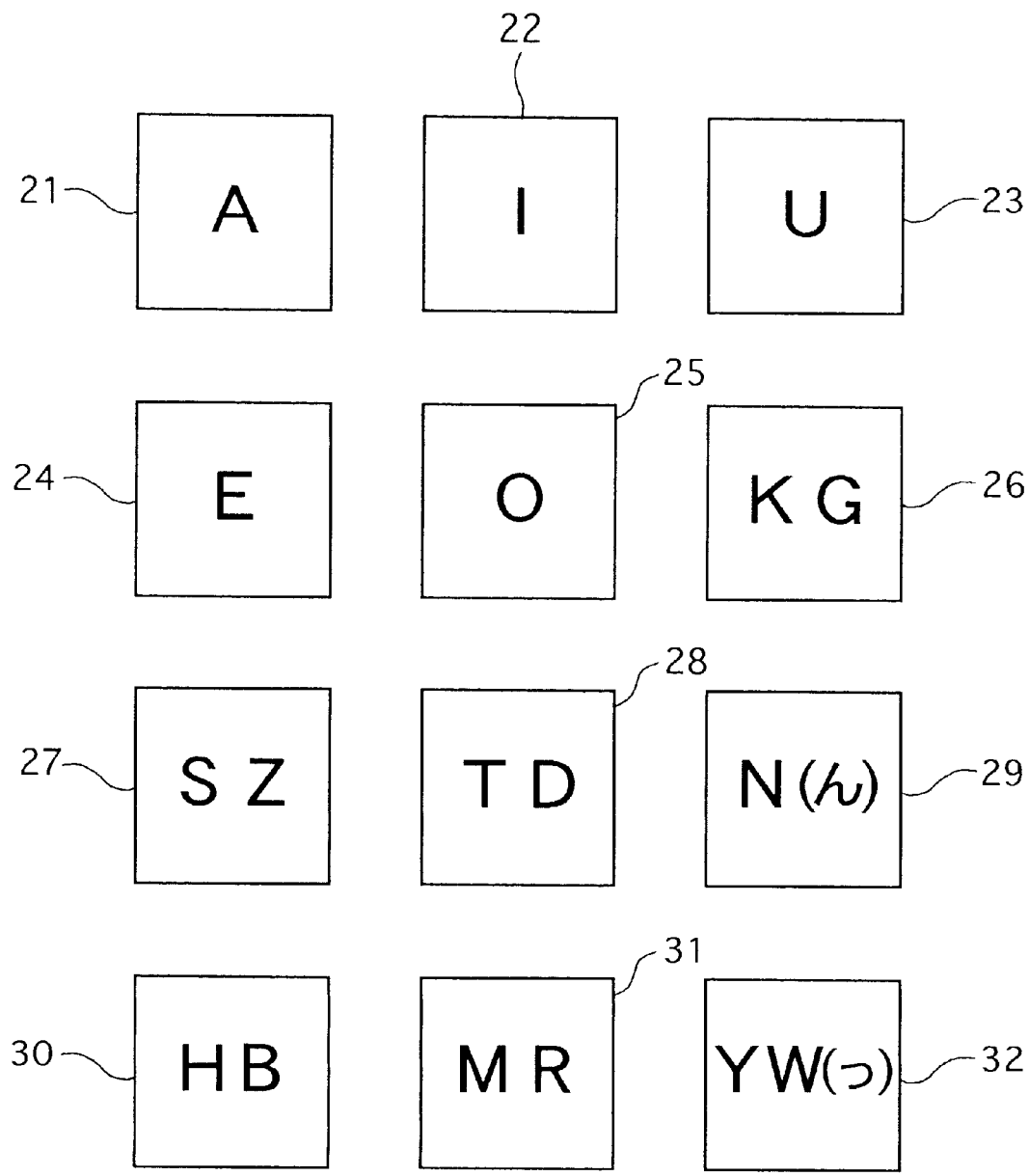
FIG. 49 is a plan view showing a key layout of the keyboard input apparatus of other embodiment of the present invention.

Further, when English input mode is not required, it is also possible to set only the Alphabet used for inputting Japanese, or the double consonant " っ "/t/ or the Nasal sound " ん " to the main keys 21 through 32 (or keys 21 through 35 in the key arrangement of the second embodiment), as shown in FIG. 49. Further, Numeric keys may also be added to the key arrangement of FIG. 49. Further, referring to FIG. 49, the positions of the inscriptions on the key tops when a plurality of characters are set, are not only limited to the right and left side of the keys but may also be set on the upper or lower side. Moreover, when more than 3 characters are inscribed, characters on the right and left, top and bottom may be combined and placed.

Figure 50:
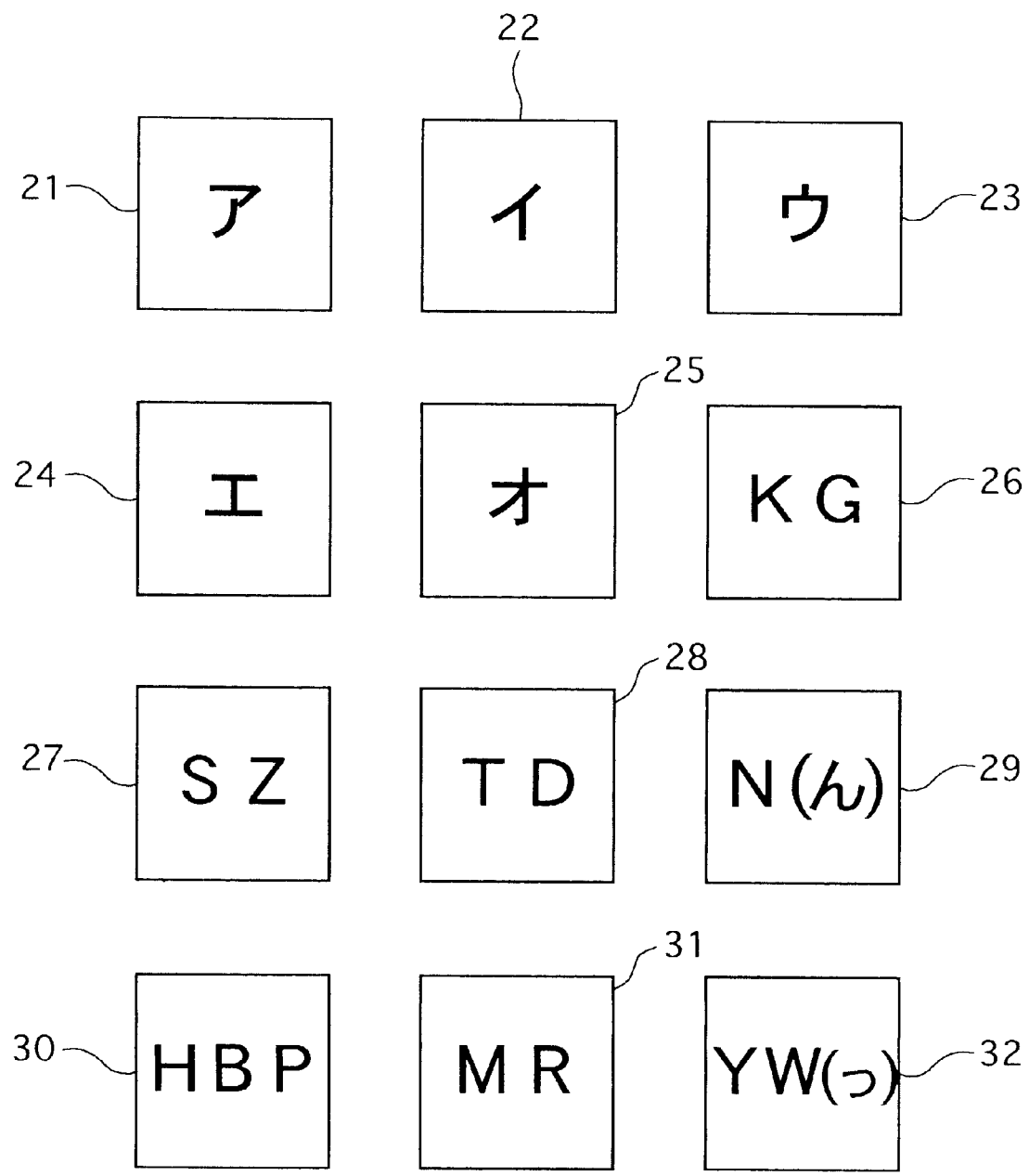
FIG. 50 is a plan view showing a key layout of the keyboard input apparatus of other embodiment of the present invention.

Furthermore, in the first embodiment, the inscriptions on the vowel keys 21 through 25 may be executed, similar to the third embodiment, in Katakana, as shown in FIG. 50.

Figure 51:
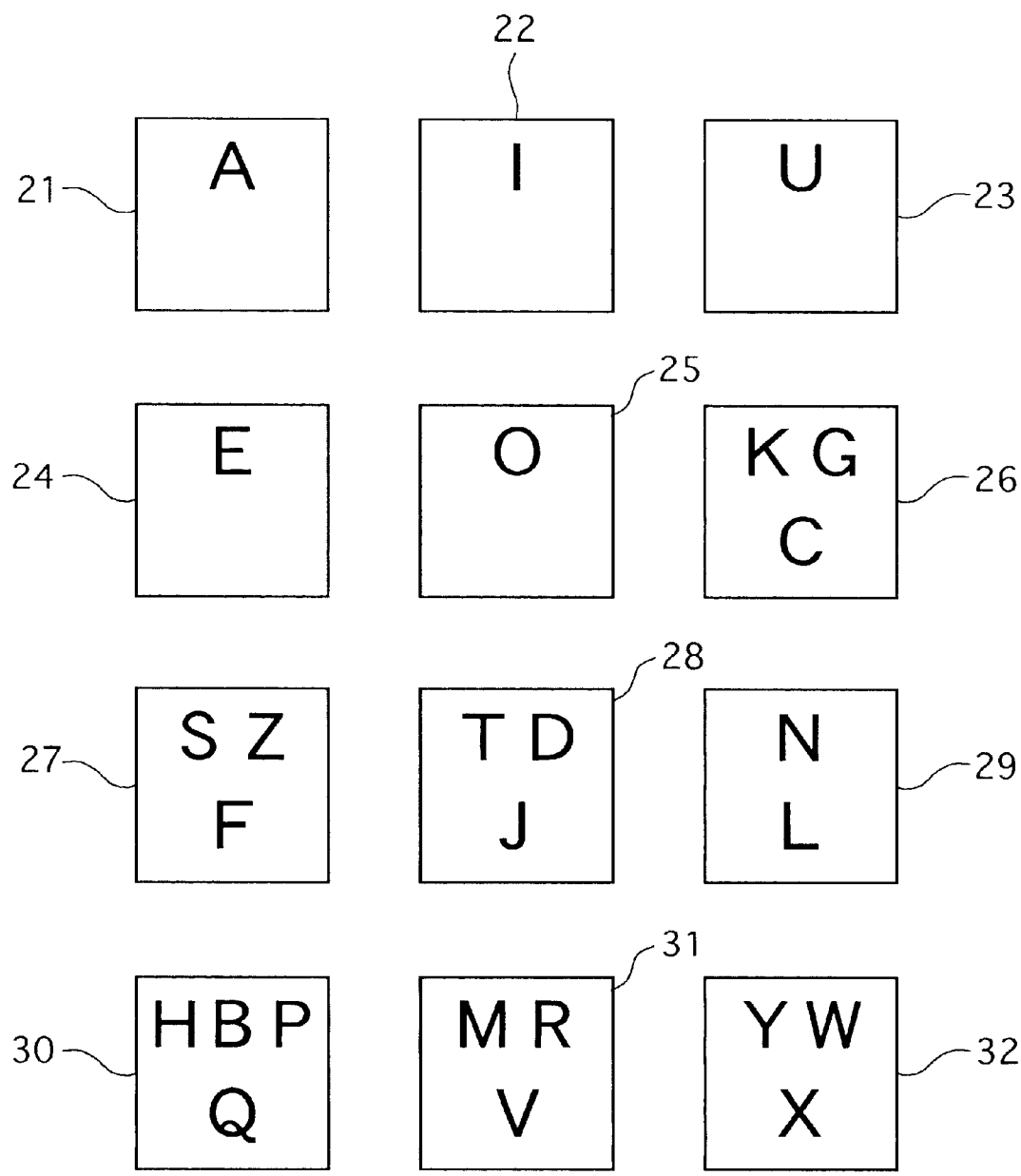
FIG. 51 is a plan view showing a key layout of the keyboard input apparatus of other embodiment of the present invention.

Again, only the Alphabet may be set to the main keys 21 through 32 to make it a keyboard input apparatus exclusively for English usage, as illustrated in FIG. 51

Figure 52:
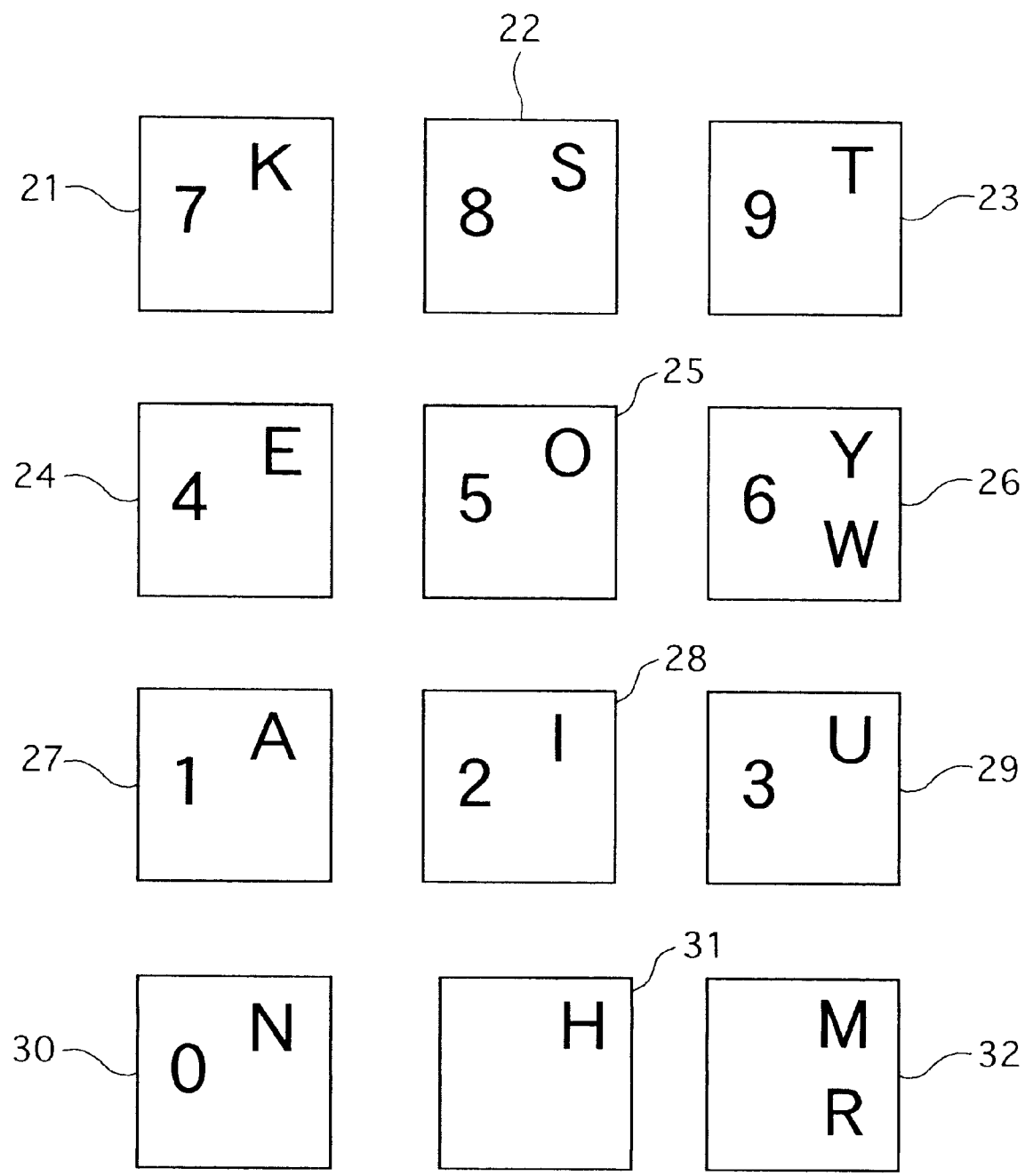
FIG. 52 is a plan view showing a key layout of the keyboard input apparatus of other embodiment of the present invention.

Further, when, for instance, the keyboard input apparatus of the present invention is to be adapted to a table calculator or a ten digit keyboard apparatus, the character keys may also be arranged in correspondence with the numeral keys because numeral keys are arranged from the bottom upwards in order, as shown in FIG. 52. In short, the vowel keys need not necessarily be placed on the upper part of the main keys 21 through 32, but each vowel key needs only to be positioned independently.

Figure 53:
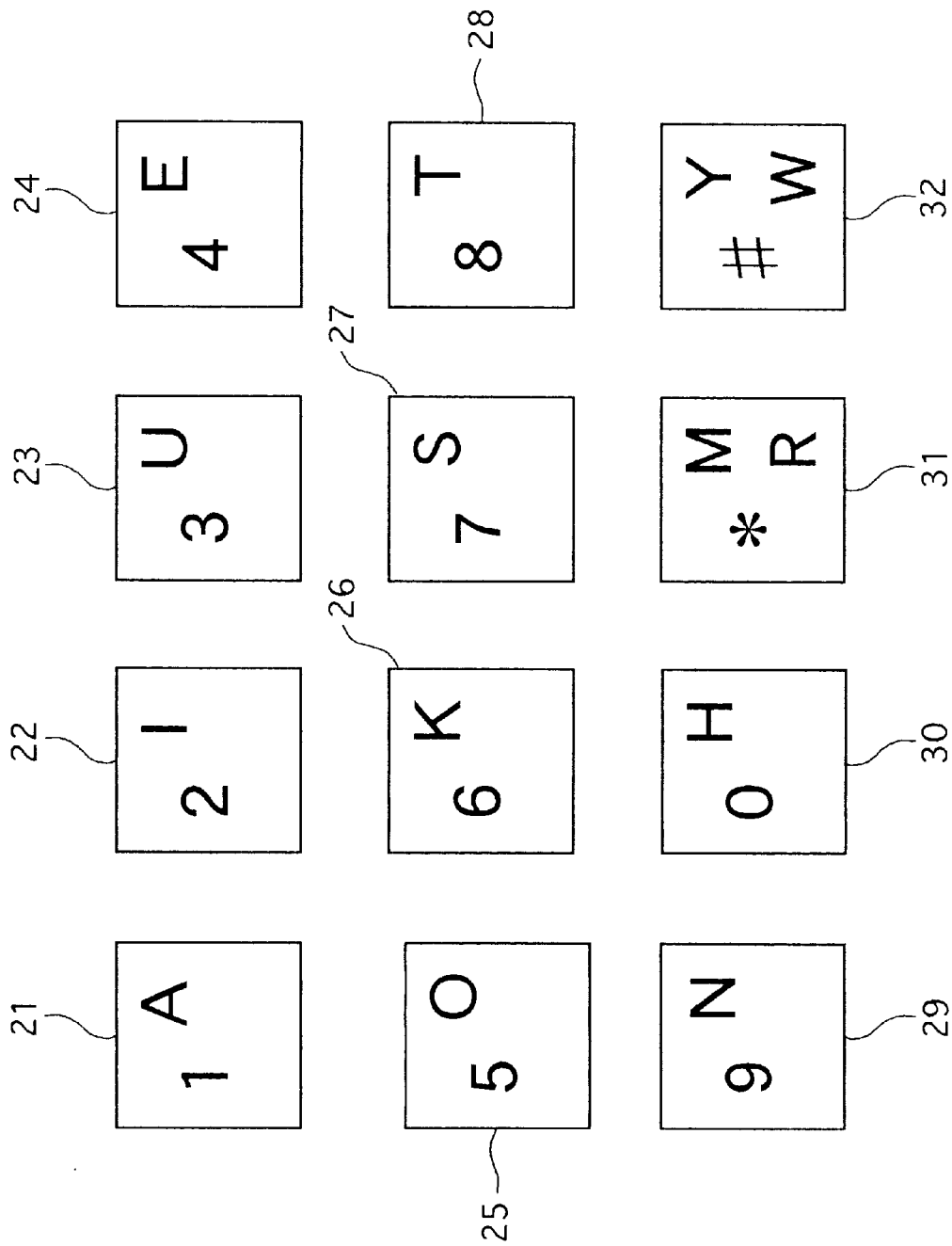
FIG. 53 is a plan view showing a key layout of the keyboard input apparatus of other embodiment of the present invention.

Further, although the keys are positioned in three vertical columns in the foregoing embodiment, it can just as well be positioned other than in 3 columns, for instance in four columns, as illustrated in FIG. 53.

In addition, in the portable telephones the keys having the functions of the keys 33 through 35 of the third embodiment are sometimes placed not on top and bottom of the numeral keys but on the right or left side, the keys 33 through 35 set with the characters "Y", "R", and "W" may be set on the side of the main keys 21 through 32.

Figure 54:
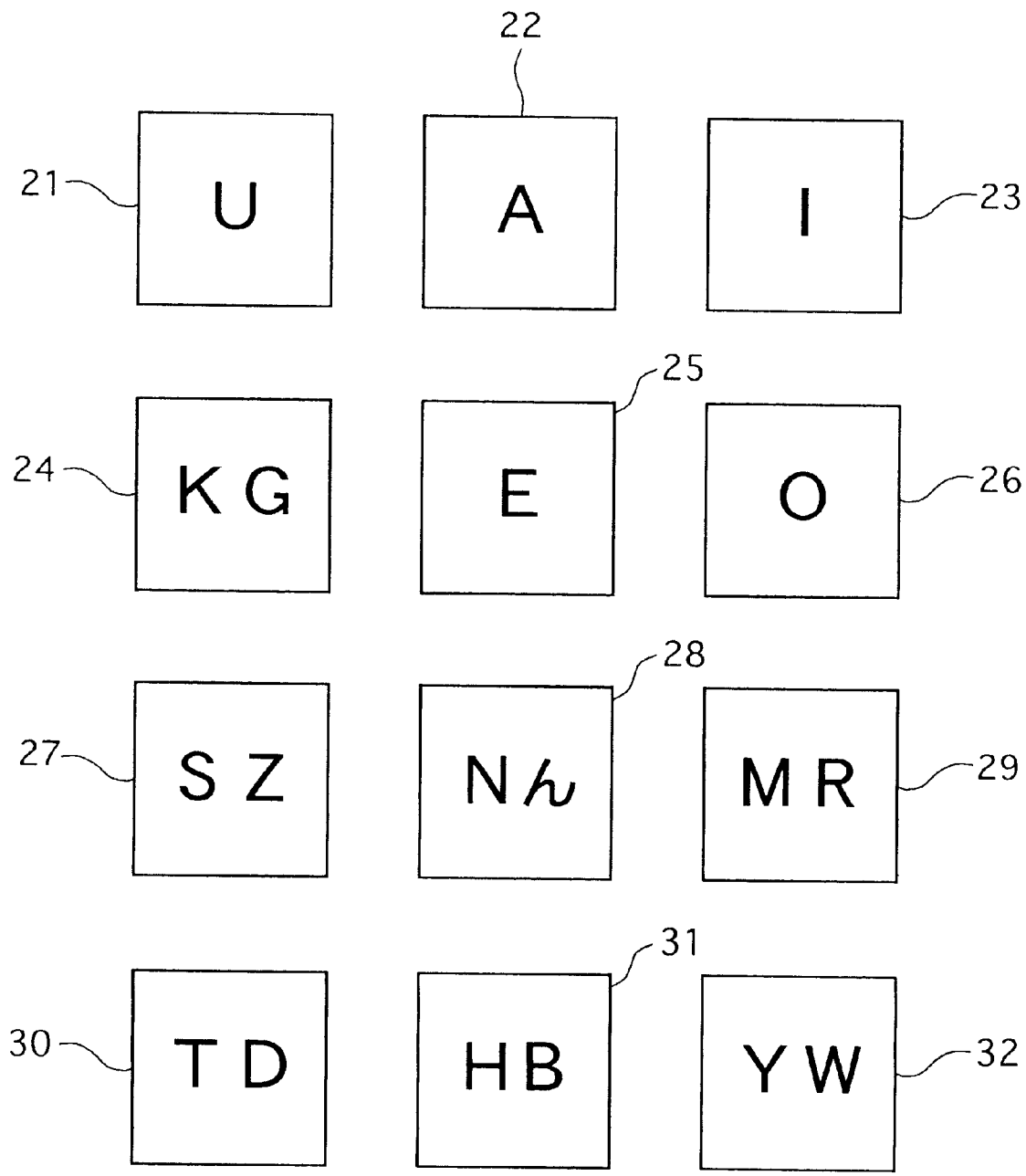
FIG. 54 is a plan view showing a key layout of the keyboard input apparatus of other embodiment of the present invention.

Further, the positions of the vowels and consonants are not confined to the examples shown in the foregoing embodiments, but may be changed, for instance as shown in FIG. 54, where the characters "U", "A", and "I" are set to the keys 21 through 23, and the characters "E" and "O" to the keys 25 and 26, or it is just as well possible to arrange the consonant keys in the order of from top to bottom and from left to right and so on.

In short, number of the main keys, positioning and character arrangement of the keys, and so on may be set accordingly at the time of actual operation.

Moreover, in the foregoing embodiments each character key has been selected by pressing the key a few times in case a plurality of character keys are set to one key, it is however also possible to rearrange it so that, each character key can be selected by a different manipulation, for instance, the first character key is selected when the key is pressed independently, or that the second character key is selected when the key is pressed together with another key and so on.

Figure 55:
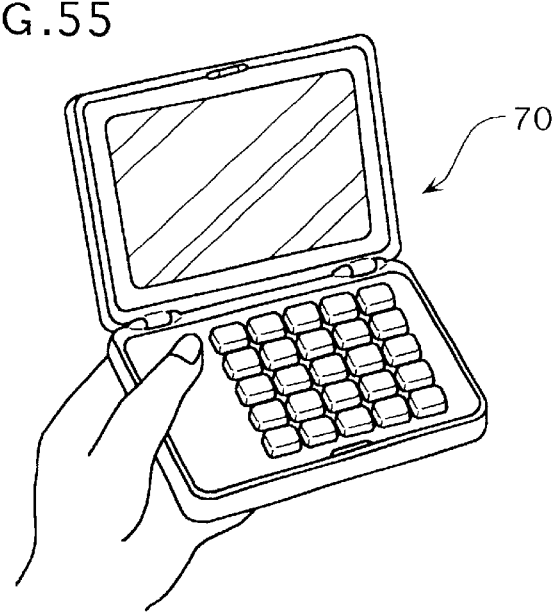
FIG. 55 is a perspective view of an electronic calculator adapted for the keyboard input apparatus of another embodiment of the present invention.
Figure 56:
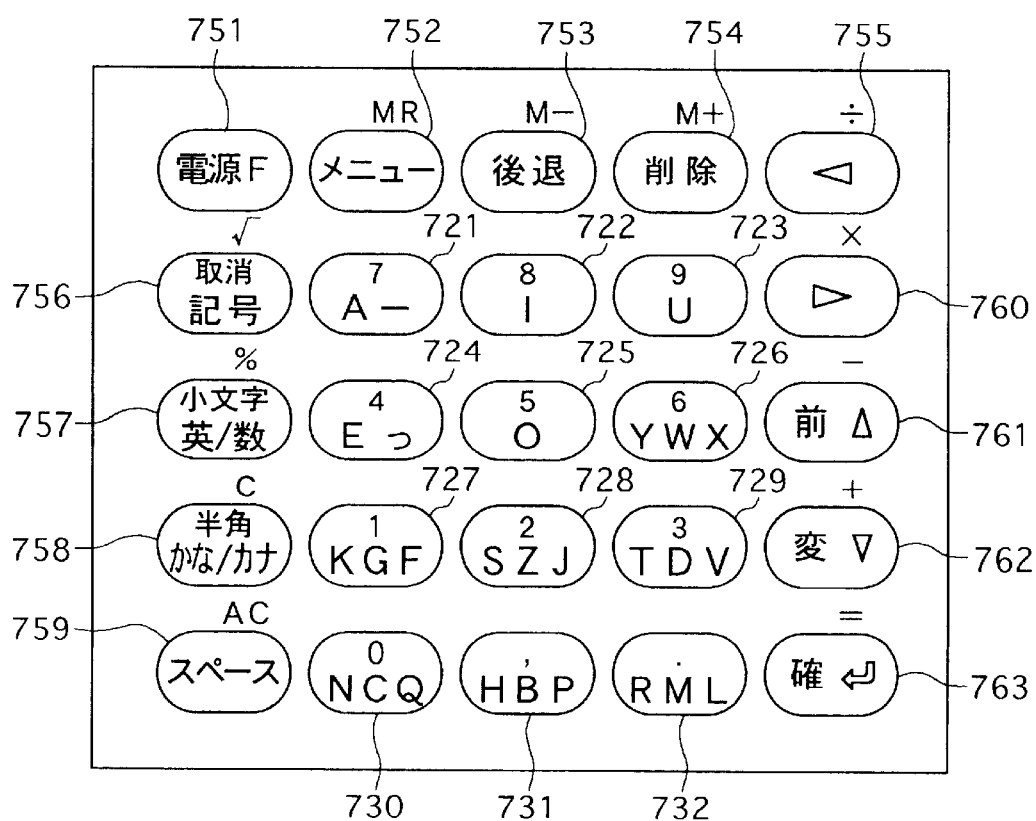
FIG. 56 is a plan view showing a key layout of the main part of the keyboard input apparatus of FIG. 55.

When the present invention is to be adapted to a desk calculator 70, the keyboard input apparatus may be used with various function keys 751 through 763, which are requisites for a desk calculator, surrounding the main keys 721 through 732 where numerals and characters are set, as shown in FIGS. 55 and 56.

In order to carry out calculating operations, the numeral keys of desk calculators are arranged, contrary to the numeric key arrangement of the telephone of the foregoing embodiment, from top left in turn as follows: the numeral "7" is set to the key 721; the numeral "8" to the key 722; the numeral "9" to the key 723; the numeral "4" to the key 724; the numeral "5" to the key 725; the numeral "6" to the key 726; numeral "1" to the key 727; the numeral "2" to the key 728; the numeral "3" to the key 729; the symbol "0" to the key 730; the symbol "," to the key 731; and the symbol "." to the key 732.

The character arrangement of the vowels and consonants are identical to the foregoing first embodiment with the exception that numerals are inscribed on the upper side and characters on the lower side of the key surfaces of the keys 721 through 732, as shown in FIG. 56.

Moreover, function keys 751 through 763 are so configured that functions inscribed on the surfaces or on the upper side of each key, such as calculating functions and character input function, can be executed.

Desk calculator 70 having this kind of keyboard input apparatus enables to perform character inputting operation in addition to calculating operations, improving the input manipulation efficiency.

Further, the key arrangement of the desk calculator 70 may also be set as shown in FIG. 57. This key arrangement is identical to the example shown in FIG. 56 with regard to the numeral and character arrangement of the main keys 721 through 732, with the exception that the symbol "." is set to the key 731 and the symbol "=" to the key 732.

Moreover, similar to the examples of FIG. 56, various functions required for the telephone or character inputting operation are set to the various function keys 771 through 783 surrounding the main keys 721 through 732. It is also possible to execute characters inputting operation with the desk calculator 70 in addition to calculating operations, improving thereby the manipulation efficiency.

Although numeral keys are set to the main keys 21 through 32 in the foregoing embodiment, it is just as possible to set only character keys to the main keys 21 through 32 in case numerals need not to be inputted.

Moreover, it is also possible to set only the long sound vowel key "つ"/t/ , Nasal sound "ん" or the Alphabet used for Japanese to the main keys 21 through 32 when English input is not required.

It is also possible to set only the Alphabet to the main keys 21 through 32, making it a keyboard input apparatus exclusively for the English usage.

Further, although the keys 221 through 232, function keys 251 through 262 and function keys 271 through 282 are arranged in 4 vertical columns in the foregoing fifth and sixth embodiments they may be just as well be arranged in three vertical columns when the number of the function keys 251 through 262,and 271 through 282 are reduced.

Furthermore, the order of key positions may be altered such that, the consonant keys are arranged from top to bottom and from left to right, as shown in FIG. 58. More specifically, the characters "KGF", "SZV"; "TDJ", "NCQ", "HBP", "RML" and "YWX" are set to the keys 221 through 227, and the vowels "A", "I", "U", "E", and "O" to the keys 28 through 32.

In short, it is sufficient that the five vowels are set to five of the 12 keys, 21 through 32 and that the 21 consonants are set to the remaining 7 keys in groups of three, respectively, and the actual arrangement or combination of the consonants may be decided when actually put into operation.

Further, inscriptions of the numerals and Alphabet may be set freely at the time of actually putting into operation such that the characters (the Alphabet and so on) are inscribed on the surface of each key, and numeric keys are inscribed on the outside (underside) of the keys, as shown in FIG. 59.

Furthermore, although both the long sound vowel key "つ"/t/ and the long, vowel symbol "—" are set as the second character keys of the vowel keys 21 through 25 in the foregoing first, fifth, seventh and eighth embodiments, either of them may be set as shown in the foregoing sixth embodiment.

Figure 60:
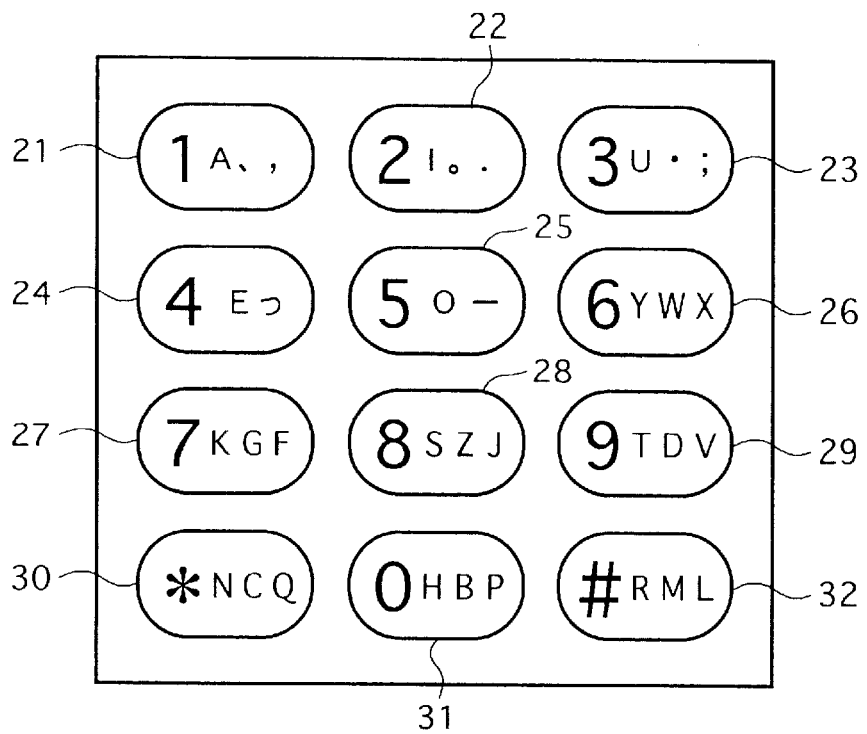
FIG. 60 is a plan view showing a key layout of the main part of the keyboard input apparatus of other embodiment of the present invention.
Figure 61:
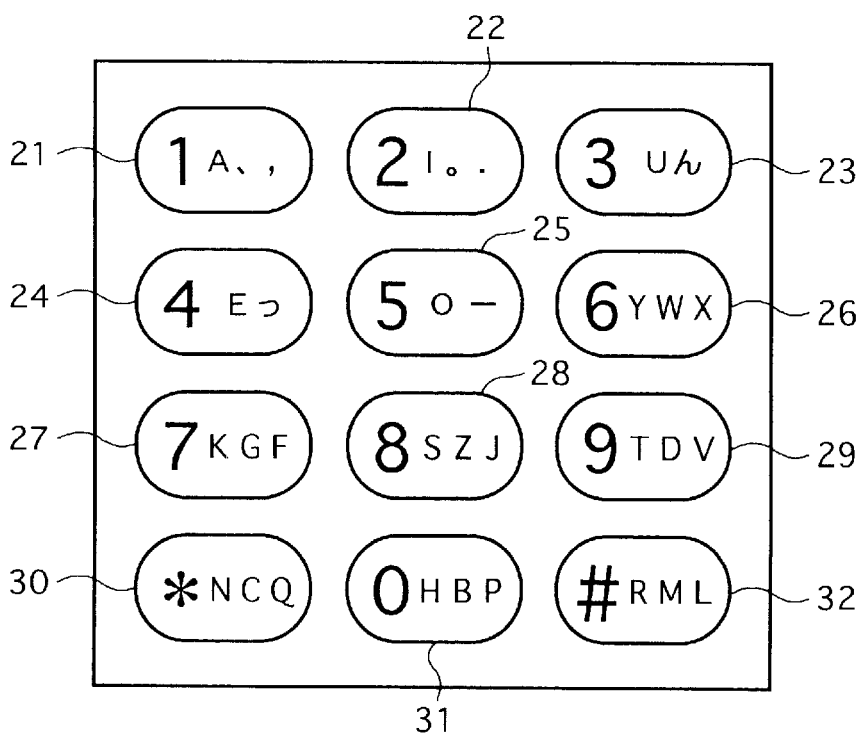
FIG. 61 is a plan view showing a key layout of the main part of the keyboard input apparatus of other embodiment of the present invention.
Figure 62:
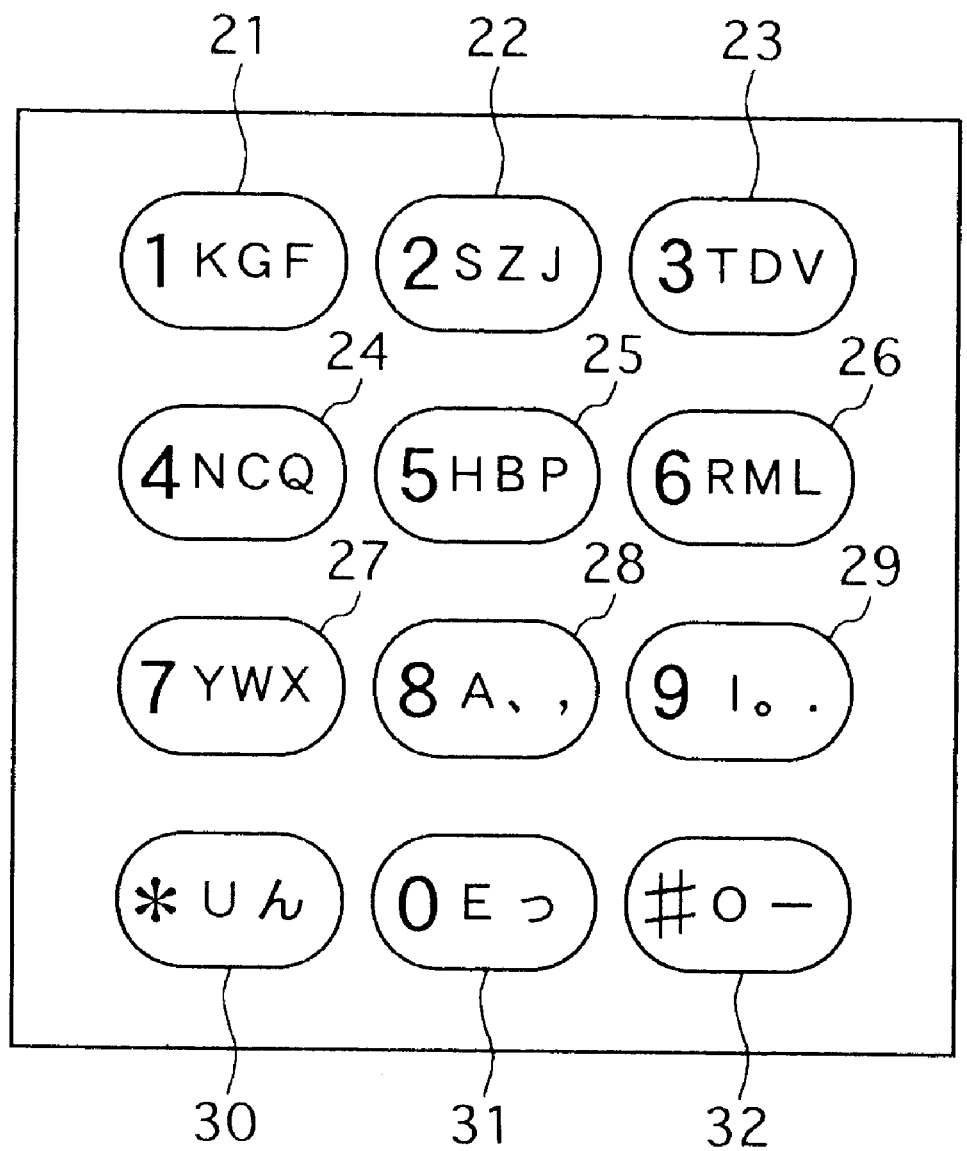
FIG. 62 is a plan view showing a key layout of the main part of the keyboard input apparatus of other embodiment of the present invention.
Figure 63:
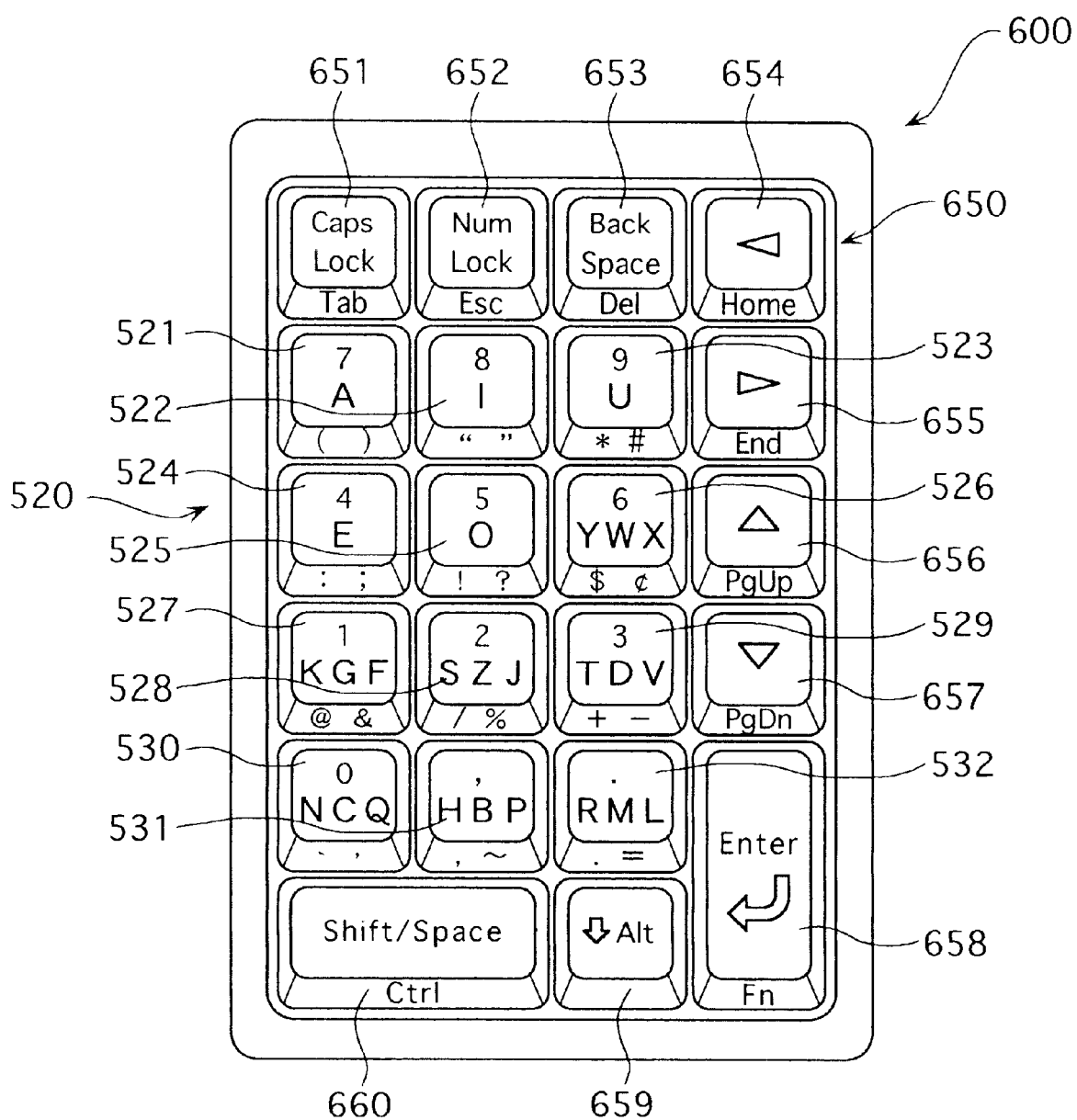
FIG. 63 is a plan view showing a key layout of the keyboard input apparatus of another embodiment of the present invention.

Moreover, the keys where the long sound vowel key "つ"/t/ and the long vowel symbol "—" are set need not be the vowel keys 21 and 24 where the vowels "A" and "E" are set, but may just as well be other vowels keys where characters "I", "U" and "O" are set. For instance, the long vowel symbol "—" may be set to the keys 25 and 32 where the vowel "O" is set, as shown in FIG. 60 through 62. However, the long sound vowel key "つ"/t/ and the long vowel symbol "—" are preferably set, from the manipulation point of view, to the characters "E" and "A" which are used rarely in succession in the Romanized character input method when inputting Japanese.

Further, symbols such as Japanese the comma " 、", period " 。", Alphabetical comma ",", period ".", dot "•" and semicolon ";" may be set as second character keys to the vowel keys 21 through 25, as shown in FIG. 60. For instance, in the Japanese input mode, it can be set such that two pressing operations on the keys 21, 22 and 23 will input the Japanese period " 。" or dot "•", and two pressing operations on the key 21, 22 and 23 in the English input mode will input comma ",", period "." and semicolon ";".

When a consonant and a vowel (for instance characters "K" and "A") are inputted in the Romanized character input method, producing the character "やゆよ"/KA/, and when any of the vowel keys 21 through 25 is then pressed twice in succession, the Japanese comma, the long sound vowel key "つ"/t/ and the long vowel symbol "—" can be inputted In this manner, when various symbols are set to the vowel keys 21 through 25, the periods and commas, which are frequently used in Japanese and English, can be easily inputted.

Further, when the vowels set with the commas, periods and the like are aligned horizontally or vertically, it can facilitate remembering of the key positions.

Moreover, the Nasal sound " ん" may also be set to one of the vowel keys 21 through 25, and 28 through 32, as shown in FIGS. 61 and 62. For instance, when the Nasal sound " ん" is set to the key 23 in the Japanese input mode as shown in FIG. 61, one pressing operation on the key 23 will input the vowel "う" and two pressing operations will input the Nasal sound " ん". When a character like the Nasal sound " ん" is set as a second character key of a vowel key, input manipulation of Japanese can further be improved.

As can be seen from above, number of the main keys, positions, character arrangement and the like may be set accordingly in actual operations.

Moreover, although the keyboard input apparatus 500 of the foregoing ninth embodiment is set for the Japanese input mode, it can just as well be modified to a keyboard input apparatus 600 for inputting exclusively English. In the keyboard input apparatus 600 are set main keys 521 through 532 set in a main key area 520, and function keys 651 through 660 are set in a function key area 650 with functions for the English input mode. The main keys 521 through 532 are identical to the keyboard input apparatus 500 with the exceptions that the long vowel symbol "—" and the long sound vowel key "つ"/t/ are not set to the keys 521 and 524, respectively, and some of the symbols are different(symbols used only for the key cords for the Japanese Input are changed into symbols for the English input)

Moreover, various functions of each of the function keys 651 through 660 are identical to each of the function keys 551 through 560 of the foregoing keyboard input apparatus 500 in the English mode, including repeat function of the cursor moving key 665. Similar effects as the foregoing ninth embodiment can be attained by the keyboard input apparatus 600.

Further, although the key 530 is set as the key to input the Nasal sound "ん", any key other than the key 530, such as the keys 521 through 529, 531 and 532 may also be selected to set the Nasal sound "ん". Further, number of key pressing operations needed to output the characters "ん" and "ん" may be set accordingly.

Nevertheless, since inputting of the Nasal sound symbol "ん" by two pressing operations of the key 530, where the character "N" is set, is in accord with the Romanized character input method of a normal conventional keyboard, it is preferable to have it set to the key 530 in the Romanized character input mode because of the facility of manipulation.

In short, the keyboard input apparatus of the present invention can be adapted to various equipment where inputting characters to telephones, desk calculators and so on is required, and particularly since numerals, Japanese and English texts can be inputted by as little as 12 to 15 keys, it is well suited as input apparatus of various small-sized information apparatus.

Moreover, the keyboard input apparatus of the present invention may be configured by integrating a hardware into the key input apparatus itself for realizing the key input processing means 102 and the like, it can however also be integrated into various apparatus, such as personal computers, as a soft ware for keyboard devices and the like, and execute the aforementioned functions by utilizing, for instance the CPU of those apparatus.

In order to confirm the effects of the present invention, number of key pressing operations required for the present invention (CUT method), conventional method (key input operation of a portable telephone) and a common key board (QWERTY method) have been compared utilizing Japanese and English model texts. As a result it was confirmed, as shown in FIG. 64, that it is possible, by utilizing the present invention, to input characters with one half to two thirds of the strokes necessary for the conventional method, and thus a high inputting efficiency of the present invention has been demonstrated. It must be noted that the number of strokes in FIG. 64 means the number of pressing operation of the keys and the ratio is the proportion of the strokes of various methods, taking the number of strokes of the inputting method of the present invention as a standard (taken as 1).

As explained above, number of keys can be reduced according to the keyboard input apparatus of the present invention, making it easy to learn, easy to type and the apparatus can be easily miniaturized. Furthermore, number of keystrokes necessary to input characters can be decreased despite the small number of keys, thereby facilitating the input manipulation.

Further, by setting the long sound vowel key "つ"/t/ and the long vowel symbol "―" as second character keys to independently set vowel keys, inputting of in the Japanese language frequently used long sound vowel key "つ"/t/ and the long vowel symbol "―" is facilitated, contributing thereby to help improve the character input efficiency.

As explained above, the key input apparatus of the present invention is extremely adequate for an input apparatus of various information processing apparatus, particularly adequate for an input apparatus to be incorporated into various types of small-sized information process apparatus such as portable personal computers, electronic notebooks, PDA, portable telephones and FAX.

What is claimed is:

1. A keyboard input apparatus, comprising;
    five vowel keys and a plurality of consonant keys, said five vowel keys being set with five respective characters expressing the vowels "A", "I", "U", "E" and "O" respectively, and each of said consonant keys being set with a plurality of characters expressing consonants;
    a key input detecting means for detecting the number of times each of the keys is pressed in succession, and for confirming said number of times the moment a key other than the key being pressed is pressed; and
    a key input processing means for outputting a character corresponding to the number of times the key is pressed in succession.

2. The keyboard input apparatus according to claim 1, wherein a first through a N-th numbers are set to each character key, and wherein said key input processing means selects the key of the N-th number and outputs it when the key is pressed N number of times.

3. The keyboard input apparatus according to claim 1, wherein said key input detecting means ignores the number of pressing operations already executed on a key when the key is pressed more times than the numbers designated for the keys and recounts from the first key pressing operation.

4. The keyboard input apparatus according to claim 1, wherein said input detecting means confirms the number of pressing operations of a precedent key the moment a predetermined cursor moving key is pressed.

5. The keyboard input apparatus according to any one of claim 1, wherein said keyboard input apparatus confirms the number of pressing operations of a consonant key and an input of a vowel key the moment said vowel key is pressed after said consonant key.

6. The keyboard input apparatus according to claim 1, wherein said keyboard input apparatus confirms the number of pressing operations of a consonant key the moment another consonant key, a vowel key or a predetermined cursor moving key is pressed after said consonant key.

7. The keyboard input apparatus according to claim 1 further comprising;
    at least 12 keys arranged in a matrix array of four horizontal rows and three vertical columns;
    wherein five keys are designated as vowel keys for inputting Alphabetical characters "A", "I", "U", "E" and "O" expressing vowels; and
    the remaining 7 keys other than the keys set for said vowel keys "A", "I", "U", "E" and "O" are set as consonant keys, each being set for a plurality of consonants respectively.

8. The keyboard input apparatus according to claim 7, wherein the three keys in the top row are set for the Alphabet "A", "I" and "U", expressing vowels, and the two of the three keys in the second row from the top row are designated for inputting character keys "E" and "O".

9. The keyboard input apparatus according to claim 8, wherein three keys in the top row are set from left to right in turn for inputting the characters "A", "I" and "U" and two keys in the second row from the top are set from left to right in turn for inputting the characters "E" and "O".

10. The keyboard input apparatus according to claim 7, wherein 21 characters of the 26 characters of the Alphabet, except for the keys set for the vowels of "A", "I", "U", "E" and "O", are set in groups of three to said 7 consonant keys.

11. The keyboard input apparatus according to claim 7, wherein characters "K", "S", "T" and "H" are set as first character keys to four consonant keys of said 7 consonant keys and the characters "G", "Z", "D" and "B" are set as second character keys to the keys designated for the characters "K", "S", "T" and "H" respectively.

12. The keyboard input apparatus according to claim 7, wherein characters "KGF", "SZJ", "TDV", "NCQ", "HBP", "RML" and "YWX" are set respectively in combinations into said 7 consonant keys.

13. The keyboard input apparatus according to claim 7, wherein numeric keys for inputting numerals "1", "2", "3", "4", "5", "6", "7", "8", "9" and "0" are set to 10 keys of said 12 keys, and wherein said keyboard input apparatus further comprises a mode switching means for switching key input modes between a numeric input mode and a character input mode.

14. The keyboard input apparatus according to claim 13, wherein said mode switching means switches input mode into three input modes of numeric input mode, Japanese input mode and English input mode.

15. The keyboard input apparatus according to claim 1, wherein one of said five vowel keys is set as a long sound vowel key for inputting a long vowel symbol "—" as a second character key.

16. The keyboard input apparatus according to claim 15 wherein the second character key for inputting said long vowel symbol "—" is set to either one of the keys for inputting the characters "A" or "E".

17. The keyboard input apparatus according to claim 15 wherein said key input processing means outputs:
   a vowel set to said long sound vowel key when said long sound vowel key is pressed once;
   the long vowel symbol "—" when said long sound vowel key is pressed twice in succession; and
   a vowel and the long vowel symbol "—" orderly when said long sound vowel key is pressed three times in succession.

18. The keyboard input apparatus according to claim 15, wherein said key input processing means outputs:
   a vowel set to said long sound vowel key when said long sound vowel key is pressed once;
   a vowel set to said long sound vowel key twice when said long sound vowel key is pressed twice in succession; and
   a vowel and the long vowel symbol "—" in the order of "the vowel and the long vowel symbol" when said long sound vowel key is pressed three times in succession.

19. The keyboard input apparatus according to claim 15, wherein said key input processing means outputs;
   a vowel set to said vowel key, and a vowel set to said Long Sound vowel key in the order of "the vowel and the vowel set to said Long Sound vowel key" when said long sound vowel key is pressed once after pressing any one of the four vowel keys other than said long sound vowel key;
   a vowel and a long vowel symbol "—" in the order of "the vowel and the long vowel symbol "—" when said long sound vowel key is pressed twice in succession after pressing any one of the four vowel keys other than said long sound vowel key; and
   a vowel set to said vowel key, and a vowel and the long vowel symbol "—" set to said long sound vowel key in the order of "the vowel and the vowel set to the long sound vowel key and the long vowel symbol —" when said long sound vowel key is pressed three times in succession after pressing any one of the four vowel keys other than said long sound vowel key.

20. The keyboard input apparatus according to claim 15, wherein said key input processing means outputs:
   a consonant set to said consonant key and a vowel set to said long sound vowel key in the order of "the consonant and the vowel" when said long sound vowel key is pressed once after pressing said consonant key;
   a consonant set to said consonant key, and a vowel set to said long sound vowel key in the order of "the consonant, the vowel and the vowel" when said long sound vowel key is pressed twice in succession after pressing said consonant key; and
   a consonant set to said consonant key and a vowel and the long vowel symbol "—" set to said long sound vowel key in the order of "the consonant, the vowel and the long vowel symbol —" when said long sound vowel key is pressed three times in succession after pressing said consonant key.

21. The keyboard input apparatus according to claim 1, wherein one of said five vowel keys is set as the long sound vowel key for inputting the long sound vowel key "っ"/t/ as a second character key.

22. The keyboard input apparatus according to claim 21, wherein a second character key for inputting said long sound vowel key "っ"/t/ is set to either of the keys for inputting the characters "A" or "E".

23. The keyboard input apparatus according to claim 21, wherein said key input processing means outputs;
   a vowel set to said double consonant vowel key when said double consonant vowel key is pressed once;
   a long sound vowel key "っ"/t/ when said double consonant vowel key is pressed twice in succession; and
   a vowel and a long sound vowel key "っ"/t/ set to said double consonant vowel key in the order of "the vowel and the long sound vowel key" when said double consonant vowel key is pressed three times in succession.

24. The keyboard input apparatus according to claim 21, wherein said key input processing means outputs;
   a vowel set on said double consonant vowel key when said double consonant vowel key is pressed once;
   two vowels set on said double consonant vowel key when said double consonant vowel key is pressed twice in succession; and
   a vowel and the long sound vowel key "っ"/t/ set to said double consonant vowel key in the order of "the vowel and the long sound vowel key" when said double consonant vowel key is pressed three times in succession.

25. The keyboard input apparatus according to claim 21, wherein said key input processing means outputs;
   a vowel set to said vowel key and a vowel set to said double consonant vowel key in the order of "the vowel and the vowel set to the double consonant vowel key" when said double consonant vowel key is pressed once after pressing one of the four vowel keys other than said double consonant vowel key;
   a vowel set to said vowel key and the long sound vowel key "っ"/t/ in the order of "the vowel and the long sound vowel key" when said double consonant vowel key is pressed twice in succession after pressing any one of the four vowel keys other than said double consonant vowel key; and a vowel set to said vowel key and a vowel and the double consonant "っ"/t/ set to said double consonant vowel key in the order of "the vowel and the vowel set to the double consonant vowel key" when said double consonant vowel key is pressed three times in succession after pressing any one of the four vowel keys other than said double consonant vowel keys.

26. The keyboard input apparatus according to claim 22, wherein said key input processing means outputs;

a consonant set to said consonant key and a vowel set to said double consonant vowel key in the order of "the consonant and the vowel" when said double consonant vowel key is pressed once after pressing said consonant key;

a consonant set to said consonant key and a vowel set to said double consonant vowel key in the order of "the consonant, the vowel and the vowel" when said double consonant vowel key is pressed twice in succession after pressing said consonant key; and, a consonant set to said consonant key and a vowel and the double consonant "っ"/t/ set to said double consonant vowel key in the order of "the consonant, the vowel and the long sound vowel key" when said double consonant vowel key is pressed three times in succession after pressing said consonant key.

27. The keyboard input apparatus according to claim 1, wherein a consonant key is set for the character "N" and wherein said key input processing means outputs;

the character "N" when a consonant key set for the character "N" is pressed once;

the character "ん" when a consonant key set for the character "N" is pressed twice in succession; and the characters "ん" and "N" in the order of "ん" and N" when the consonant key set for the character "N" is pressed three times in succession.

28. The keyboard input apparatus according to claim 1, wherein a main area is arranged with five vowel keys and a plurality of consonant keys, and Wherein function key area is arranged on the upper, right and lower side in brackets of the main key area, the function key area having a plurality of function keys arranged in the form of character "C".

29. The keyboard input apparatus according to claim 28, wherein one of said function keys has a shifting function for inputting characters and functions of keys set for a shifted condition, a converting function for converting unconfirmed characters into Chinese characters and a space input function for inputting space, wherein said shifting function works when other vowel keys, consonant keys and function keys are pressed within a certain period of time while said function key is being held down;

wherein said converting function works when said function key is independently pressed and released before determining inputted character in Japanese character input mode; and wherein said space input function works when said function key is pressed independently.

* * * * *